US011175768B2

United States Patent
Taya et al.

(10) Patent No.: US 11,175,768 B2
(45) Date of Patent: *Nov. 16, 2021

(54) METHOD FOR SELECTING TOUCH PANEL PEN WRITING MEMBER, TOUCH PANEL SYSTEM, TOUCH PANEL PEN WRITING MEMBER, TOUCH PANEL, AND DISPLAY DEVICE

(71) Applicant: DAI NIPPON PRINTING CO., LTD., Tokyo (JP)

(72) Inventors: Shubou Taya, Kyoto (JP); Tomohiro Ogawa, Tsukuba (JP); Yosuke Takayama, Osaka (JP); Jun Tsujimoto, Bizen (JP); Gen Furui, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 196 days.

This patent is subject to a terminal disclaimer.

(21) Appl. No.: 16/483,339

(22) PCT Filed: Feb. 5, 2018

(86) PCT No.: PCT/JP2018/003812
§ 371 (c)(1),
(2) Date: Aug. 2, 2019

(87) PCT Pub. No.: WO2018/143456
PCT Pub. Date: Aug. 9, 2018

(65) Prior Publication Data
US 2021/0173512 A1 Jun. 10, 2021

(30) Foreign Application Priority Data

Feb. 3, 2017 (JP) .............................. JP2017-018894
Feb. 6, 2017 (JP) .............................. JP2017-019738
Jul. 20, 2017 (JP) .............................. JP2017-140966

(51) Int. Cl.
*G06F 3/041* (2006.01)
*G06F 3/0354* (2013.01)

(52) U.S. Cl.
CPC ........ *G06F 3/0416* (2013.01); *G06F 3/03545* (2013.01)

(58) Field of Classification Search
CPC ........................... G06F 3/0416; G06F 3/03545
See application file for complete search history.

(56) References Cited

U.S. PATENT DOCUMENTS 10,908,711 B2* 2/2021 Taya .................. G06F 3/0414
2016/0236975 A1* 8/2016 Sugimoto ............... C03C 3/093

FOREIGN PATENT DOCUMENTS

JP 2014-109712 6/2014
JP 2015-98123 5/2015
(Continued)

OTHER PUBLICATIONS

International Search Report of PCT/JP2018/003812, dated Apr. 3, 2018, 5 pages with English translation.

*Primary Examiner* — Liliana Cerullo
(74) *Attorney, Agent, or Firm* — Hamre, Schumann, Mueller & Larson, P.C.

(57) ABSTRACT

Provided is a method for selecting a touch panel pen writing member that enhances the efficiency for product design and quality management of writing members. A method for selecting a touch panel pen writing member, in which a writing member satisfying the following requirement A1-1 is selected as the touch panel pen writing member: <Requirement A1-1> A touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic (Continued)

friction force in the movement direction given to the touch panel pen is measured at intervals of 0.001 seconds, and an average of the kinetic friction forces obtained every 0.001 second is calculated. Furthermore, after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees. In this state, the residual friction force in the movement direction given to the touch panel pen is measured at intervals of 0.001 seconds, and an average of residual friction forces obtained every 0.001 second is calculated. The average of the kinetic friction force and the average of the residual friction force satisfy a relationship "0.45<average of residual friction force/average of kinetic friction force".

20 Claims, 7 Drawing Sheets

(56) References Cited

FOREIGN PATENT DOCUMENTS

| | | |
|---|---|---|
| JP | 2015-114939 | 6/2015 |
| JP | 2016-21134 | 2/2016 |
| JP | 2016-53568 | 4/2016 |
| JP | 2016-122363 | 7/2016 |
| WO | 2015/072297 | 5/2015 |

* cited by examiner

[Fig. 1]
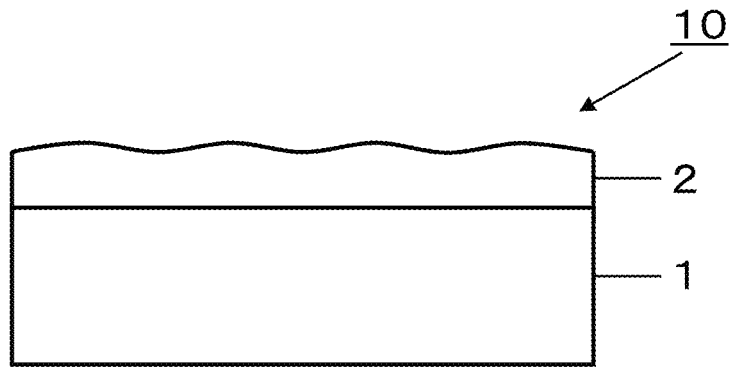
[Fig. 2]
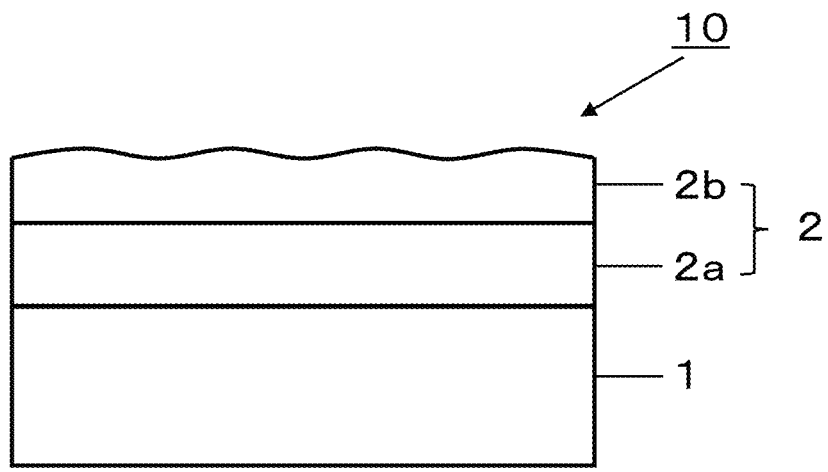
[Fig. 3]
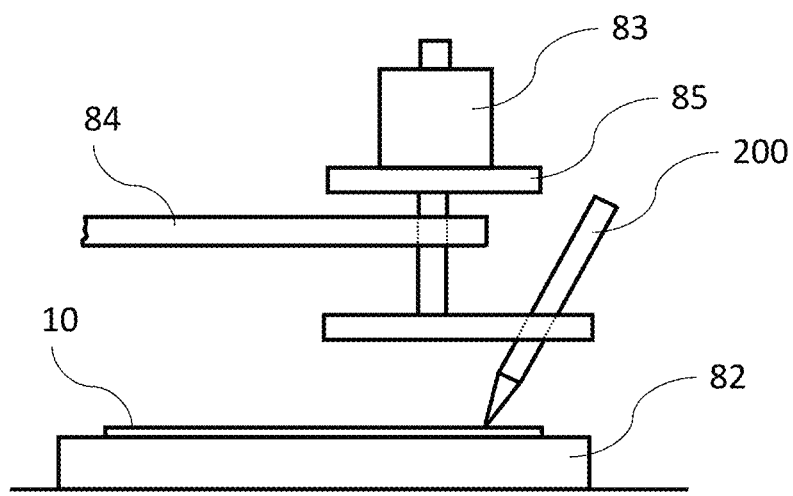

[Fig. 4]
(a)
(b)
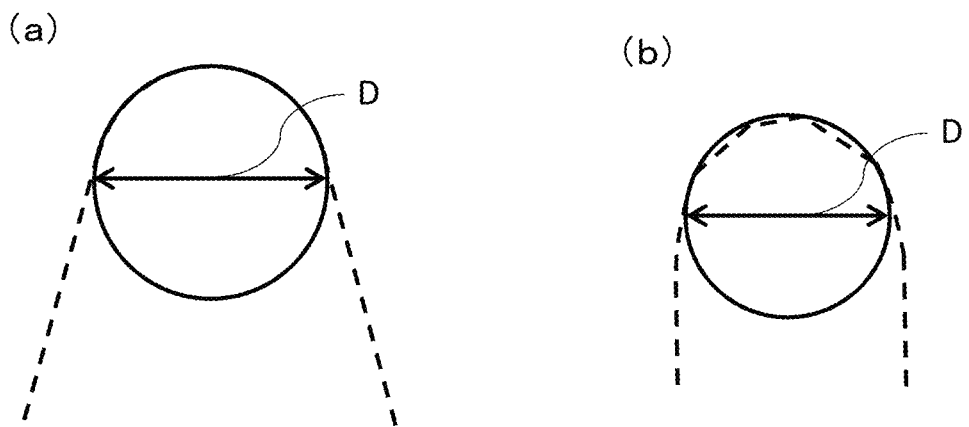
[Fig. 5]
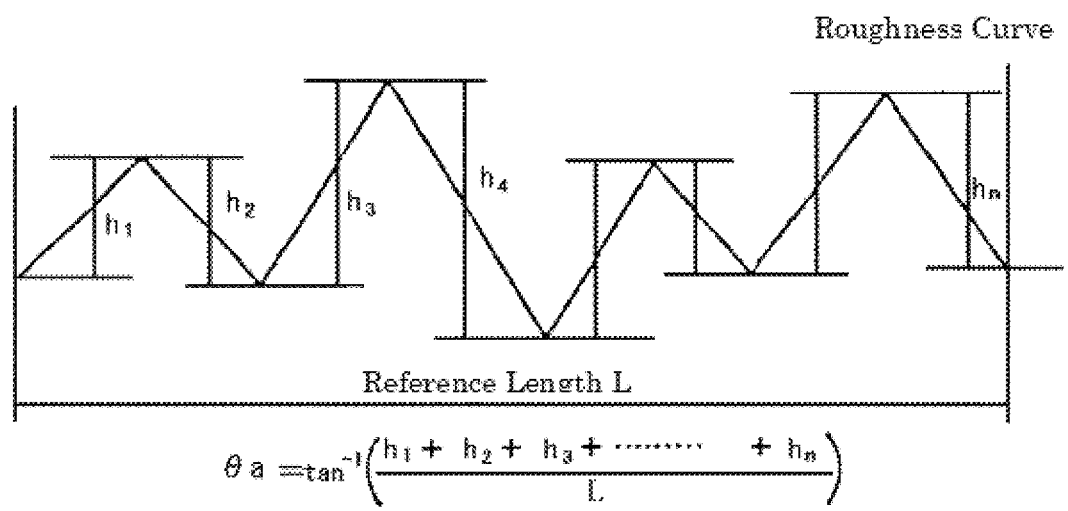

[Fig. 6]
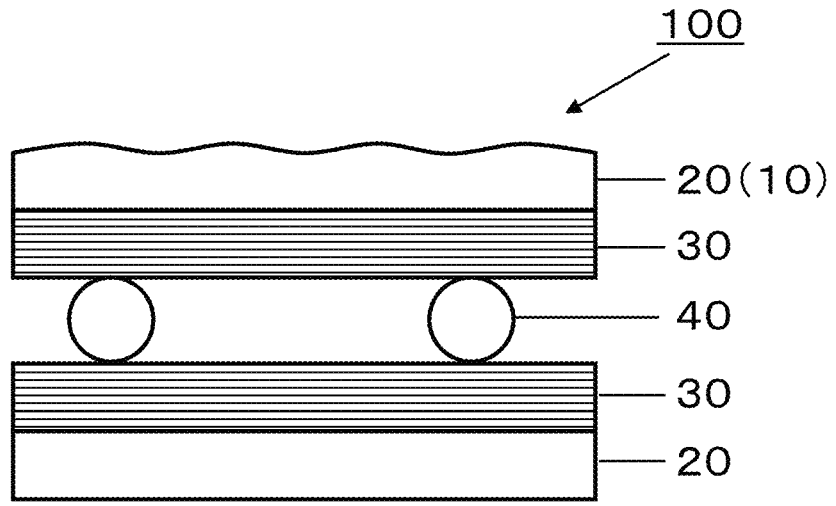
[Fig. 7]
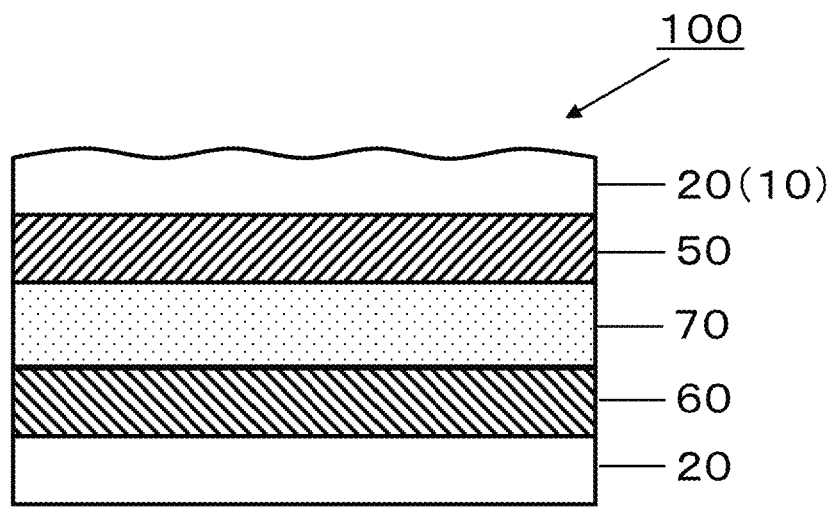

[Fig. 8]
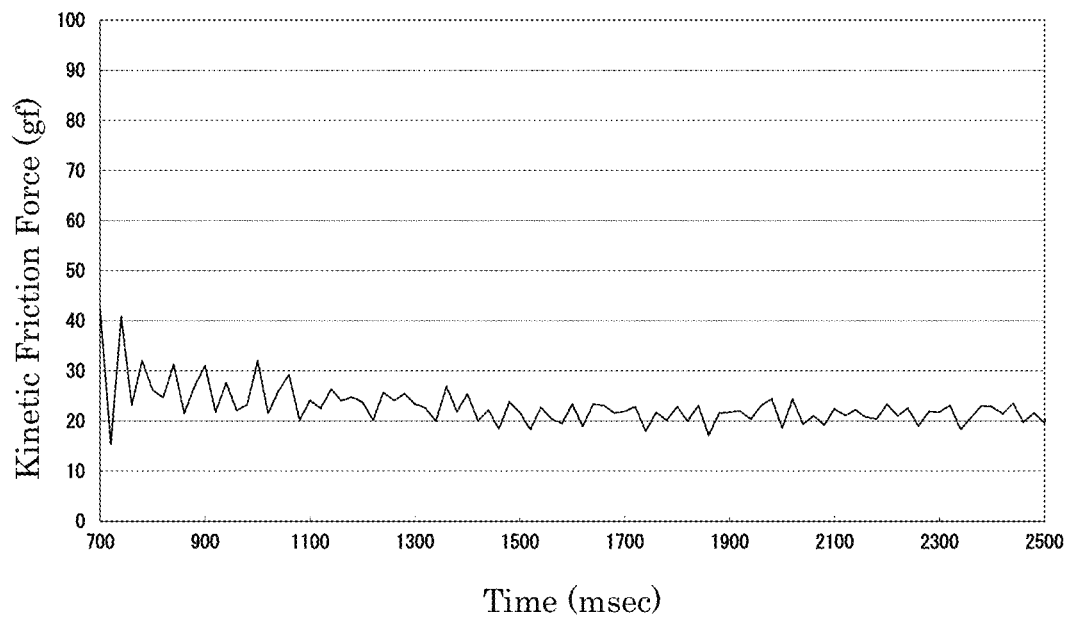
[Fig. 9]
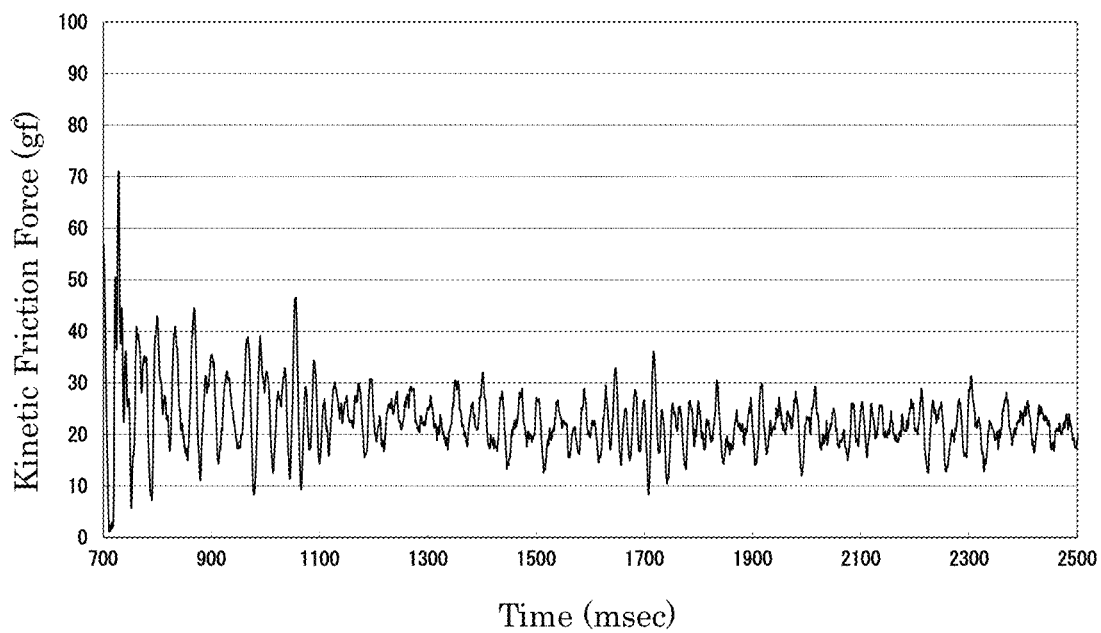

[Fig. 10]
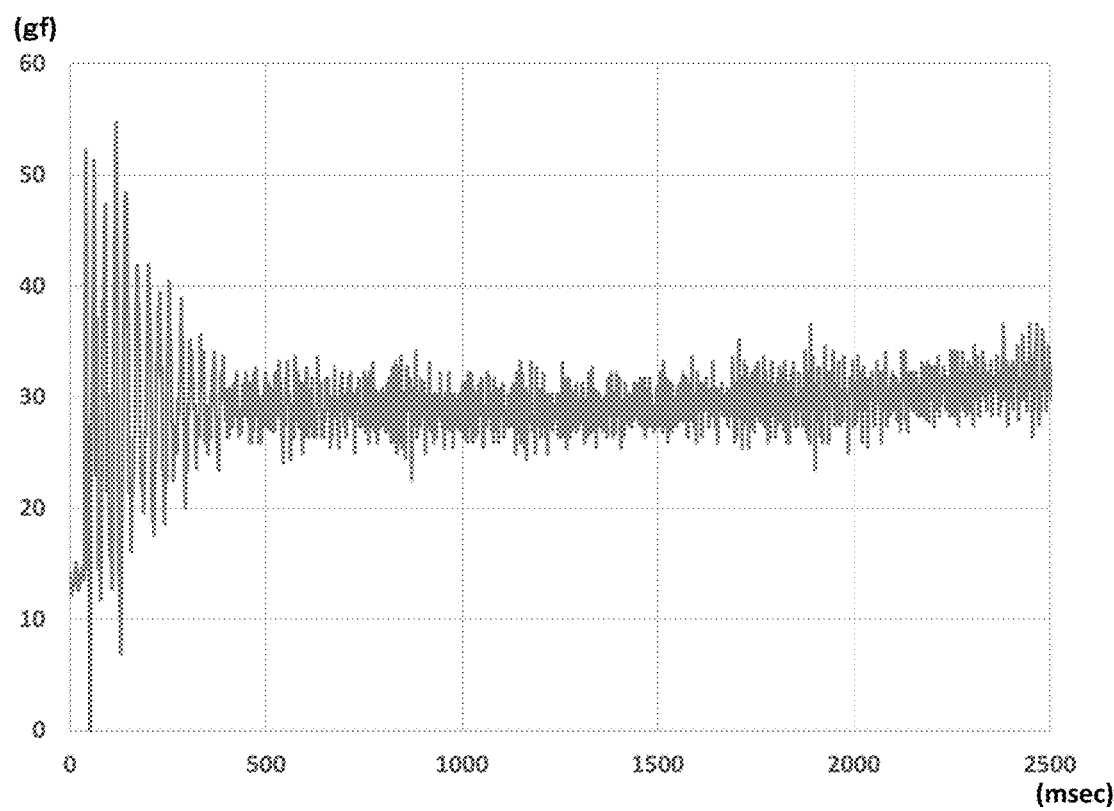
[Fig. 11]
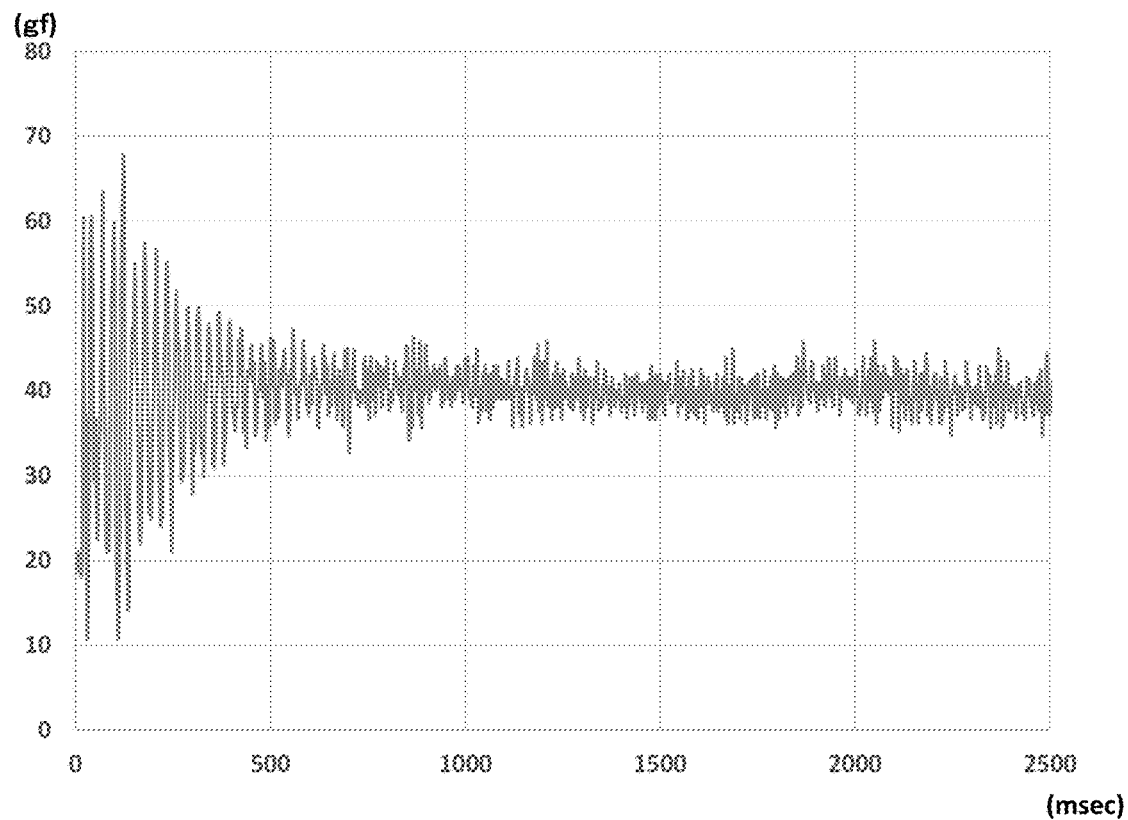

[Fig. 12]
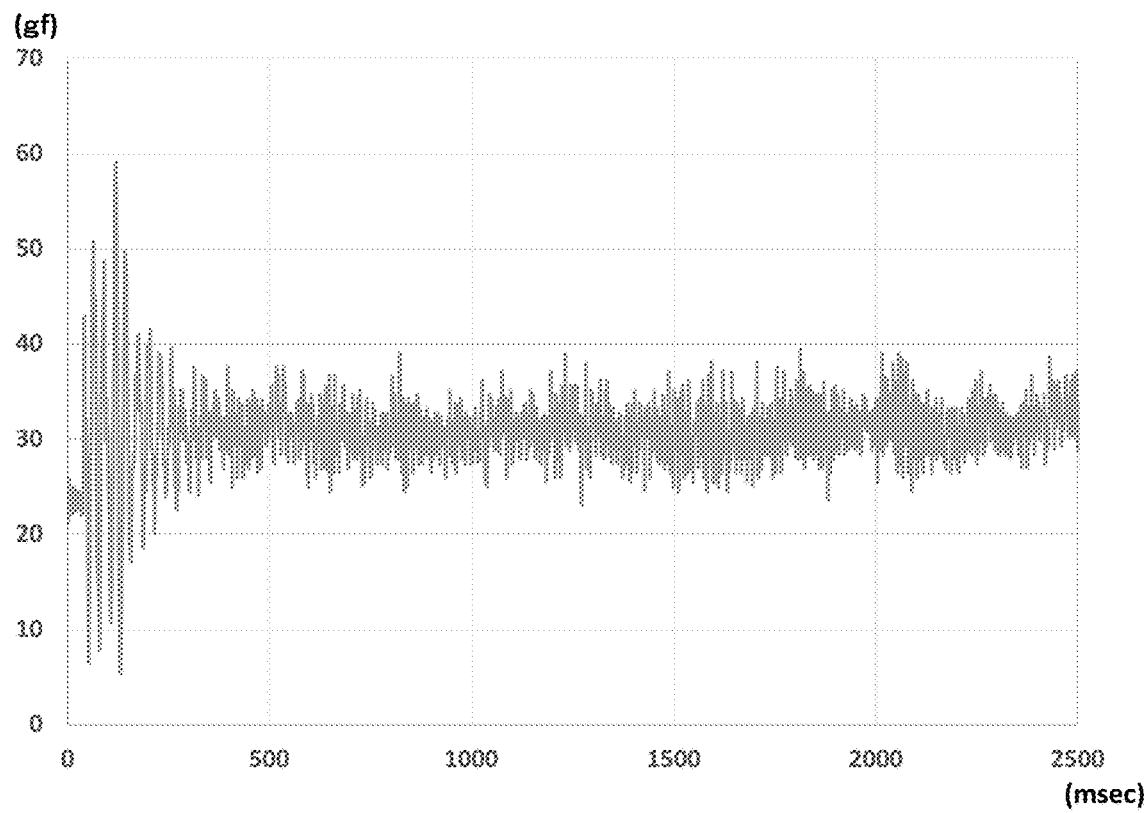
[Fig. 13]
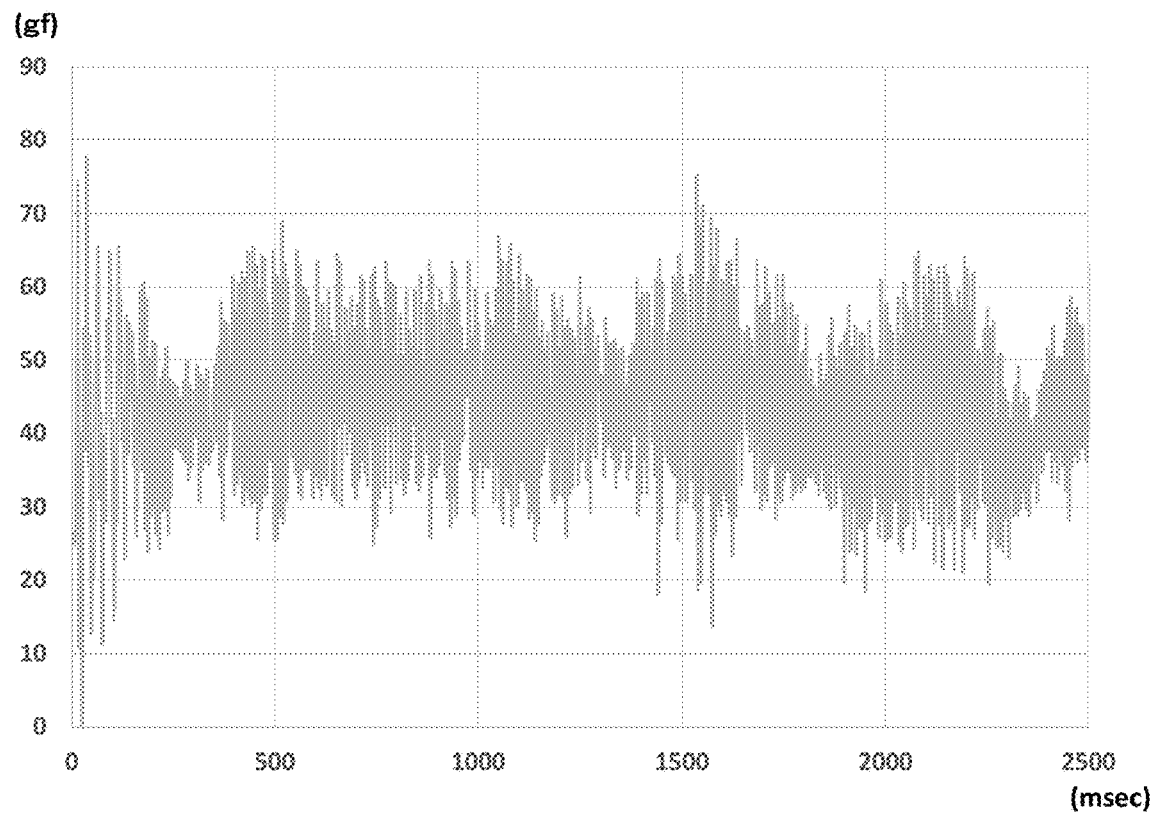

[Fig. 14]
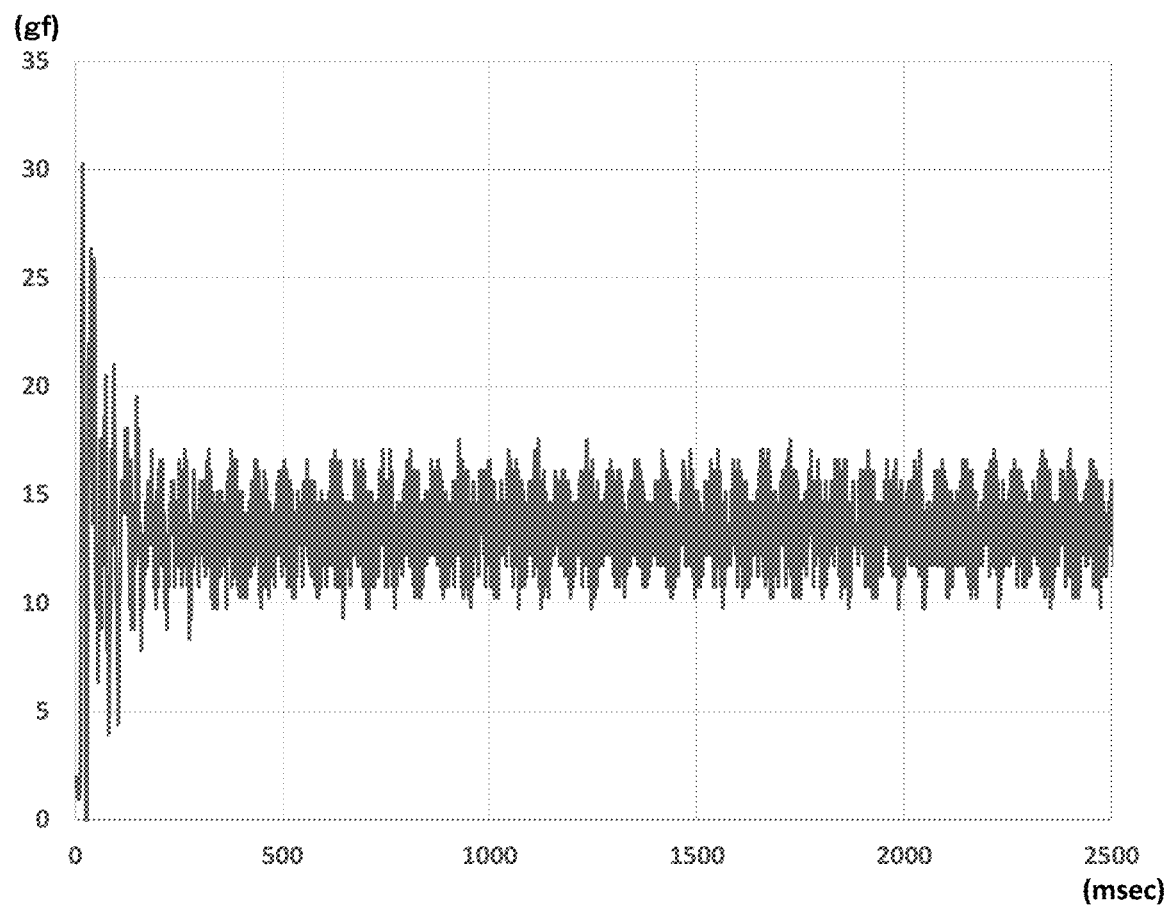

METHOD FOR SELECTING TOUCH PANEL PEN WRITING MEMBER, TOUCH PANEL SYSTEM, TOUCH PANEL PEN WRITING MEMBER, TOUCH PANEL, AND DISPLAY DEVICE

TECHNICAL FIELD

The present invention relates to a method for selecting a touch panel pen writing member, a touch panel system, a touch panel pen writing member, a touch panel, and a display device.

BACKGROUND ART

In recent years, the distribution of touch panels has been increasing, partly because the touch panels are installed in many handheld terminals. Surface protective sheets may be attached to the surfaces of the touch panels for various purposes.

Resistive touch panels, which have previously been mainstream, are repetitively tapped with fingers or a pen to operate. Therefore, their surface protective sheets are required to have a high level of scratch resistance.

On the other hand, the surface protective sheets for capacitive touch panels, which are currently mainstream, are required to have slipperiness for operating the capacitive touch panels with fingers. Since the conventional resistive touch panels cannot sense a plurality of locations at the same time, fingers are not moved on their screens. By contrast, the capacitive touch panels are capable of sensing a plurality of locations at the same time and thus often undergo operation based on movement with fingers on their screens.

The surface protective sheets for touch panels are required to have the capability of preventing fingerprint smudge upon operation with fingers or facilitating wiping off such fingerprint smudge, in common between the resistive and capacitive touch panels.

The surface protective sheets for touch panels as described above have been proposed in, for example, PTL 1 and PTL 2.

CITATION LIST

Patent Literature

PTL 1: JP 2015-114939 A
PTL 2: JP 2014-109712 A

SUMMARY OF INVENTION

Technical Problem

Capacitive touch panels recognize a touched location by measuring change in capacitance. Therefore, touching objects need to have a given conductivity. Hence, in the early days of appearance of the capacitive touch panels, only operability with fingers has been studied, and writability to draw characters or pictures with touch panel pens, for example, has not been studied. For resistive touch panels as well, the operation using touch panel pens is typically tapping, and writability to draw characters or pictures has not been emphasized.

However, in recent years, touch panel pens capable of entry in capacitive touch panels or electromagnetic touch panels have started to be proposed, and an increasing number of applications have responded to character entry or drawing with touch panel pens. For these reasons, surface protective sheets for touch panels are required to offer favorable writing feel with touch panel pens.

However, the surface protective sheets for touch panels of PTL 1 and PTL 2 that have been heretofore proposed have made no discussion about writing feel with touch panel pens.

Objects of the present invention are to provide a method for selecting a touch panel pen writing member capable of realizing high-level writing feel, a touch panel system, a touch panel pen writing member, a touch panel, and a display device.

Solution to Problem

For solving the above-mentioned problems, the present inventors provide a method for selecting a touch panel pen writing member, a touch panel system, a touch panel pen writing member, a touch panel and a display device of the following [1] to [15].

[1] A method for selecting a touch panel pen writing member, including a writing member satisfying the following requirement A1-1 as a touch panel pen writing member:
<Requirement A1-1>
an average of kinetic friction force and an average of residual friction force obtained below satisfy a relationship: 0.45<average of residual friction force/average of kinetic friction force;
wherein a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force in the movement direction given to the touch panel pen is measured at intervals of 0.001 seconds, and an average of the kinetic friction forces obtained every 0.001 second is calculated and designated as an average of kinetic friction force; and
after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees, in this state, the residual friction force in the movement direction given to the touch panel pen is measured at intervals of 0.001 seconds, and an average of the residual friction forces obtained every 0.001 second is calculated and designated as an average of residual friction force.

[2] A touch panel system including a touch panel having a touch panel pen writing member on the surface thereof, and a touch panel pen, which satisfies the requirement A1-1.

[3] A touch panel pen writing member having a surface that satisfies the requirement A1-1.

[4] A touch panel including a writing member on a surface, wherein a touch panel pen writing member according to the above [3] is placed as the writing member such that the side that satisfies the requirement A1-1 provides the surface of the touch panel.

[5] A display device having a touch panel on a display component, wherein the touch panel is a touch panel according to the above [4].

[6] A method for selecting a touch panel pen writing member, including a writing member satisfying the following requirement B1-1 and requirement B1-2 as a touch panel pen writing member:

<Requirement B1-1>
when a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the friction force in the movement direction given to the touch panel pen is measured at intervals of 0.001 seconds, an average of the kinetic friction forces obtained every 0.001 second is calculated, and a standard deviation of the kinetic friction force is calculated, the standard deviation is 2.0 gf or more and 15.0 gf or less;

<Requirement B1-2>
the time rate of the time at which the kinetic friction force of 3.0 gf or less is exhibited based on the total measurement time for the kinetic friction force is 15% or more and 90% or less.

[7] A touch panel system including a touch panel having a touch panel pen writing member on the surface thereof, and a touch panel pen, which satisfies the requirement B1-1 and the requirement B1-2.

[8] A touch panel pen writing member having a surface that satisfies the requirement B1-1 and the requirement B1-2.

[9] A touch panel including a writing member on a surface, wherein a touch panel pen writing member according to the above [8] is placed as the writing member such that the side that satisfies the requirement B1-1 and the requirement B1-2 provides the surface of the touch panel.

[10] A display device having a touch panel on a display component, wherein the touch panel is a touch panel according to the above [9].

[11] A method for selecting a touch panel pen writing member, including a writing member satisfying the following requirement C1-1 as a touch panel pen writing member:

<Requirement C1-1>
$M_{100-200}$ is more than 0.030 [(gf)$^2$] and 0.400 [(gf)$^2$] or less, wherein a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force f [gf] in the movement direction given to the touch panel pen is measured at intervals of 1 msec, the interval of 1,001 msec to 2,000 msec after the start of the movement of the touch panel pen writing member is divided into 8 sections every 125 msec, the kinetic friction force is subjected to discrete Fourier transform with the window function as a Hanning window every section to calculate a power spectrum density [(gf)$^2$/Hz] at each frequency, an integrated value of the power spectrum density at more than 100 Hz and 200 Hz or less in each section is calculated, and an average value of the integrated values obtained in 8 sections is calculated and designated as $M_{100-200}$.

[12] A touch panel system including a touch panel having a touch panel pen writing member on the surface thereof, and a touch panel pen, which satisfies the requirement C1-1.

[13] A touch panel pen writing member having a surface that satisfies the requirement C1-1.

[14] A touch panel including a writing member on a surface, wherein a touch panel pen writing member according to the above [13] is placed as the writing member such that the side that satisfies the requirement C1-1 provides the surface of the touch panel.

[15] A display device having a touch panel on a display component, wherein the touch panel is a touch panel according to the above [14].

Advantageous Effects of Invention

The method for selecting a touch panel pen writing member according to the present invention can select a writing member that secures a high-level writing feel even when a writing test with a touch panel pen is not carried out, and can enhance the efficiency for product design and quality management of writing members. In addition, the touch panel system, the touch panel pen writing member, the touch panel and the display device of the present invention can secure a high-level writing feel.

BRIEF DESCRIPTION OF DRAWINGS

FIG. 1 is a cross-sectional view showing one embodiment of a touch panel pen writing member of the present invention.

FIG. 2 is a cross-sectional view showing another embodiment of a touch panel pen writing member of the present invention.

FIG. 3 is an outline view for explaining a method for measuring a friction force.

FIG. 4 includes views for explaining a method for calculating a diameter D of a touch panel pen.

FIG. 5 is a view for explaining a method for calculating an average tilt angle θa.

FIG. 6 is a cross-sectional view showing one embodiment of a touch panel of the present invention.

FIG. 7 is a cross-sectional view showing another embodiment of a touch panel of the present invention.

FIG. 8 is a graph showing one example of a friction force change every 20 msec in writing with a pencil on paper.

FIG. 9 is a graph showing one example of a friction force change every 1 msec in writing with a pencil on paper.

FIG. 10 is a graph showing one example of a friction force change every 1 msec in writing with a touch panel pen on the touch panel pen writing member of Example C1 of the embodiment C.

FIG. 11 is a graph showing one example of a friction force change every 1 msec in writing with a touch panel pen on the touch panel pen writing member of Example C2 of the embodiment C.

FIG. 12 is a graph showing one example of a friction force change every 1 msec in writing with a touch panel pen on the touch panel pen writing member of Comparative Example C1 of the embodiment C.

FIG. 13 is a graph showing one example of a friction force change every 1 msec in writing with a touch panel pen on the touch panel pen writing member of Comparative Example C2 of the embodiment C.

FIG. 14 is a graph showing one example of a friction force change every 1 msec in writing with a touch panel pen on the touch panel pen writing member of Comparative Example C3 of the embodiment C.

DESCRIPTION OF EMBODIMENTS

Hereinafter, examples of an embodiment A, an embodiment B and an embodiment C of the method for selecting a touch panel pen writing member, the touch panel system, the touch panel pen writing member, the touch panel and the display device of the present invention are described.

Embodiment A

[Method for Selecting Touch Panel Pen Writing Member]

A method for selecting a touch panel pen writing member of an embodiment A includes selecting a writing member satisfying the following requirement A1-1 as the touch panel pen writing member.

<Requirement A1-1>

An average of kinetic friction force and an average of residual friction force obtained below satisfy a relationship: 0.45<average of residual friction force/average of kinetic friction force;

wherein a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force in the movement direction given to the touch panel pen is measured at intervals of 0.001 seconds, and an average of the kinetic friction forces obtained every 0.001 second is calculated and designated as an average of kinetic friction force; and after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees, in this state, the residual friction force in the movement direction given to the touch panel pen is measured at intervals of 0.001 seconds, and an average of the residual friction forces obtained every 0.001 second is calculated and designated as an average of residual friction force.

60 degrees means that, when a direction parallel to the surface of a touch panel pen writing member is 0 degree, a touch panel pen is inclined by 60 degrees relative to the surface of the touch panel pen writing member.

FIG. 1 and FIG. 2 each are a cross-sectional view showing one embodiment of a touch panel pen writing member 10 of the embodiment A. The touch panel pen writing member 10 of FIG. 1 and FIG. 2 has a resin layer 2 on one side of the substrate 1.

Of the touch panel pen writing member of the embodiment A, one surface may satisfy the requirement A1-1, or both surfaces may satisfy the requirement A1-1.

Hereinunder the touch panel pen writing member may be referred to as "writing member", and the surface satisfying the requirement A1-1 may be referred to as "writing surface A".

<Writing Surface A>

The method for selecting a touch panel pen writing member of the embodiment A includes selecting a writing member having a surface that satisfies the requirement A1-1 as the touch panel pen writing member. Hereinunder the technical idea of designing the requirement A1-1 is described.

In writing letters or drawing figures, writing or drawing is stopped for a moment and then again started in many cases. For example, in changing the writing direction, in general, writing is stopped for a moment and then the writing direction is changed. In restarting writing after once stopped for a moment, it is considered that a static friction force would be significantly associated with the writing feel, but as a result of investigations made by the present inventors, any sufficient correlation is not seen in some cases between the two.

The "average of residual friction force (hereinafter this may be referred to as "$F_{re}$")" in the requirement A1-1 indicates the friction force in the movement direction given to the touch panel pen in the state where, after the movement of the writing member has completed, the loading condition to the touch panel pen and the contact condition of the writing member to the touch panel are kept maintained as such. $F_{re}$ is considered to indicate the easiness in stopping the nib in stopping writing for a moment, and the critical force necessary in restarting the touch panel pen. In other words, $F_{re}$ is considered to have a significant influence on the writing feel in the motion of stopping writing for a moment and in the motion of restarting writing (hereinafter this may be referred to as "writing feel in restarting"). However, mere control of $F_{re}$ could not often provide a sufficient writing feel at restarting.

The present inventors have assiduously studied the above and, as a result, have found that human beings can keep a feeling just before a series of motions they have taken, and consequently, the writing feel in restarting after stopping writing for a moment may be significantly influenced by the kinetic friction force just before the restarting. With that, the present inventors have found that, by associating $F_{re}$ and a kinetic friction force, the writing feel in restarting can be bettered and eventually a high-level writing feel can be attained.

The requirement A1-1 requires that the relational expression between $F_{re}$ and an average of kinetic friction force (hereinafter this may be referred to as "$F_k$"), "$F_{re}/F_k$" is more than 0.45.

$F_{re}/F_k$ of 0.45 or less means that $F_{re}$ is too small relative to $F_k$. In this case, a motion of controlling the driving force of a pen to be around 0 in stopping writing would be extremely difficult so that the nib could hardly stop or the pen would likely slip, that is, the writing direction could not be controlled or changed to the intended position and direction. Consequently, in the case where $F_{re}/F_k$ is 0.45 or less, the writing feel in restarting could not be bettered, and a high-level writing feel could not be attained.

When $F_{re}/F_k$ is too large, the load at restarting after once stopping writing for a moment would feel heavy. Consequently, from the viewpoint of bettering the writing feel at restarting, in the requirement A1-1, $F_{re}/F_k$ is preferably 0.60 or more and 1.50 or less, more preferably 0.65 or more and 1.40 or less, even more preferably 0.90 or more and 1.35 or less.

Preferably, the method for selecting a touch panel pen writing member of the embodiment A includes selecting a touch panel pen writing member that further satisfies the following requirement A1-2. Satisfying the requirement A1-2, the writing feel at restarting can be bettered more than that to be attained by satisfying the requirement A1-1.

<Requirement A1-2>

The average of residual friction force is 1.0 gf or more and 25.0 gf or less.

More preferably, the average of residual friction force ($F_{re}$) is 1.5 gf or more and 23.0 gf or less, even more preferably 2.0 gf or more and 20.0 gf or less.

Preferably, the method for selecting a touch panel pen writing member of the embodiment A includes selecting a touch panel pen writing member that further satisfies the following requirement A1-3. Satisfying the requirement A1-3, the writing feel in continuous writing can be bettered, and the nib can be prevented from being worn.

<Requirement A1-3>

The average of kinetic friction force is 1.0 gf or more and 32.0 gf or less.

More preferably, the average of kinetic friction force ($F_k$) is 2.0 gf or more and 25.0 gf or less, even more preferably 2.5 gf or more and 15.0 gf or less.

Preferably, the method for selecting a touch panel pen writing member of the embodiment A includes selecting a touch panel pen writing member that further satisfies the following requirement A1-4. Satisfying the requirement A1-4, the writing feel in continuous writing can be bettered, and the nib can be prevented from being worn.

<Requirement A1-4>

The standard deviation of kinetic friction force is 0.5 gf or more and 18.0 gf or less.

The standard deviation of kinetic friction force (hereinafter this may be referred to as "$\sigma F_k$") is calculated from the kinetic friction forces measured every 0.001 seconds. $\sigma F_k$ is more preferably 0.7 gf or more and 10.0 gf or less, even more preferably 1.0 gf or more and 5.0 gf or less.

In the embodiment A, 15 samples are measured each once for $F_{re}$ and $F_k$, and the resultant data are averaged to give an average value. Also in the embodiment A, for $F_{re}/F_k$, 15 samples are measured each once to calculate $F_{re}/F_k$ of each sample, and the data of 20 samples are averaged to give an average value of $F_{re}/F_k$. In the embodiment A, 60 samples are measured each once for $\sigma F_k$ to give a standard deviation of $\sigma F_k$.

FIG. 3 is an outline view for explaining a method for measuring kinetic friction force and residual friction force.

In FIG. 3, a touch panel pen 200 is secured by a holder 84 while kept in contact with a writing member 10. A stand 85 for holding a weight 83 thereon is attached to the top of the holder 84. A weight 83 is put on the stand 85, by which a vertical load is applied to the touch panel pen. The writing member 10 is secured on a movable bed 82.

In measuring a friction force, the movable bed 82 on which the writing member 10 is secured is, while the touch panel pen is kept secured as above, moved at a predetermined speed toward the acute-angle direction of the angle formed by the writing member and the touch panel pen (in the right-hand direction of FIG. 3). At this time, the touch panel pen 200 receives a kinetic friction force in the movement direction of the movable bed 82, and the kinetic friction force at each time can be calculated. In addition, a residual friction force of a friction force after completion of the movement of the writing member 10 can also be measured.

An apparatus that enables the measurement as shown in FIG. 3 includes HEIDON-18L and HEIDON-14DR, trade names by Shinto Scientific Co., Ltd.

In the embodiment A and in the embodiment B to be mentioned hereinunder, preferably, friction force-related parameters such as $F_k$, $\sigma F_k$, and $F_{re}$ are measured according to the following (A) to (E).

(A) Zero (0) Point Correction

A touch panel pen is secured in a state of being in contact with the surface of a touch panel pen writing member at an angle of 60 degrees, and a vertical load of 100 gf is applied to the touch panel pen. Kept in the state (not moving the writing member), this is left to stand as such for 100 msec, and the friction force generated in the acute-angle direction of the touch panel pen is measured at intervals of 0.001 seconds. A maximum value of the friction force during the measurement time of 1 msec to 100 msec is subtracted from the total measured values of friction force (all the measured values of friction force from the friction force at 1 msec to the friction force at the end of the measurement of residual friction force) is processed for zero (0) point correction as a friction force at each time. (C) to (E) to be mentioned below are calculated on the basis of the friction force processed for zero (0) point correction.

(B) Measurement Time

Three times the standard deviation of the friction force for a measurement time of 1 msec to 100 msec before zero (0) point correction is referred to as "threshold value". After left to stand for 100 msec in the above (A) and additionally as such for 500 msec, the movable bed with the writing member secured thereon is moved toward the acute-angle direction of the angle formed by the writing member and the touch panel pen, at a speed of 14 mm/second, and the friction force in the acute-angle direction of the touch panel pen is measured at intervals of 0.001 seconds. The time at which the measured friction force has first exceeded the threshold value after the start of the movement of the writing member is referred to as a time of "measurement start".

(C) Maximum Friction Force $F_{max}$

From the maximum friction force within 1,500 msec from the measurement start, the maximum friction force $F_{max}$ is calculated.

(D) Kinetic Friction Force

The time at which the maximum friction force $F_{max}$ is given is referred to as a first peak time.

An average of friction force from the start time of actual measurement to the end time of movement of the writing member for a length of 40 mm is referred to a temporary average friction force. After the lapse of 30 msec from the first peak time, the time at which a friction force more than [temporary average friction force+(maximum friction force×0.1)] has been generated for the first time is referred to as a second peak time.

The time after the lapse of 500 msec from the second peak time is referred to as a measurement start time for kinetic friction force, and the time at which the movement of the writing member for a length of 40 mm has completed is referred to as a measurement end time for kinetic friction force, and based on these, the kinetic friction force at each time is measured, and an average of kinetic friction force ($F_k$), and a standard deviation of kinetic friction force ($\sigma F_k$) can be calculated. (E) Residual friction force After completion of the movement of the writing member in one direction for a length of 40 mm, while the vertical load 100 gf given to the touch panel pen is kept as such, the touch panel pen is kept in contact with the surface of the touch panel pen writing member at an angle of 60 degrees to the surface thereof. In this state, the friction force (residual friction force) in the acute-angle direction given to the touch panel pen is measured. Regarding the measurement time for the residual friction force, the time after a lapse of 500 msec from the completion of the movement in one direction of the writing member for a length of 40 mm is referred to as a measurement start time, and the time after 400 msec from the measurement start time is referred to a measurement end time. From the residual friction force at each time, an average of residual friction force ($F_{re}$) is calculated.

When a fat or fatty oils (e.g., fingerprint components transferred from human fingers to the surface of a writing member) adhere to the surface of a writing member and to the nib of a touch panel pen, they may have some influence on the friction force. Consequently, it is desirable that the measurement in the embodiments A to C is carried out in such a manner that a fat or fatty oils do not adhere to the surface of a writing member and the nib of a touch panel pen. In the case where a fat or fatty oils adhere to the surface of a writing member and to the nib of a touch panel pen in the embodiments A to C, preferably, the surface of a writing member and the nib of a touch panel pen are degreased within a range not having any negative influence on the shapes and the physical properties of the surface of a writing member and the nib of a touch panel pen, and then the friction force is measured.

The tough panel pen to be used for the judgement of the requirement A1-1 and other requirements is not specifically limited, and can be appropriately selected from commercially-available touch panel pens.

In the case where the material of the nib of the touch panel pen could not engage with the surface roughness of the writing member, the writing member capable satisfying the requirement A1-1 is difficult to design. Consequently, it is desirable that the touch panel pen for use for the judgement of the requirement A1-1 and others has determinate flexibility at the nib thereof. However, when the nib is formed of a flexible material alone, the nib may be worn by the digging parts of the panel film to shorten the lifetime thereof, or the nib could hardly be separated from the roughened surface of the writing member. Consequently, it is desirable that the touch panel pen for use for the judgement for the requirement A1-1 and others has at least two nib regions. Specifically, it is desirable that the nib has at least a deformation-promoting resin (i) and a hardness-imparting region (ii). Preferably, the deformation-promoting region (i) and the hardness-imparting region (ii) exist regularly or randomly in mixture. Examples of the structure where the region (i) and the region (ii) exist in mixture include a porous structure (where air pores are to be the deformation-promoting region (i)), and a structure containing a soft material mixed in a hard material.

Examples of the deformation-promoting region (i) include air pores, voids, and a soft material. Preferably, the soft material has a Young's modulus of 1.0 GPa or less, more preferably 0.6 GPa or less.

The hardness-imparting region (ii) includes a material having a Young's modulus of 1.2 GPa or more. The Young's modulus of the material for the hardness-imparting region (ii) is preferably 2.0 GPa or more, more preferably 2.5 GPa or more. From the viewpoint of preventing the writing member from being worn, the Young's modulus of the material for the hardness-imparting region (ii) is preferably 5.0 GPa or less, more preferably 4.0 GPa or less, even more preferably 3.5 GPa or less.

The ratio by volume of the region (i) to the region (ii) is preferably 98/2 to 70/30, more preferably 95/5 to 75/25, even more preferably 90/10 to 80/20.

The atmosphere for measurement of the Young's modulus E is at a temperature of 23° C.±5° C., and at a humidity of 40 to 65%. Before the start of the measurement of the Young's modulus E, the measurement sample is left to stand in an atmosphere at 23° C.±5° C. and at a humidity of 40 to 65% for 10 minutes or more.

The tip region is within a range of 1.5 mm from the nib of a touch panel pen.

Also preferably, the diameter of the nib of the touch panel pen for use for the judgement for the requirement A1-1 and others is 0.3 to 2.5 mm, more preferably 0.5 to 2.0 mm, even more preferably 0.7 to 1.7 mm.

The diameter D of the nib in the embodiments A to C is calculated on the basis of the photograph of a touch panel pen taken in the vertical direction to the pen holder. FIG. 4 each shows, as a dotted line, an outline of a picture of a touch panel pen taken from the vertical direction side to the pen holder. As shown in FIG. 4(a), a circle is drawn to pass through the top of the photograph without overstepping the photograph, and the diameter of the maximum circle is referred to as the diameter D of the nib. However, as in FIG. 4(b) where the photograph has inclined faces and the angle of the inclination to the pen holder is 40 to 90 degrees, the circle may be drawn to overstep and overlap with the inclines faces.

Preferably, the method for selecting a writing member of the embodiment A includes selecting a touch panel pen writing member that further satisfies the following requirement A2-1.

<Requirement A2-1>

The haze of the writing member is 25.0% or more.

When the haze is 25.0% or more, sparkle (a phenomenon of minor luminance variation appearing in image light) can be readily prevented.

From the viewpoint of preventing sparkle, the haze is more preferably 35.0% or more, even more preferably 45.0% or more. From the viewpoint of preventing reduction in the resolution of display devices, the haze is preferably 90.0% or less, more preferably 70.0% or less, even more preferably 67.0% or less, and further more preferably 60.0% or less.

In measuring the haze and the total light transmittance to be mentioned hereinunder, light is applied to a writing member from the side of the surface opposite to the writing surface A thereof (surface satisfying the requirement A1-1). In the case where both surfaces of the writing member are writing surfaces A, the light incidence surface may be any of the surfaces. In this description, the haze and the total light transmittance each are an average value of the data obtained in measuring 15 samples once for each case.

Preferably, the method for selecting a writing member of the embodiment A includes selecting a touch panel pen writing member that further satisfies the following requirement A2-2.

<Requirement A2-2>

The total light transmittance according to JIS K7361-1: 1997 of the writing member is 87.0% or more.

When the total light transmittance is 87.0% or more, reduction in the luminance of display devices can be prevented.

The total light transmittance is more preferably 88.0% or more, even more preferably 89.0% or more. When the total light transmittance is too high, the requirement A1-1 tends to be hardly satisfied. Consequently, the total light transmittance is preferably 92.0% or less, more preferably 91.5% or less, even more preferably 91.0% or less.

Applying the method for selecting a touch panel pen writing member of the embodiment A, any touch panel suitable for any arbitrary writing member can be selected.

[Touch Panel Pen Writing Member]

The touch panel pen writing member of the embodiment A has a surface satisfying the following requirement A1-1.

<Requirement A1-1>

An average of kinetic friction force and an average of residual friction force obtained below satisfy a relationship: 0.45<average of residual friction force/average of kinetic friction force;

wherein a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force in the movement direction given to the touch panel pen is measured at intervals of 0.001 seconds, and an average of the kinetic friction forces obtained every 0.001 second is calculated and designated as an average of kinetic friction force; and after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees, in this state, the residual friction force in the movement direction given to the touch panel pen is measured at intervals of 0.001 seconds, and an average of the residual friction forces obtained every 0.001 second is calculated and designated as an average of residual friction force.

Preferably, the writing member of the embodiment A satisfies the requirement A1-1 even when a tough panel pen is secured in a state of being in contact with the writing surface A at any other angle than 60 degrees (for example, at any angle within a range of 30 to 75 degrees). In addition, it is also preferable that the requirement A1-1 falls within the above-mentioned range even when the moving speed is any other speed than 14 mm/second (for example, at a speed falling within a range of 0.1 to 100 mm/second).

Preferably, the writing member of the embodiment A satisfies the following requirement A1-2. Satisfying the requirement A1-2, the writing feel at restarting can be bettered more than that to be attained by satisfying the requirement A1-1.

<Requirement A1-2>

The average of residual friction force is 1.0 gf or more and 25.0 gf or less.

Preferably, the writing member of the embodiment A satisfies the following requirement A1-3. Satisfying the requirement A1-3, the writing feel in continuous writing can be bettered, and the nib can be prevented from being worn.

<Requirement A1-3>

The average of kinetic friction force is 1.0 gf or more and 32.0 gf or less.

Preferably, the writing member of the embodiment A satisfies the following requirement A1-4. Satisfying the requirement A1-4, the writing feel in continuous writing can be bettered, and the nib can be prevented from being worn.

<Requirement A1-4>

The standard deviation of kinetic friction force is 0.5 gf or more and 15.0 gf or less.

Preferred ranges of the requirements A1-1 to A1-4 for the writing member of the embodiment A are the same as the preferred ranges of the requirements A1-1 to A1-4 for the method for selecting a touch panel pen writing member described hereinabove.

Preferably, for readily satisfying the requirements A1-1 and others, the writing member of the embodiment A is used as a writing member for a touch panel pen whose nib has at least a deformation-promoting region (i) and a hardness-imparting resin (ii). Specific embodiments of the deformation-promoting region (i) and the hardness-imparting region (ii) are as described hereinabove.

Also preferably, the writing member of the embodiment A is used as a writing member for a touch panel pen whose nib diameter falls within the above-mentioned range.

Preferably, the writing member of the embodiment A satisfies the following requirement A2-1.

<Requirement A2-1>

The haze according to JIS K7136:2000 is 25.0% or more.

Preferably, the writing member of the embodiment A satisfies the following requirement A2-2.

<Requirement A2-2>

The total light transmittance according to JIS K7361-1: 1997 is 87.0% or more.

Preferred ranges of the requirement A2-1 and the requirement A2-2 for the writing member of the embodiment A are the same as the preferred ranges of the requirement A2-1 and the requirement A2-2 for the method for selecting a touch panel pen writing member described hereinabove.

<Overall Configuration of Writing Member>

The touch panel pen writing member of the embodiment A is not specifically limited in point of the configuration thereof so far as at least one surface of the member satisfies the requirement A1-1.

Examples of the configuration of the touch panel pen writing member 10 of the embodiment A include those having a resin layer 2 on a substrate 1 and one surface of the resin layer 2 satisfies the requirement A1-1, as in FIG. 1 and FIG. 2. The resin layer 2 may have a multilayer structure of a first resin layer 2a and a second resin layer 2b, as in FIG. 2.

Though not shown, the configuration of the touch panel pen writing member 10 of the embodiment A may be a single-layered resin layer not having a substrate, or may have any other layer than the substrate and the resin layer, in which the surface of the other layer may satisfy the requirement A1-1. The other layer includes an antistatic layer, and an antifouling layer.

The touch panel pen writing member of the embodiment A and the touch panel pen writing members of the embodiment B and the embodiment C to be mentioned hereinunder may be in a sheet-like form or may be a long sheet coiled in a roll form. The size of the sheet-like form is not specifically limited, but in general, the diagonal size thereof is 2 to 500 inches or so. The width and the length of the roll form are not specifically limited, but in general, the width is 500 to 3,000 mm or so and the length is 500 to 5,000 m or so.

The shape of the sheet-like form is not also specifically limited, and may be polygonal (triangle, square, pentagonal, etc.), or circular, and may also be a random undefined form.

The writing surface A can be formed by "physical or chemical treatment such as embossing, sandblasting, or etching", "molding using a mold", "coating", etc. Among these methods, "molding using a mold" is suitable from the viewpoint of reproducibility of surface shapes, and "coating" is suitable from the viewpoint of productivity and response to multi-itemed production.

In order that the writing member satisfies the requirement A1-1 and others, preferably, the writing surface A of the writing member satisfies the following physical properties (a) to (f).

Cutoff value for calculating Rt, θa and λa to be mentioned later is 0.8 mm. Considering that the diameter of the expected nib is preferably 0.3 to 2.5 mm, more preferably 0.5 to 2.0 mm, further preferably 0.7 to 1.7 mm, the cutoff value is selected as cutoff value which is within the expected range of the diameter, from among cutoff values defined by JIS.

(a) Maximum profile height Rt of a roughness curve of the writing surface A defined in JIS B0601: 2001 is 2.5 μm or more and 8.0 μm or less.

(b) Average tilt angle θa of the writing surface A is 2.0 degrees or more and 10.0 degrees or less.

(c) Average wavelength λa calculated according to the expression $[\lambda a = 2\pi \times (Ra/\tan(\theta a))]$ from the average tilt angle θa and arithmetic average roughness Ra defined in JIS B0601: 2001 is 10 μm or more and 75 μm or less.

(d) The area ratio of particles of the writing surface A is 15.0% or more and 35.0% or less.

(e) The quotient of the λa (μm) and the particle density of the writing surface A of 100 μm square (number of particles/100 μm square) [λa (μm)/particle density (number of particles/100 μm square)] is 14 or more and 1,000 or less.

In this description, the above (a) to (e) each are an average value of the measured values of 15 samples of each writing member.

The physical properties (a) to (e) mean that: the asperities of the writing surface A include asperities having a moderate size without having a large number of exceedingly high peaks and exceedingly low valleys; and the convex parts of the writing surface A are moderately densely packed. By the writing surface A satisfying the physical properties (a) to (e), the kinetic friction force and the residual friction force can be well balanced to readily satisfy the requirement A1-1 and others.

The satisfied physical properties (a) to (e) (that the asperities of the writing surface A include asperities having a moderate size without having a large number of exceedingly high peaks and exceedingly low valleys, and the convex parts of the writing surface A are moderately densely packed) are preferred as leading to prevention of sparkle.

Also preferably, Rt of (a) is 8.0 μm or less, θa of (b) is 10.0 degrees or less, λa of (c) is 75 μm or less, the area ratio of (d) is 15.0% or more, and the quotient of (e) is 1,000 or less, as leading to prevention of wear of nibs of touch panel pens. In particular, when λa of (c) is 75 μm or less and when the quotient of (e) is 1,000 or less, wear of nibs of touch panel pens can be significantly retarded.

Rt of the above (a) is more preferably 2.8 μm or more and 6.0 μm or less, further preferably 3.0 μm or more and 4.5 μm or less.

θa of the above (b) is more preferably 3.0 degrees or more and 8.0 degrees or less, even more preferably 4.0 degrees or more and 7.0 degrees or less.

λa of the above (c) is more preferably 15 μm or more and 50 μm or less, further preferably 20 μm or more and 35 μm or less.

The area ratio of the above (d) is more preferably 18.0% or more and 32.0% or less, further preferably 20.0% or more and 30.0% or less.

The quotient of the above (e) is more preferably 16 or more and 200 or less, further preferably 20 or more and 50 or less.

In the embodiments A to C, the "average tilt angle θa" is a value defined in the manual (revised on Jul. 20, 1995) of a surface roughness tester (trade name: SE-3400) manufactured by Kosaka Laboratory Ltd. and can be determined according to an arc tangent of the sum of variations in the height direction within the reference length L $(h_1+h_2+h_3+ \ldots +h_n)$ as divided by the reference length L, $\theta a = \tan^{-1}\{(h_1+h_2+h_3+ \ldots +h_n)/L\}$, as shown in FIG. 5. In this description, the reference length is divided into 1,500 segments, data in those 1,500 points are determined, and on the basis of the height data in those 1,500 points, the average tilt angle θa is calculated.

The area ratio of particles of the above (d) can be calculated by binarizing a gray scale image using image analysis software from a planar photograph of the writing surface A taken under a scanning electron microscope (SEM), and selecting particle parts. The particle density of the writing surface A of 100 μm square (number of particles/100 μm square) from which the above (e) is calculated can be calculated by counting the number of regions with independent particle parts in the image binarized as mentioned above. Examples of the image analysis software include WinRooF (trade name) manufactured by Mitani Corp.

The "area ratio of particles" and the "particle density of writing surface B of 100 μm square (number of particles/100 μm square)" in the embodiment B can also be calculated in the same manner as above.

In the writing member of the embodiment A, the pencil hardness of the writing surface A defined in JIS K5600-5-4: 1999 is preferably 2H or more and 9H or less, more preferably 3H or more and 7H or less, further preferably 5H or more and 6H or less, from the viewpoint of suppressing the wear of a touch panel pen while improving the scratch resistance of the writing surface A.

The formation of the resin layer by the coating can be performed by applying a resin layer-forming coating liquid containing a resin component, particles and a solvent onto a substrate by an application method known in the art such as gravure coating or bar coating, followed by drying and curing. For easily satisfying the requirement A1-1 and others by the resin layer formed by the coating, it is preferred to set the average particle size of the particles, the content of the particles, and the thickness of the resin layer, etc. to ranges mentioned later.

When the resin layer is constituted by two or more layers as shown in FIG. 2, at least any of the resin layers may contain the particles. It is preferred that an uppermost-surface resin layer should contain the particles, from the viewpoint of easily satisfying the requirement A1-1 and others. Alternatively, the uppermost-surface resin layer may contain the particles while lower resin layer(s) may contain no particles. This configuration can easily improve the pencil hardness of the writing surface A.

Any of organic particles and inorganic particles can be used as the particles of the resin layer. Examples of the organic particles include particles consisting of polymethyl methacrylate, polyacryl-styrene copolymers, melamine resin, polycarbonate, polystyrene, polyvinyl chloride, benzoguanamine-melamine-formaldehyde condensates, silicone, fluorine resin and polyester resin. Examples of the inorganic particles include particles consisting of silica, alumina, antimony, zirconia and titania. Among these particles, organic particles are suitable from the viewpoint of easily suppressing the aggregation of the particles and easily satisfying the requirement A1-1 and others.

The particles are preferably spherical particles from the viewpoint of suppression of nib wear of a touch panel pen.

The average particle size of the particles in the resin layer differs depending on the thickness of the resin layer and therefore, cannot be generalized. The average particle size of the particles is preferably 1.0 to 10.0 μm, more preferably 1.5 to 5.0 μm, further preferably 1.8 to 3.5 μm, from the viewpoint of easily satisfying the requirement A1-1 and others. For aggregated particles, it is preferred that the average particle size of the aggregated particles should satisfy the range described above.

The average particle size of the particles can be calculated by the following procedures (y1) to (y3).

(y1) A transmission observation image of the writing member is taken under an optical microscope at a magnification of preferably ×500 to ×2,000.

(y2) Arbitrary 10 particles are extracted from the observation image, and the particle size of the individual particles are calculated, wherein the particle size is measured as a distance between arbitrary two straight lines combined so as to attain the largest distance between the two straight lines when the cross section of the particle is sandwiched between the two straight lines parallel to each other.

(y3) The same operation as above is performed as to five observation images taken in different fields of view of the same sample, and a number-average particle size from a total of 50 particles is used as the average particle size of the particles in the resin layer.

The particles may have a wide particle size distribution (a wide particle size distribution of single particles or a wide particle size distribution of mixed particles from two or more types of particles differing in particle size distribution). A narrower particle size distribution is more preferred from the viewpoint of preventing sparkle. Specifically, the coefficient of variation of the particle size distribution of the particles is preferably 25% or less, more preferably 20% or less, further preferably 15% or less.

The content of the particles in the resin layer is preferably 10 to 30 parts by mass, more preferably 12 to 25 parts by mass, further preferably 15 to 20 parts by mass, with respect to 100 parts by mass of the resin component from the viewpoint of easily satisfying the requirement A1-1 and others.

The suitable range of the film thickness of the resin layer differs slightly depending on an embodiment of the resin layer. For example, the thickness of the resin layer containing the particles is preferably 2.0 to 8.0 µm, more preferably 2.2 to 6.0 µm, further preferably 2.5 to 4.0 µm, from the viewpoint of easily satisfying the requirement A1-1 and others, from the viewpoint of improving the pencil hardness of the writing surface A, and from the viewpoint of suppressing curl.

The ratio of [the average particle size of the particles]/[the film thickness of the resin layer containing the particles] is preferably 0.7 to 1.3, more preferably 0.8 to 1.2, further preferably 0.8 to 1.0, from the viewpoint of easily satisfying the requirement A1-1 and others.

It is preferred that a resin layer containing no particles should be positioned nearer the substrate than the resin layer containing the particles. Its thickness is preferably 3.0 to 15.0 µm, more preferably 6.0 to 10.0 µm, from the viewpoint of improving the pencil hardness of the writing surface A and from the viewpoint of suppressing curl.

In the embodiments A to C, the film thickness of the resin layer can be calculated, for example, from an average value of thicknesses at 20 locations measured from a cross-sectional image taken using a scanning transmission electron microscope (STEM). The accelerating voltage of STEM is preferably 10 kV to 30 kV, and the magnification of STEM is preferably ×1,000 to ×7,000.

The resin component of the resin layer preferably contains a cured product of a thermosetting resin composition or an ionizing radiation-curable resin composition and more preferably contains a cured product of an ionizing radiation-curable resin composition, further preferably a cured product of an ultraviolet-curable resin composition, from the viewpoint of improving the pencil hardness of the writing surface A.

The thermosetting resin composition is a composition containing at least a thermosetting resin and is a resin composition that is cured by heating.

Examples of the thermosetting resin include acrylic resin, urethane resin, phenol resin, urea melamine resin, epoxy resin, unsaturated polyester resin, and silicone resin. The thermosetting resin composition is supplemented with a curing agent, if necessary, in addition to the curable resin.

The ionizing radiation-curable resin composition is a composition containing a compound having an ionizing radiation-curable functional group (hereinafter, also referred to as an "ionizing radiation-curable compound"). Examples of the ionizing radiation-curable functional group include: ethylenic unsaturated bond groups such as (meth)acryloyl group, a vinyl group, and an allyl group; and an epoxy group and an oxetanyl group. The ionizing radiation-curable compound is preferably a compound having an ethylenic unsaturated bond group, more preferably a compound having two or more ethylenic unsaturated bond groups, further preferably a polyfunctional (meth)acrylate compound having two or more ethylenic unsaturated bond groups. Any of monomers and oligomers can be used as the polyfunctional (meth)acrylate compound.

The ionizing radiation means an electromagnetic wave or a charged particle radiation having the quantum of energy capable of polymerizing or cross-linking molecules. Usually, ultraviolet ray (UV) or electron beam (EB) is used. Alternatively, an electromagnetic wave such as X-ray or γ-ray or a charged particle radiation such as α-ray or ion beam may be used.

Among the polyfunctional (meth)acrylate compounds, examples of the difunctional (meth)acrylate monomer include ethylene glycol di(meth)acrylate, bisphenol A tetraethoxy diacrylate, bisphenol A tetrapropoxy diacrylate, and 1,6-hexanediol diacrylate.

Examples of the trifunctional or higher (meth)acrylate monomer include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

The (meth)acrylate monomer may have a partially modified molecular skeleton. The (meth)acrylate monomer used can be modified with ethylene oxide, propylene oxide, caprolactone, isocyanuric acid, alkyl, cyclic alkyl, an aromatic compound, bisphenol, or the like.

Examples of the polyfunctional (meth)acrylate oligomer include acrylate polymers such as urethane (meth)acrylate, epoxy (meth)acrylate, polyester (meth)acrylate, and polyether (meth)acrylate.

The urethane (meth)acrylate is obtained, for example, through the reaction of a polyhydric alcohol and organic diisocyanate with hydroxy (meth)acrylate.

The epoxy (meth)acrylate is preferably (meth)acrylate obtained by reacting trifunctional or higher aromatic epoxy resin, alicyclic epoxy resin, aliphatic epoxy resin, or the like with (meth)acrylic acid, (meth)acrylate obtained by reacting difunctional or higher aromatic epoxy resin, alicyclic epoxy resin, aliphatic epoxy resin, or the like with polybasic acid and (meth)acrylic acid, or (meth)acrylate obtained by reacting difunctional or higher aromatic epoxy resin, alicyclic epoxy resin, aliphatic epoxy resin, or the like with a phenol and (meth)acrylic acid.

These ionizing radiation-curable compounds can be used alone or in combination of two or more.

When the ionizing radiation-curable compound is an ultraviolet-curable compound, the ionizing radiation-curable composition preferably contains an additive such as a photopolymerization initiator or a photopolymerization accelerator.

The photopolymerization initiator is one or more members selected from the group consisting of acetophenone, benzophenone, α-hydroxyalkylphenone, Michler's ketone, benzoin, benzyl methyl ketal, benzoyl benzoate, α-acyloxime ester, thioxanthones, and the like.

The melting point of the photopolymerization initiator is preferably 100° C. or higher. When the melting point of the photopolymerization initiator is 100° C. or higher, a residual photopolymerization initiator is sublimated in the course of production of the writing member or in the course of formation of a transparent conductive film of a touch panel. Thus, the contamination of the production apparatus or the transparent conductive film can be prevented.

The photopolymerization accelerator can reduce the inhibition of polymerization by air during curing and accelerate a curing rate. The photopolymerization accelerator is, for example, one or more members selected from the group consisting of p-dimethylaminobenzoic acid isoamyl ester, p-dimethylaminobenzoic acid ethyl ester, and the like.

In the resin layer-forming coating liquid, a solvent is usually used for adjusting a viscosity or for allowing each component to be dissolved or dispersed. The surface state of the resin layer after application and drying differs depending on the type of the solvent. Therefore, it is preferred to select the solvent in consideration of the saturated vapor pressure of the solvent, the permeability of the solvent into a transparent substrate, etc. Specifically, examples of the solvent can include ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halocarbons (dichloromethane, dichloroethane, etc.), esters (methyl acetate, ethyl acetate, butyl acetate, etc.), alcohols (butanol, cyclohexanol, etc.), cellosolves (methyl cellosolve, ethyl cellosolve, etc.), cellosolve acetates, sulfoxides (dimethyl sulfoxide, etc.), and amides (dimethylformamide, dimethylacetamide, etc.). A mixture thereof may be used.

When the drying of the solvent is too slow, it is difficult to form a surface shape that easily satisfies the requirement A1-1 and others due to excessive leveling properties of the resin layer. Thus, for the solvent, it is preferred that a solvent having an evaporation rate (relative evaporation rate to the evaporation rate of n-butyl acetate defined as 100) of 180 or more should be contained at 70% by mass or more, more preferably 80% by mass or more, in all solvents. Examples of the solvent having a relative evaporation rate of 180 or more include toluene. The relative evaporation rate of toluene is 195. On the other hand, examples of the solvent having a relative evaporation rate of less than 180 include methyl isobutyl ketone (MIBK), propylene glycol monomethyl ether acetate (PMA), and isopropyl alcohol (IPA).

It is preferred that the resin layer-forming coating liquid should contain a leveling agent, from the viewpoint of rendering the surface shape moderately smooth and easily adjusting the surface shape of the writing member to the range mentioned above. Examples of the leveling agent include fluorine leveling agents, silicone leveling agents, and fluorine-silicone copolymer leveling agents. The amount of the leveling agent added is preferably 0.01 to 0.50% by weight, more preferably 0.10 to 0.40% by weight, further preferably 0.20 to 0.30% by mass, with respect to the total solid content of the resin layer-forming coating liquid.

A transparent substrate is preferred, including a plastic film and glass. A plastic film is preferred as the substrate.

The plastic film can be formed from a resin such as polyester, triacetyl cellulose (TAC), cellulose diacetate, cellulose acetate butyrate, polyamide, polyimide, polyether sulfone, polysulfone, polypropylene, polymethylpentene, polyvinyl chloride, polyvinyl acetal, polyether ketone, polymethyl methacrylate, polycarbonate, polyurethane and cyclo-olefin-polymer (COP).

Among these plastic films, a polyester film processed by orienting, particularly, biaxial orienting, is preferred from the viewpoint of mechanical strength and dimensional stability and from the viewpoint of easily satisfying the physical property (f). The polyester film is preferably polyethylene terephthalate or polyethylene naphthalate.

The thickness of the substrate is preferably 5 to 200 μm, more preferably 10 to 150 μm.

[Touch Panel]

The touch panel of the embodiment A is a touch panel including a writing member on a surface, wherein a touch panel pen writing member according to the embodiment A is placed as the writing member such that the side that satisfies the requirement A1-1 provides the surface of the touch panel.

Examples of the touch panel include resistive touch panels, capacitive touch panels, in-cell touch panels, optical touch panels, ultrasonic touch panels and electromagnetic touch panels.

A resistive touch panel 100, as shown in FIG. 6, is prepared by connecting a circuit (not shown) to a basic configuration in which a pair of transparent substrates 20 (upper and lower transparent substrates) having conductive films 30 are placed via a spacer 40 such that the conductive films 30 face each other.

Examples of the resistive touch panel include the writing member 10 of the embodiment A used as the upper transparent substrate 20 in such a manner that the side that satisfies the requirement A1-1 in the writing member 10 faces the surface of the touch panel 100. Although not shown, the resistive touch panel may have a configuration in which the writing member of the embodiment A is laminated on the upper transparent substrate such that the side that satisfies the requirement A1-1 faces the surface, or a configuration in which the writing member of the embodiment A is placed on the upper transparent substrate such that the side that satisfies the requirement A1-1 faces the surface, and the writing member is fixed using a frame or the like.

Examples of the capacitive touch panel include surface capacitive touch panels and projected capacitive touch panels. Projected capacitive touch panels are often used. The projected capacitive touch panel is prepared by connecting a circuit to a basic configuration in which an X-axis electrode and a Y-axis electrode that intersects the X-axis electrode are placed via an insulator. More specifically, examples of the basic configuration include a form in which the X-axis electrode and the Y-axis electrode are formed on separate sides of one transparent substrate, a form in which the X-axis electrode, the insulator layer, and the Y-axis electrode are formed in this order on one transparent substrate, and a form as shown in FIG. 7 in which: an X-axis electrode 50 is formed on a transparent substrate 20; an Y-axis electrode 60 is formed on another transparent substrate 20; and these are laminated via an insulator layer 70 such as an adhesive layer. Another example thereof includes a form in which an additional transparent substrate is further laminated on any of these basic forms.

Examples of the configuration of the capacitive touch panel include a configuration in which the writing member of the embodiment A is used as the transparent substrate 20 on the surface side such that the side that satisfies the requirement A1-1 in the writing member 10 faces the surface of the touch panel 100. Although not shown, the capacitive touch panel may have a configuration in which the writing member of the embodiment A is laminated on the transparent substrate on the surface side such that the side that satisfies the requirement A1-1 faces the surface, or a configuration in which the writing member of the embodiment A is placed on the transparent substrate on the surface side such that the side that satisfies the requirement A1-1 faces the surface, and the writing member is fixed using a frame or the like.

The electromagnetic touch panel is a touch panel that employs a dedicated pen generating a magnetic field. The electromagnetic touch panel has at least a sensor unit which detects electromagnetic energy generated from the pen and further has a transparent substrate on the sensor unit. The transparent substrate may have a multilayer structure.

Examples of the configuration of the electromagnetic touch panel include a configuration in which the writing member of the embodiment A is used as an uppermost-surface transparent substrate among the transparent substrates positioned on the sensor unit such that the side that satisfies the requirement A1-1 in the writing member faces the surface of the touch panel. Alternatively, the electromagnetic touch panel may have a configuration in which the writing member of the embodiment A is laminated on the uppermost-surface transparent substrate among the transparent substrates positioned on the sensor unit such that the side that satisfies the requirement A1-1 faces the surface, or a configuration in which the writing member of the embodiment A is placed on the uppermost-surface transparent substrate such that the side that satisfies the requirement A1-1 faces the surface, and the writing member is fixed using a frame or the like.

The in-cell touch panel has, for example, resistive, capacitive, or optical touch panel functions incorporated inside a liquid-crystal component prepared by sandwiching liquid crystals between two glass substrates.

The in-cell touch panel includes the writing member of the embodiment A placed on the glass substrate on the surface side such that the side that satisfies the requirement A1-1 faces the surface of the touch panel. The in-cell touch panel may have an additional layer such as a polarizer between the glass substrate on the surface side and the writing member of the embodiment A.

[Touch Panel System]

The touch panel system of the embodiment A is a touch panel system including a touch panel having a touch panel pen writing member on the surface thereof, and a touch panel pen, which satisfies the following requirement A1-1.
<Requirement A1-1>

An average of kinetic friction force and an average of residual friction force obtained below satisfy a relationship: 0.45<average of residual friction force/average of kinetic friction force;

wherein a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force in the movement direction given to the touch panel pen is measured at intervals of 0.001 seconds, and an average of the kinetic friction forces obtained every 0.001 second is calculated and designated as an average of kinetic friction force; and after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees, in this state, the residual friction force in the movement direction given to the touch panel pen is measured at intervals of 0.001 seconds, and an average of the residual friction forces obtained every 0.001 second is calculated and designated as an average of residual friction force.

In the touch panel system of the embodiment A, examples of the embodiments of the touch panel, the touch panel pen writing member, and the touch panel pen include the same as the embodiments shown in the aforementioned method for selecting a touch panel pen writing member, the touch panel pen writing member and the touch panel of the embodiment A.

The touch panel system of the embodiment A can better the writing feel at restarting and eventually can impart a high-level writing feel to the touch panel.
[Display Device With Touch Panel]

A display device having a touch panel of the embodiment A is a display device having a touch panel on a display component, wherein the touch panel is the touch panel of the embodiment A.

Examples of the display component include liquid-crystal display components, EL display components, plasma display components, and electronic paper components. When the display component is a liquid-crystal display component, an EL display component, a plasma display component, or an electronic paper component, the touch panel of the embodiment A is placed on this display component.

The display device with a touch panel of the embodiment A can better the writing feel at restarting and eventually can impart a high-level writing feel to the touch panel.

The method for selecting a touch panel pen writing member of the embodiment A can select a writing member that secures a high-level writing feel even when a writing test with a touch panel pen is not carried out, and can enhance the efficiency for product design and quality management of writing members. In addition, the touch panel system, the touch panel pen writing member, the touch panel and the display device of the embodiment A can secure a high-level writing feel.

Embodiment B

[Method for Selecting Touch Panel Pen Writing Member]

A method for selecting a touch panel pen writing member of an embodiment B includes selecting a writing member satisfying the following requirement B1-1 and requirement B1-2 as the touch panel pen writing member.
<Requirement B1-1>

When a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the friction force in the movement direction given to the touch panel pen is measured at intervals of 0.001 seconds, an average of the kinetic friction forces obtained every 0.001 second is calculated, and a standard deviation of the kinetic friction force is calculated, the standard deviation is 2.0 gf or more and 15.0 gf or less.
<Requirement B1-2>

The time rate of the time at which the kinetic friction force of 3.0 gf or less is exhibited based on the total measurement time for the kinetic friction force is 15% or more and 90% or less.

60 degrees means that, when a direction parallel to the surface of a touch panel pen writing member is 0 degree, a touch panel pen is inclined by 60 degrees relative to the surface of the touch panel pen writing member.

FIG. 1 and FIG. 2 each are a cross-sectional view showing one embodiment of a touch panel pen writing member 10 of the embodiment B. The touch panel pen writing member 10 of FIG. 1 and FIG. 2 has a resin layer 2 on one side of the substrate 1.

Of the touch panel pen writing member of the embodiment B, one surface may satisfy the requirement B1-1 and the requirement B1-2, or both surfaces may satisfy the requirement B1-1.

Hereinunder the touch panel pen writing member may be referred to as "writing member", and the surface satisfying the requirement B1-1 and the requirement B1-2 may be referred to as "writing surface B".

<Writing Surface B>

The method for selecting a touch panel pen writing member of the embodiment B includes selecting a writing member having a surface that satisfies the requirement B1-1 and the requirement B1-2 as the touch panel pen writing member. Hereinunder the technical idea of designing the requirement B1-1 and the requirement B1-2 is described.

First described is the technical idea of designing the requirement B1-1.

The requirement B1-1 is a parameter as to kinetic friction force. Small kinetic friction force makes a writing feel slippery and cannot produce a high level of writing feel. In other words, a predetermined level of kinetic friction force is probably important for obtaining a high level of writing feel.

The present inventors have further conducted studies on the relationship between writing feel and kinetic friction force and consequently found that even if the predetermined level of kinetic friction force is present, persons perceive a slippery feel in the absence of time-dependent change in kinetic friction force. The present inventors have further conducted studies and consequently found that persons perceive change in friction at surprisingly short intervals.

Each of FIGS. 8 and 9 shows one example of kinetic friction force at each point in time upon pencil writing on paper. In FIG. 8, the kinetic friction force is measured every 20 msec. In FIG. 9, the kinetic friction force is measured every 1 msec. The ordinates of FIGS. 8 and 9 depict the kinetic friction force, and the horizontal axes thereof depict the time (msec). The measurement conditions for the kinetic friction force shown in FIGS. 8 and 9 involve a load of 100 gf and a writing rate of 14 mm/s.

From the comparison between FIGS. 8 and 9, it can be confirmed that the amplitude of the kinetic friction force differs largely depending on difference in measurement intervals. This is probably because of the influence of fiber pitch of the paper surface. Specifically, this is probably because the number of climbs of a pencil over the paper fibers varies largely among the runs of the measurement at 1-msec (0.001-second) intervals, whereas the number of climbs of the pencil over the paper fibers less varies among the runs of the measurement at 20-msec (0.02-second) intervals. In other words, it is considered that the measurement at 1-msec intervals exhibits large variations due to non-averaged values, whereas the measurement at 20-msec intervals exhibit small variations due to averaged values.

As a result of preparing various writing members, conducting the same measurement as above, and comparing the results with sensory evaluation (writing feel perceived by persons), the present inventors have found that, surprisingly, persons can recognize variations in friction force at intervals as very short as 1-msec intervals, as writing feel.

The condition B1-1 requires that a standard deviation ($\sigma F_k$) of kinetic friction force calculated from results of measuring friction force at 0.001-second intervals under the predetermined conditions is 2.0 gf or more and 15.0 gf or less.

If $\sigma F_k$ is less than 2.0 gf, persons perceive a slippery writing feel because the time-dependent change in kinetic friction force is small. Thus, a high level of writing feel cannot be obtained.

If $\sigma F_k$ exceeds 15.0 gf, persons perceive heavy feeling in the movement of a touch panel pen or feel the nib caught on. Thus, a high level of writing feel cannot be obtained. Furthermore, if $\sigma F_k$ exceeds 15.0 gf, the nib of a touch panel pen tends to be heavily worn.

In the requirement B1-1, $\sigma F_k$ is preferably 2.0 gf or more and 10.0 gf or less, more preferably 2.1 gf or more and 7.0 gf or less, even more preferably 2.2 gf or more and 5.0 gf or less.

Next, the technical idea of the design of the requirement B1-2 will be described.

Satisfying the requirement B1-1, good writing feel is easy to attain in writing with a pencil on paper. However, for attaining "a high-level writing feel" over the writing feel in writing with a pencil on paper, the requirement B1-1 alone is insufficient.

The present inventors further made investigations relating to writing feel. As a result, the inventors found that, even though satisfying the requirement B1-1, some writing members often cause hand fatigue in long-term writing operation. Given the situation, the present inventors compared writing members easily causing hand fatigue and writing members hardly causing hand fatigue, and found that there is a difference in an hourly kinetic friction force variation pattern between the two. Specifically, the inventors have found that the hourly kinetic friction force of the writing member that easily causes hand fatigue repeatedly increases before the kinetic friction force thereof lowers to a value close to 0 gf, as in FIG. 9, while on the other hand, the hourly kinetic friction force of the writing member that hardly causes hand fatigue repeatedly increases after the kinetic friction force thereof has lowered to a value close to 0 gf.

From the above-mentioned findings, the present inventors have found that when the kinetic friction force of a writing member has lowered instantaneously to 3.0 gf or less, the writing member can attain "a high-level writing feel" over the writing feel in writing with a pencil on paper without experiencing any hand fatigue even in long-term writing thereon.

The requirement B1-2 is to require that the time rate (T) of the time at which the kinetic friction force of 3.0 gf or less is exhibited based on the total measurement time for the kinetic friction force is 15% or more and 90% or less.

When the time rate is less than 15%, the time rate to feel friction during writing increases, therefore resulting in hand fatigue in long-term writing. On the other hand, when the time rate is more than 90%, a sliding feel may be given during writing, and a high-level writing feel cannot be attained.

In the requirement B1-2, the time rate of the time at which the kinetic friction force of 3.0 gf or less is exhibited is preferably 20% or more and 85% or less, more preferably 30% or more and 80% or less, and even more preferably 50% or more and 75% or less.

Preferably, the method for selecting a writing member of the embodiment B includes selecting one that further satisfies the following requirement B1-3. Satisfying the requirement B1-3, the writing feel can be bettered more, and nib wear can be prevented readily.

<Requirement B1-3>

The average of kinetic friction force is 2.2 gf or more and 20.0 gf or less.

More preferably, the average of kinetic friction force ($F_k$) is 2.3 gf or more and 10.0 gf or less, even more preferably 2.5 gf or more and 7.5 gf or less.

Preferably, the method for selecting a writing member of the embodiment B includes selecting one that further satisfies the following requirement B1-4. Satisfying the requirement B1-3, the writing feel can be bettered more readily.

<Requirement B1-4>

The maximum value of kinetic friction force is 35.0 gf or less.

More preferably, the maximum value of kinetic friction force ($F_{kmax}$) is 25.0 gf or less, even more preferably 20.0 gf or less.

In the embodiment B, the above-mentioned $\sigma F_k$, the time rate, $F_k$, $F_{kmax}$, and other friction-related parameters each are an average value of data obtained from 15 writing member samples.

FIG. 3 is an outline view for explaining a method for measuring friction force.

In FIG. 3, a touch panel pen 200 is secured by a holder 84 while kept in contact with a writing member 10. A stand 85 for holding a weight 83 thereon is attached to the top of the holder 84. A weight 83 is put on the stand 85, by which a vertical load is applied to the touch panel pen. The writing member 10 is secured on a movable bed 82.

In measuring a friction force, the movable bed 82 on which the writing member 10 is secured is, while the touch panel pen is kept secured as above, moved at a predetermined speed toward the acute-angle direction of the angle formed by the writing member and the touch panel pen (in the right-hand direction of FIG. 3). At this time, the touch panel pen 200 receives a kinetic friction force in the movement direction of the writing member 10, and the kinetic friction force at each time can be calculated.

An apparatus that enables the measurement as shown in FIG. 3 includes HEIDON-14DR, a trade name by Shinto Scientific Co., Ltd.

In the embodiment B, the friction force-related parameters such as $F_k$, and $\sigma F_k$ can be measured according to the same methods as those described in the section of the embodiment A.

The tough panel pen to be used for the judgement of the requirement B1-1, the requirement B1-2 and other requirements is not specifically limited, and can be appropriately selected from commercially-available touch panel pens.

In the case where the material of the nib region of a touch panel pen is too hard, the writing member may be deformed by the pressure in writing thereon so that a nib of a broader area may readily be brought into contact with the projections of the writing member. Consequently, in moving a pen, the time rate to generate friction force at the nib may increase owing to the increase in the deformation energy of the writing member and to the increase in the number of the projections to be contacted, and therefore the requirement B1-2 could be more hardly satisfied in the case. On the other hand, in the case where the material of the nib region of the touch panel pen is too soft, the projections of the writing member step in the nib to cause nib wear so that the wear time may be shortened, and in addition, the nib may be brought into contact with the recesses of the writing member to increase the time rate of generating friction force at the nib, and as a result, the requirement B1-2 could not be satisfied in the case.

In addition, in the case where the material of the nib region of a touch panel pen is too hard or too soft, the force to be given to the nib in writing greatly differs from the force given to the nib in separating the nib from the surface projections and recesses of the writing member, therefore inducing any unintentional writing. Above all others, the friction force to the pen greatly fluctuates owing to the series of phenomena so that stable writing feel could not be realized.

Consequently, preferably, the touch panel pen is such that "(A) the main ingredient of the material constituting the tip region of the touch panel pen has a predetermined hardness", or "(B) the tip region of the touch panel pen is configured to include a hardness-imparting region (i) and a hardness-retarding region (ii) as mixed".

The tip region is within a range of 1.5 mm from the nib of a touch panel pen.

The material having a predetermined hardness of (A) preferably has a Young's modulus of 0.5 to 5.0 GPa, more preferably 0.5 to 2.0 GPa, even more preferably 0.5 to 1.0 GPa. Preferably, the material having a predetermined hardness accounts for 80% by volume or more in the total volume constituting the tip region more preferably 90% by volume or more.

The structure (B) where a hardness-imparting region (i) and a hardness-retarding region (ii) exist in mixture includes a porous structure (where air pores are to be the hardness-retarding region (ii)), and a structure containing a hard material and a soft material in mixture. The two materials may exist regularly or randomly in mixture.

Preferably, the Young's modulus of the material of the hardness-imparting region (ii) is 1.0 GPa or more, more preferably 1.5 GPa or more. From the viewpoint of preventing the writing member from being worn, the Young's modulus of the material of the hardness-imparting region (ii) is preferably 5.0 GPa or less, more preferably 4.0 GPa or less, even more preferably 3.0 GPa or less.

The ratio by volume of the region (i) to the region (ii) is preferably 2/98 to 30/70, more preferably 5/95 to 25/75, even more preferably 10/90 to 20/80.

The surface profile of the nib of the touch panel pen also has some influence on the requirement B1-1 and the requirement B1-2. Specifically, in the case where the surface profile of the nib of the touch panel pen is rough, the frequency of contact of the nib of the touch panel pen to the projections of the writing member tends to decrease and $\sigma F_k$ to lower while the time rate (T) tends to increase. On the other hand, in the case where the surface profile of the nib of the touch panel pen is smooth, the frequency of contact of the nib of the touch panel pen to the projections of the writing member tends to increase and $\sigma F_k$ to increase while the time rate (T) tends to lower.

The degree of roughness of the nib can be measured, for example, according to the following (1) to (4). When $\sigma \Delta h_n$ calculated according to the following is larger, the nib profile is considered to be rougher.

(1) The surface profile of the nib is transferred to a rapidly curable silicon rubber (manufactured by Marumoto Struers K.K., trade name: Repliset).

(2) The silicon rubber surface onto which the surface profile of the nib has been transferred is photographed with a digital microscope. As the digital microscope, for example, VHX-5000, a trade name by Keyence Corporation can be used.

(3) The outline of the silicon rubber surface on the photograph is simulated as a cross-sectional curve of the surface of the nib, and a cross-sectional curve in a section with an apex of the nib having a width of 100 μm is drawn out from that cross-sectional curve.

(4) A height of the cross-sectional curve having a width of 100 μm is calculated at intervals of 1 μm to give 100 height data. An n'th height data is referred to as $h_n$, and a height expressed by "$|h_n-((h_{n-1}+h_{n+1})/2)|$" is referred to as an anteroposterior shear ($\Delta h_n$) of each height data. A standard deviation of 98 $\Delta h_n$'s ($\sigma\Delta h_n$) is calculated.

Preferably, the nib diameter of the touch panel pen to be used for judgement for the requirement B1-1 and the requirement B1-2 is 0.3 to 2.5 mm, more preferably 0.5 to 2.0 mm, even more preferably 0.7 to 1.7 mm. When the diameter of the nib is small, $\sigma F_k$ tends to be large and additionally the time rate (T) tends to be small. When the diameter of the nib is large, $\sigma F_k$ tends to be small and additionally the time rate (T) tends to be small.

Preferably, the method for selecting a writing member of the embodiment B includes selecting a touch panel pen writing member that further satisfies the following requirement B2-1.

<Requirement B2-1>

The haze of the writing member is 25.0% or more.

When the haze is 25.0% or more, sparkle (a phenomenon of minor luminance variation appearing in reflected light) can be readily prevented.

From the viewpoint of preventing sparkle, the haze is more preferably 35.0% or more, even more preferably 45.0% or more. From the viewpoint of preventing reduction in the resolution of display devices, the haze is preferably 90.0% or less, more preferably 70.0% or less, even more preferably 67.0% or less, and further more preferably 60.0% or less.

In measuring the haze and the total light transmittance to be mentioned hereinunder, light is applied to a writing member from the side of the surface opposite to the writing surface B thereof (surface satisfying the requirement B1-1 and the requirement B1-2). In the case where both surfaces of the writing member are writing surfaces B, the light incidence surface may be any of the surfaces. The haze and the total light transmittance each are an average value obtained from 15 writing member samples.

Preferably, the method for selecting a writing member of the embodiment B includes selecting a touch panel pen writing member that further satisfies the following requirement B2-2.

<Requirement B2-2>

The total light transmittance according to JIS K7361-1: 1997 of the writing member is 87.0% or more.

When the total light transmittance is 87.0% or more, reduction in the luminance of display devices can be prevented.

The total light transmittance is more preferably 88.0% or more, even more preferably 89.0% or more. When the total light transmittance is too high, the requirement B1-1 and the requirement B1-2 tends to be hardly satisfied. Consequently, the total light transmittance is preferably 92.0% or less, more preferably 91.5% or less, even more preferably 91.0% or less.

Applying the method for selecting a touch panel pen writing member of the embodiment B, any touch panel suitable for any arbitrary writing member can be selected.

[Touch Panel Pen Writing Member]

The touch panel pen writing member of the embodiment B has a surface satisfying the following requirement B1-1 and requirement B1-2.

<Requirement B1-1>

A touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the friction force in the movement direction given to the touch panel pen is measured at intervals of 0.001 seconds, and an average of the kinetic friction forces obtained every 0.001 second is calculated. In calculating the standard deviation of the kinetic friction force, the standard deviation is 3.0 gf or more and 11.0 gf or less.

<Requirement B1-2>

The time rate of the time at which the kinetic friction force of 3.0 gf or less is exhibited based on the total measurement time for the kinetic friction force is 15% or more and 90% or less.

Preferably, the writing member of the embodiment B satisfies the requirement B1-1 and the requirement B1-2 even when a tough panel pen is secured in a state of being in contact with the writing surface B at any other angle than 60 degrees (for example, at any angle within a range of 30 to 75 degrees). In addition, it is also preferable that the requirement B1-1 and the requirement B1-2 each fall within the above-mentioned range even when the moving speed is any other speed than 14 mm/second (for example, at a speed falling within a range of 0.1 to 100 mm/second).

Preferably, the writing member of the embodiment B satisfies the following requirement B1-3. Satisfying the requirement B1-3, the writing feel can be more readily bettered and nib wear can be readily prevented.

<Requirement B1-3>

The average of kinetic friction force is 2.2 gf or more and 20.0 gf or less.

Preferably, the writing member of the embodiment B satisfies the following requirement B1-4. Satisfying the requirement B1-4, the writing feel can be bettered more.

<Requirement B1-4>

The maximum value of kinetic friction force is 35.0 gf or less.

Preferred ranges of the requirements B1-1 to B1-4 for the writing member of the embodiment B are the same as the preferred ranges of the requirements B1-1 to B1-4 for the method for selecting a touch panel pen writing member mentioned hereinabove.

Preferably, for readily satisfying the requirement B1-1 and the requirement B1-2, the writing member of the embodiment B is used as a writing member for a touch panel pen whose nib region has a composition of the above-mentioned (A) or (B). Also preferably, the writing member of the embodiment B is used as a writing member for a touch panel pen whose nib diameter falls within the above-mentioned range.

Preferably, the writing member of the embodiment B satisfies the following requirement B2-1.

<Requirement B2-1>

The haze of the writing member according to JIS K7136: 2000 is 25.0% or more.

Preferably, the writing member of the embodiment B satisfies the following requirement B2-2.

<Requirement B2-2>

The total light transmittance according to JIS K7361-1: 1997 is 87.0% or more.

Preferred ranges of the requirement B2-1 and the requirement B2-2 for the writing member of the embodiment B are the same as the preferred ranges of the requirement B2-1 and the requirement B2-2 for the method for selecting a touch panel pen writing member described hereinabove.

<Overall Configuration of Writing Member>

The touch panel pen writing member of the embodiment B is not specifically limited in point of the configuration thereof so far as at least one surface of the member satisfies the requirement B1-1 and the requirement B1-2.

Examples of the configuration of the touch panel pen writing member 10 of the embodiment B include those having a resin layer 2 on a substrate 1 and one surface of the resin layer 2 satisfies the requirement B1-1 and the requirement B1-2, as in FIG. 1 and FIG. 2. The resin layer 2 may have a multilayer structure of a first resin layer 2a and a second resin layer 2b, as in FIG. 2.

Though not shown, the configuration of the touch panel pen writing member 10 of the embodiment B may be a single-layered resin layer not having a substrate, or may have any other layer than the substrate and the resin layer, in which the surface of the other layer may satisfy the requirement B1-1 and the requirement B1-2. The other layer includes an antistatic layer, and an antifouling layer.

The writing surface B can be formed by "physical or chemical treatment such as embossing, sandblasting, or etching", "molding using a mold", "coating", etc. Among these methods, "molding using a mold" is suitable from the viewpoint of reproducibility of surface shapes, and "coating" is suitable from the viewpoint of productivity and response to multi-itemed production.

In order that the writing member satisfies the requirement B1-1 and the requirement B1-2 and others, preferably, the writing surface B of the writing member satisfies the following physical properties (a) to (e). The values of the physical properties (a) to (e) each are an average value of 15 samples each measured once.

Cutoff value for calculating Rt, θa and λa to be mentioned later is 0.8 mm. Considering that the diameter of the expected nib is preferably 0.3 to 2.5 mm, more preferably 0.5 to 2.0 mm, further preferably 0.7 to 1.7 mm, the cutoff value is selected as cutoff value which is within the expected range of the diameter, from among cutoff values defined by JIS.

(a) Maximum profile height Rt of a roughness curve of the writing surface B defined in JIS B0601: 2001 is 2.5 µm or more and 8.0 µm or less.
(b) Average tilt angle θa of the writing surface B is 2.0 degrees or more and 10.0 degrees or less.
(c) Average wavelength λa calculated according to the expression [λa=2π×(Ra/tan(θa))] from the average tilt angle θa and arithmetic average roughness Ra defined in JIS B0601: 2001 is 10 µm or more and 75 µm or less.
(d) The area ratio of particles of the writing surface B is 15.0% or more and 35.0% or less.
(e) The quotient of the λa (µm) and the particle density of the writing surface B (number of particles/100 µm square) [λa (µm)/particle density (number of particles/100 µm square)] is 14 or more and 1,000 or less.

The physical properties (a) to (e) mean that: the asperities of the writing surface B include asperities having a moderate size without having a large number of exceedingly high peaks and exceedingly low valleys; and the convex parts of the writing surface B are moderately densely packed. By the writing surface B satisfying the physical properties (a) to (e), the kinetic friction force change in an extremely short cycle (0.001 sec) can be suitable and the requirement B1-1 can be satisfied readily. Also by satisfying the physical properties (a) to (e), the requirements B1-3 to B1-4 can be more readily satisfied.

The satisfied physical properties (a) to (e) (that the asperities of the writing surface B include asperities having a moderate size without having a large number of exceedingly high peaks and exceedingly low valleys, and the convex parts of the writing surface B are moderately densely packed) can make it possible to appropriately generate an instance not causing slide friction by the nib running between the peaks of asperities, and therefore the requirement B1-2 can be thereby readily satisfied.

In addition, the satisfied physical properties (a) to (e) (that the asperities of the writing surface B include asperities having a moderate size without having a large number of exceedingly high peaks and exceedingly low valleys, and the convex parts of the writing surface B are moderately densely packed) are preferred as leading to prevention of sparkle.

Also preferably, Rt of (a) is 8.0 µm or less, θa of (b) is 10.0 degrees or less, λa of (c) is 75 µm or less, the area ratio of (d) is 15.0% or more, and the quotient of (e) is 1,000 or less, as leading to prevention of wear of nibs of touch panel pens. In particular, when λa of (c) is 75 µm or less and when the quotient of (e) is 1,000 or less, wear of nibs of touch panel pens can be significantly retarded.

Rt of the above (a) is more preferably 2.8 µm or more and 5.5 µm or less, further preferably 3.0 µm or more and 4.5 µm or less.

θa of the above (b) is more preferably 2.1 degrees or more and 6.0 degrees or less, more preferably 2.2 degrees or more and 4.5 degrees or less.

λa of the above (c) is more preferably 20 µm or more and 50 µm or less, further preferably 24 µm or more and 35 µm or less.

The area ratio of the above (d) is more preferably 18.0% or more and 32.0% or less, further preferably 20.0% or more and 30.0% or less.

The quotient of the above (e) is more preferably 16 or more and 200 or less, further preferably 20 or more and 50 or less.

For the writing member of the embodiment B, the pencil hardness of the writing surface B defined in JIS K5600-5-4: 1999 is preferably 2H or more and 9H or less, more preferably 5H or more and 7H or less, further preferably 5H or more and 6H or less, from the viewpoint of suppressing the wear of a touch panel pen while improving the scratch resistance of the writing surface B.

The formation of the resin layer by the coating can be performed by applying a resin layer-forming coating liquid containing a resin component, particles and a solvent onto a substrate by an application method known in the art such as gravure coating or bar coating, followed by drying and curing. For easily satisfying the requirement B1-1, the requirement B1-2 and others by the resin layer formed by the coating, it is preferred to set the average particle size of the particles, the content of the particles, and the thickness of the resin layer, etc. to ranges mentioned later.

When the resin layer is constituted by two or more layers as shown in FIG. 2, at least any of the resin layers may contain micron-order particles. From the viewpoint of readily satisfying the requirement B1-1, the requirement B1-2 and others, the following configuration (i) or (ii) is preferred.

(i) The resin layer of an outermost surface is configured to contain micron-order articles.
(ii) In the case where the resin layer of a lower layer contains micron-order particles, the layer on the resin layer is made to be thin (having a thickness of 0.3 µm or less).

In (i) where the resin layer of a lower layer is so configured as not to contain particles that are softer than those in the resin layer, the pencil hardness of the writing surface B can be readily increased. In (ii) where the resin layer of an upper layer is made to contain nano-order particles, the refractive index of the writing surface can be controlled to lower the reflectivity thereof.

Any of organic particles and inorganic particles can be used as the particles of the resin layer. Examples of the organic particles include particles consisting of polymethyl methacrylate, polyacryl-styrene copolymers, melamine resin, polycarbonate, polystyrene, polyvinyl chloride, benzoguanamine-melamine-formaldehyde condensates, silicone, fluorine resin and polyester resin. Examples of the inorganic particles include particles consisting of silica, alumina, antimony, zirconia and titania. Among these particles, organic particles are suitable from the viewpoint of easily suppressing the aggregation of the particles and easily satisfying the requirement B1-1, the requirement B1-2 and others.

The particles are preferably spherical particles from the viewpoint of suppression of nib wear of a touch panel pen.

The average particle size of the particles in the resin layer differs depending on the thickness of the resin layer and therefore, cannot be generalized. The average particle size of the particles is preferably on a micron order, from the viewpoint of easily satisfying the requirement B1-1, the requirement B1-2 and others. Specifically, the average particle size of the particles is preferably 1.0 to 10.0 µm, more preferably 2.0 to 5.0 µm, further preferably 2.5 to 3.5 µm. For aggregated particles, it is preferred that the average particle size of the aggregated particles should satisfy the range described above.

The average particle diameter of the particles in the embodiment B can be calculated according to the same method as in the embodiment A.

The particles may have a wide particle size distribution (a wide particle size distribution of single particles or a wide particle size distribution of mixed particles from two or more types of particles differing in particle size distribution). A narrower particle size distribution is more preferred from the viewpoint of preventing sparkle. Specifically, the coefficient of variation of the particle size distribution of the particles is preferably 25% or less, more preferably 20% or less, further preferably 15% or less.

The content of the micron-order particles in the resin layer is preferably 10 to 30 parts by mass, more preferably 12 to 28 parts by mass, further preferably 15 to 25 parts by mass, with respect to 100 parts by mass of the resin component from the viewpoint of easily satisfying the requirement B1-1, the requirement B1-2 and others.

The suitable range of the film thickness of the resin layer differs slightly depending on an embodiment of the resin layer. For example, the thickness of the resin layer containing micron-order particles is preferably 2.0 to 8.0 µm, more preferably 2.2 to 6.0 µm, further preferably 2.7 to 4.0 µm, from the viewpoint of easily satisfying the requirement B1-1, the requirement B1-2 and others, from the viewpoint of improving the pencil hardness of the writing surface B, and from the viewpoint of suppressing curl.

The ratio of [the average particle size of micron-order particles]/[the film thickness of the resin layer containing micron-order particles] is preferably so controlled as to satisfy a predetermined range depending on the embodiment of the resin layer, from the viewpoint of easily satisfying the requirement B1-1, the requirement B1-2 and others. Specifically, in the case where the resin layer of an outermost layer contains micron-order particles, the ratio is preferably 0.7 to 1.3, more preferably 0.8 to 1.2, further preferably 0.9 to 1.1. In the case where the resin layer of a lower layer contains micron-order particles, the ratio is preferably 1.0 to 1.6, more preferably 1.0 to 1.5, even more preferably 1.1 to 1.4.

In the above-mentioned configuration (i), preferably, the resin layer of a lower layer does not contain particles, and the thickness thereof is, from the viewpoint of improving the pencil hardness of the writing surface B and from the viewpoint of preventing curing, preferably 3.0 to 15.0 µm, more preferably 6.0 to 10.0 µm.

The resin component of the resin layer preferably contains a cured product of a thermosetting resin composition or an ionizing radiation-curable resin composition and more preferably contains a cured product of an ionizing radiation-curable resin composition, further preferably a cured product of an ultraviolet-curable resin composition, from the viewpoint of improving the pencil hardness of the writing surface B.

Examples of the thermosetting resin composition and the ionizing radiation-curable resin composition in the embodiment B are the same as those of the thermosetting resin composition and the ionizing radiation-curable resin composition exemplified hereinabove in the embodiment A.

In the resin layer-forming coating liquid, a solvent is usually used for adjusting a viscosity or for allowing each component to be dissolved or dispersed. The surface state of the resin layer after application and drying differs depending on the type of the solvent. Therefore, it is preferred to select the solvent in consideration of the saturated vapor pressure of the solvent, the permeability of the solvent into a transparent substrate, etc. Examples of the solvent in the embodiment B are the same as those of the solvent exemplified hereinabove for the embodiment A.

When the drying of the solvent is too slow, it is difficult to form a surface shape that easily satisfies the requirement B1-1, the requirement B1-2 and others due to excessive leveling properties of the resin layer. Thus, for the solvent, it is preferred that a solvent having an evaporation rate (relative evaporation rate to the evaporation rate of n-butyl acetate defined as 100) of 180 or more should be contained at 60% by mass or more, more preferably 75% by mass or more, in all solvents. Examples of the solvent having a relative evaporation rate of 180 or more include toluene. The relative evaporation rate of toluene is 195. On the other hand, examples of the solvent having a relative evaporation rate of less than 180 include methyl isobutyl ketone (MIBK), propylene glycol monomethyl ether acetate (PMA), isopropyl alcohol (IPA) and cyclohexanone.

It is preferred that the resin layer-forming coating liquid should contain a leveling agent, from the viewpoint of rendering the surface shape moderately smooth and easily adjusting the surface shape of the writing member to the range mentioned above. Examples of the leveling agent include fluorine leveling agents, silicone leveling agents, and fluorine-silicone copolymer leveling agents. The amount of the leveling agent added is preferably 0.01 to 0.50% by weight, more preferably 0.10 to 0.40% by weight, further preferably 0.20 to 0.30% by mass, with respect to the total solid content of the resin layer-forming coating liquid.

A plastic film is preferred for the substrate.

The plastic film can be formed from a resin such as polyester, triacetyl cellulose (TAC), cellulose diacetate, cellulose acetate butyrate, polyamide, polyimide, polyether sulfone, polysulfone, polypropylene, polymethylpentene, polyvinyl chloride, polyvinyl acetal, polyether ketone, polymethyl methacrylate, polycarbonate, polyurethane and cyclo-olefin-polymer (COP).

Among these plastic films, a polyester film processed by orienting, particularly, biaxial orienting, is preferred from the viewpoint of mechanical strength and dimensional stability and from the viewpoint of easily satisfying the physical property (f). The polyester film is preferably polyethylene terephthalate or polyethylene naphthalate.

The thickness of the substrate is preferably 5 to 200 µm, more preferably 10 to 150 µm.

[Touch Panel]

The touch panel of the embodiment B is a touch panel including a writing member on a surface, wherein a touch panel pen writing member according to the embodiment B is placed as the writing member such that the side that satisfies the requirement B1-1 and the requirement B1-2 provides the surface of the touch panel.

Examples of the touch panel include resistive touch panels, capacitive touch panels, in-cell touch panels, optical touch panels, ultrasonic touch panels and electromagnetic touch panels.

A resistive touch panel 100, as shown in FIG. 6, is prepared by connecting a circuit (not shown) to a basic configuration in which a pair of transparent substrates 20 (upper and lower transparent substrates) having conductive films 30 are placed via a spacer 40 such that the conductive films 30 face each other. The resistive touch panel includes the writing member 10 of the embodiment B used as the upper transparent substrate 20 in such a manner that the side that satisfies the requirement B1-1 and the requirement B1-2 in the writing member 10 faces the surface of the touch panel 100. The upper transparent substrate 20 may have a laminate configuration of the writing member with any other substrate layered thereon.

Examples of the capacitive touch panel include surface capacitive touch panels and projected capacitive touch panels. Projected capacitive touch panels are often used. The projected capacitive touch panel is prepared by connecting a circuit to a basic configuration in which an X-axis electrode and a Y-axis electrode that intersects the X-axis electrode are placed via an insulator. More specifically, examples of the basic configuration include a form in which the X-axis electrode and the Y-axis electrode are formed on separate sides of one transparent substrate, a form in which the X-axis electrode, the insulator layer, and the Y-axis electrode are formed in this order on one transparent substrate, and a form as shown in FIG. 7 in which: an X-axis electrode 50 is formed on a transparent substrate 20; an Y-axis electrode 60 is formed on another transparent substrate 20; and these are laminated via an insulator layer 70 such as an adhesive layer. Another example thereof includes a form in which an additional transparent substrate is further laminated on any of these basic forms.

In the capacitive touch panel, the writing member of the embodiment B is used as the transparent substrate 20 on the surface side such that the side that satisfies the requirement B1-1 and the requirement B1-2 in the writing member 10 faces the surface of the touch panel 100. The transparent substrate 20 on the surface side may have a laminate configuration of the writing member with any other substrate layered thereon.

The electromagnetic touch panel is a touch panel that employs a dedicated pen generating a magnetic field. The electromagnetic touch panel has at least a sensor unit which detects electromagnetic energy generated from the pen and further has a transparent substrate on the sensor unit. The transparent substrate may have a multilayer structure. In the electromagnetic touch panel, the writing member of the embodiment B is used as an uppermost-surface transparent substrate among the transparent substrates positioned on the sensor unit such that the side that satisfies the requirement B1-1 and the requirement B1-2 in the writing member faces the surface of the touch panel.

The in-cell touch panel has, for example, resistive, capacitive, or optical touch panel functions incorporated inside a liquid-crystal component prepared by sandwiching liquid crystals between two glass substrates.

The in-cell touch panel includes the writing member of the embodiment B placed on the glass substrate on the surface side such that the side that satisfies the requirement B1-1 and the requirement B1-2 faces the surface of the touch panel. The in-cell touch panel may have an additional layer such as a polarizer between the glass substrate on the surface side and the writing member of the embodiment B.

[Touch Panel System]

The touch panel system of the embodiment B is a touch panel system including a touch panel having a touch panel pen writing member on the surface thereof, and a touch panel pen, which satisfies the following requirement B1-1 and requirement B1-2.

<Requirement B1-1>

When a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the friction force in the movement direction given to the touch panel pen is measured at intervals of 0.001 seconds, an average of the kinetic friction forces obtained every 0.001 second is calculated, and a standard deviation of the kinetic friction force is calculated, the standard deviation is 2.0 gf or more and 15.0 gf or less.

<Requirement B1-2>

The time rate of the time at which the kinetic friction force of 3.0 gf or less is exhibited based on the total measurement time for the kinetic friction force is 15% or more and 90% or less.

In the touch panel system of the embodiment B, examples of the embodiments of the touch panel, the touch panel pen writing member, and the touch panel pen include the same as the embodiments shown in the aforementioned method for selecting a touch panel pen writing member, the touch panel pen writing member and the touch panel of the embodiment B.

The touch panel system of the embodiment B can realize a "high-level writing feel" exceeding the writing feel in writing with a pencil on paper.

[Display Device with Touch Panel]

A display device having a touch panel of the embodiment B is a display device having a touch panel on a display component, wherein the touch panel is the touch panel of the embodiment B.

Examples of the display component include liquid-crystal display components, EL display components, plasma display components, and electronic paper components. When the display component is a liquid-crystal display component, an EL display component, a plasma display component, or an electronic paper component, the touch panel of the embodiment B is placed on this display component.

The display device with a touch panel of the embodiment B can realize a "high-level writing feel" exceeding the writing feel in writing with a pencil on paper.

The method for selecting a touch panel pen writing member of the embodiment B can select a writing member that secures a "high-level writing feel" exceeding the writing feel in writing with a pencil on paper, and can enhance the efficiency for product design and quality management of writing members. In addition, the touch panel system, the touch panel pen writing member, the touch panel and the display device of the embodiment B can secure a high-level writing feel.

Embodiment C

[Method for Selecting Touch Panel Pen Writing Member]

A method for selecting a touch panel pen writing member of an embodiment C includes selecting a writing member satisfying the following requirement C1-1 as the touch panel pen writing member.

<Requirement C1-1>

$M_{100-200}$ is more than 0.030 [(gf)$^2$] and 0.400 [(gf)$^2$] or less, wherein a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force f [gf] in the movement direction given to the touch panel pen is measured at intervals of 1 msec, the interval of 1,001 msec to 2,000 msec after the start of the movement of the touch panel pen writing member is divided into 8 sections every 125 msec, the kinetic friction force is subjected to discrete Fourier transform with the window function as a Hanning window every section to calculate a power spectrum density [(gf)$^2$/Hz] at each frequency, an integrated value of the power spectrum density at more than 100 Hz and 200 Hz or less in each section is calculated, and the average value of the integrated values obtained in 8 sections is calculated and designated as $M^{100-200}$.

60 degrees means that, when a direction parallel to the surface of a touch panel pen writing member is 0 degree, a touch panel pen is inclined by 60 degrees relative to the surface of the touch panel pen writing member.

The minimum resolution on the horizontal axis (frequency) after discrete Fourier transform is 8 Hz (1/0.125).

FIG. 1 and FIG. 2 each are a cross-sectional view showing one embodiment of a touch panel pen writing member 10 of the embodiment C. The touch panel pen writing member 10 of FIG. 1 and FIG. 2 has a resin layer 2 on one side of the substrate 1. The resin layer 2 in FIG. 2 has a two-layered structure of a first resin layer 2a and a second resin layer 2b.

Of the touch panel pen writing member of the embodiment C, one surface may satisfy the requirement C1-1, or both surfaces may satisfy the requirement C1-1.

Hereinunder the touch panel pen writing member may be referred to as "writing member", and the surface satisfying the requirement C1-1 may be referred to as "writing surface C".

<Requirement C1-1>

The method for selecting a touch panel pen writing member of the embodiment C includes selecting a writing member satisfying the following requirement C1-1 as the touch panel pen writing member.

For investigating sensation of hand fatigue in writing, the present inventors tried writing various letters using various touch panel pens and various writing sheets and, as a result, have found that there is not always a correlation between the hand fatigue and the absolute value of kinetic friction force. With that, the present inventors took particular note of not an absolute value of kinetic friction force but a frequency of kinetic friction force. More specifically, the present inventors took particular note of the power spectrum density every frequency obtained through discrete Fourier transform of an hourly kinetic friction force.

With that, the present inventors investigated a relationship between hand fatigue and power spectrum density, and have found that an integrated value of a power spectrum density at more than 100 Hz and 200 Hz or less tends to correlate with hand fatigue in long-term writing. More specifically, the present inventors have found that, when Chinese character species that require stop-and-go movement (accelerated movement) in writing them are written for a long time, there tends to be a correlation between the integrated value of a power spectrum density at more than 100 Hz and 200 Hz or less, and hand fatigue.

From the above-mentioned tendency, it is considered that an integrated value of a power spectrum density at more than 100 Hz and 200 Hz or less would relate to an acceleration in writing.

In the requirement C1-1 where $M_{100-200}$ is more than 0.400 [(gf)$^2$], a man excessively feels an acceleration in writing, and hand fatigue in long-term writing could not be relieved. On the other hand, in the requirement C1-1 where $M_{100-200}$ is 0.030 [(gf)$^2$] or less, a man feels little hand fatigue but could hardly feel an acceleration in writing and therefore could not enjoy a good writing feel.

Preferably, $M_{100-200}$ is 0.100 [(gf)$^2$] or more and 0.350 [(gf)$^2$] or less, more preferably 0.150 [(gf)$^2$] or more and 0.300 [(gf)$^2$] or less.

In the requirement C1-1 and the requirement C1-2 to be mentioned hereinunder, the reason why the data from the start of the movement of the writing member up to 1,000 msec or less are excluded in calculating $M_{100-200}$ and $M_{8-100}$ is because the fact that the numerical values are often unstable just after the start of writing is taken into consideration.

Also in the requirement C1-1 and the requirement C1-2 to be mentioned hereinunder, the reason why the discrete Fourier transform is carried out after dividing the interval into plural sections is because, when the interval is divided into plural sections, then subjected to discrete Fourier transform for each section, and thereafter the data are averaged, the discrete Fourier transform hardly receives noise influence.

Preferably, the method for selecting a writing member of the embodiment C includes selecting one that further satisfies the following requirement C1-2. Satisfying the requirement C1-2, hand fatigue in long-term writing can be relieved more.

<Requirement C1-2>

Using the power spectrum density every frequency, as calculated in the requirement C1-1, an integrated value of the power spectrum density at more than 8 Hz and 100 Hz or less in each section is calculated. When an average value $M_{8-100}$ of the integrated values obtained in 8 sections is calculated, the $M_{8-100}$ is 0.100[(gf)$^2$] or more and 0.230 [(gf)$^2$] or less.

The present inventors made investigations by writing various letter species using various touch panel pens and various writing sheets, and have found that an integrated value of a power spectrum density at more than 8 Hz and 100 Hz or less tends to be related to hand fatigue in long-term writing. In addition, there is a tendency that an integrated value of a power spectrum density at more than 8 Hz and 100 Hz or less and hand fatigue are not related to letter species to be written.

From the above-mentioned tendency, it is considered that an integrated value of a power spectrum density at more than 8 Hz and 100 Hz or less may be related to detection of force to receive in writing (resistance in writing).

In the requirement C1-2, the data at 8 Hz or less are excluded, and this is considered to be because 8 Hz is a periodic component of a Hanning window and the frequency component of 8 Hz or less greatly differs from the original signal.

The requirement C1-2 where $M_{8-100}$ is 0.230 $[(gf)^2]$ or less makes it possible to relieve hand fatigue in long-term writing without giving any excessive resistance feel in writing. The requirement C1-2 where $M_{8-100}$ is 0.100 $[(gf)^2]$ or more betters a writing feel as providing a suitable resistance in writing.

$M_{8-100}$ is preferably 0.150 $[(gf)^2]$ or more and 0.230 $[(gf)^2]$ or less, more preferably 0.170 $[(gf)^2]$ or more and 0.225 $[(gf)^2]$ or less.

Preferably, the method for selecting a writing member of the embodiment C includes selecting one that further satisfies the following requirement C1-3.

<Requirement C1-3>

An average of the kinetic friction forces obtained every 1 msec is 15.0 gf or more and 45.0 gf or less.

When an average of kinetic friction forces (hereinafter this may be referred to as "$F_k$") is 15.0 gf or more, a sliding feel in writing can be prevented and a writing feel can be therefore bettered. When an average of kinetic friction forces is 45.0 gf or less, nibs of touch panel pens can be readily prevented from being worn.

An average of kinetic friction forces is an average value of kinetic friction forces obtained for 1,001 msec to 2,000 msec from the start of the movement of the writing member.

$F_k$ is preferably 20.0 gf or more and 43.0 gf or less, more preferably 25.0 gf or more and 40.0 gf or less.

Preferably, the method for selecting a writing member of the embodiment C includes selecting one that further satisfies the following requirement C1-4.

<Requirement C1-4>

An average of residual friction force obtained below is 10.0 gf or more and 45.0 gf or less, wherein in the requirement C1-1, after the movement for a length of 40 mm in one direction of the touch panel pen writing member has finished, the vertical load of 100 gf given to the touch panel pen is kept as such and the touch panel pen is kept in contact with the surface of the touch panel pen writing member at an angle of 60 degrees, in this condition, the residual friction force in the movement direction given to the touch panel pen is measured at intervals of 0.001 seconds, and an average of the residual friction forces obtained every 0.001 second is calculated and designated as an average of residual friction force.

The average of residual friction force (hereinafter this may be referred to as "$F_{re}$") is considered to indicate the easiness in stopping the nib in stopping writing for a moment, and the critical force necessary in restarting the touch panel pen.

When an average of $F_{re}$ is 10.0 gf or more, nibs can be readily stopped in stopping writing for a moment, and in restarting after stopping writing for a moment, nibs can be prevented from slipping, that is, the writing direction can be changed in any desired direction and a writing feel can be therefore bettered. When an average of $F_{re}$ is 45.0 gf or less, the load in restarting after stopping writing for a moment can be reduced and hand fatigue in long-term writing can be relieved, that is, the writing direction can be changed in any desired direction and a writing feel can be therefore bettered.

More preferably, $F_{re}$ is 15.0 gf or more and 35.0 gf or less, even more preferably 20.0 gf or more and 30.0 gf or less.

Regarding the measurement time for the residual friction force, the time after a lapse of 500 msec from the completion of the movement in one direction of the writing member for a length of 40 mm is referred to as a measurement start time, and the time after 400 msec from the measurement start time is referred to a measurement end time. From the residual friction force at each time, an average of residual friction force ($F_{re}$) is calculated.

In this description, 15 samples are measured each once for $M_{100-200}$, $M_{8-100}$, $F_k$ and $F_{re}$, and the resultant data are averaged to give an average value.

FIG. 3 is an outline view for explaining a method for measuring kinetic friction force and residual friction force.

In FIG. 3, a touch panel pen 200 is secured by a holder 84 while kept in contact with a writing member 10. A stand 85 for holding a weight 83 thereon is attached to the top of the holder 84. A weight 83 is put on the stand 85, by which a vertical load is applied to the touch panel pen. The writing member 10 is secured on a movable bed 82.

In measuring a friction force, the movable bed 82 on which the writing member 10 is secured is, while the touch panel pen is kept secured as above, moved at a predetermined speed toward the acute-angle direction of the angle formed by the writing member and the touch panel pen (in the right-hand direction of FIG. 3). At this time, the touch panel pen 200 receives a kinetic friction force in the movement direction of the movable bed 82, and the kinetic friction force at each time can be calculated. In addition, a residual friction force of a friction force after completion of the movement of the writing member 10 can also be measured.

An apparatus that enables the measurement as shown in FIG. 3 includes HEIDON-18L and HEIDON-14DR, trade names by Shinto Scientific Co., Ltd.

In the embodiment C, preferably, friction force-related parameters such as $F_k$, and $F_{re}$ are measured according to the following (A) to (E).

(A) Zero (0) Point Correction

A touch panel pen is set on the apparatus shown in FIG. 3, then balanced thereon (at this time, the vertical load is 0 gf), and subjected to zero (0) point correction with the apparatus in such a manner that the friction force in the state where the touch panel pen is not in contact with the touch panel pen writing member is 0 gf. (C) to (E) to be mentioned below are calculated on the basis of the friction force processed for zero (0) point correction.

(B) Measurement Time

The time at which the START button of the apparatus is pushed to start the movement of the writing member and to start the measurement is referred to as a time of "measurement start".

(C) Power Spectrum Density

The number of measurement points in the section to be subjected to discrete Fourier transform is represented by N. When the measurement interval is $\Delta t$, the m'th (m=0, 1, . . . N−1) time is represented by $m\Delta t$, and the kinetic friction force at the time can be represented by $f(m\Delta t)$. The minimum resolution at the frequency after the discrete Fourier transform is represented by $\Delta h$, and the function after the discrete Fourier transform is represented by $F(k\Delta h)$ (k=0, 1, . . . N−1). At this time, $F(k\Delta h)$ is defined by the following expression (i).

$$F(k\Delta h) = \frac{1}{N}\sum_{m=0}^{N-1} w(m\Delta t)f(m\Delta t)e^{-2\pi i(km\Delta h\Delta t)} \quad \text{(i)}$$

In the expression (i), "$\Delta h = 1/(N\Delta t)$".

Also in the expression (i), "$w(m\Delta t)$" is a window function. In this description, the window function is a Hanning window and is defined by the following expression (ii).

$$w(m\Delta t) = 0.5 - 0.5\cos\left(2\pi\frac{m}{N}\right) \quad \text{(ii)}$$

With that, the power spectrum density $P(k\Delta h)$ every frequency is defined by the following expression (iii).

$$P(k\Delta h) = \frac{|F(k\Delta h)|^2}{\Delta h} \quad \text{(iii)}$$

Further, an integrated value of the power spectrum density at more than A [Hz] and B [Hz] or less is calculated according to the following expression (iv).

$$\sum_k P(k\Delta h)\cdot\Delta h \quad \text{(iv)}$$

In the above expression (iv), k satisfies $A < k\Delta h \leq B$.

(D) Kinetic Friction Force

After the start of the measurement, an average value of the kinetic friction forces for 1,001 to 2,000 msec is referred to as an average of kinetic friction force ($F_k$).

(E) Residual Friction Force

After completion of the movement of the writing member in one direction for a length of 40 mm, while the vertical load 100 gf given to the touch panel pen is kept as such, the touch panel pen is kept in contact with the surface of the touch panel pen writing member at an angle of 60 degrees to the surface thereof. In this state, the friction force (residual friction force) in the acute-angle direction given to the touch panel pen is measured. Regarding the measurement time for the residual friction force, the time after a lapse of 500 msec from the completion of the movement in one direction of the writing member for a length of 40 mm is referred to as a measurement start time, and the time after 400 msec from the measurement start time is referred to a measurement end time. From the residual friction force at each time, an average of residual friction force ($F_{re}$) is calculated.

The tough panel pen to be used for the judgement of the requirement C1-1 to the requirement C1-4 is not specifically limited, and can be appropriately selected from commercially-available touch panel pens.

Also preferably, the diameter of the nib of the touch panel pen for use for the judgement for the requirement C1-1 to the requirement C1-4 is 0.3 to 2.5 mm, more preferably 0.5 to 2.0 mm, even more preferably 0.7 to 1.7 mm.

Preferably, the method for selecting a writing member of the embodiment C includes selecting a touch panel pen writing member that further satisfies the following requirement C2-1.

<Requirement C2-1>

The haze of the writing member is 20.0% or more.

When the haze is 20.0% or more, sparkle (a phenomenon of minor luminance variation appearing in reflected light) can be readily prevented.

From the viewpoint of preventing sparkle, the haze is more preferably 25.0% or more, even more preferably 30.0% or more, further more preferably 35.0% or more. From the viewpoint of preventing reduction in the resolution of display devices, the haze is preferably 80.0% or less, more preferably 70.0% or less, even more preferably 60.0% or less, and further more preferably 50.0% or less.

In measuring the haze and the total light transmittance to be mentioned hereinunder, light is applied to a writing member from the side of the surface opposite to the writing surface C thereof (surface satisfying the requirement C1-1). In the case where both surfaces of the writing member are writing surfaces, the light incidence surface may be any of the surfaces. In this description, the haze and the total light transmittance each are an average value of the data obtained in measuring 15 samples once for each case.

Preferably, the method for selecting a writing member of the embodiment C includes selecting a touch panel pen writing member that further satisfies the following requirement C2-2.

<Requirement C2-2>

The total light transmittance according to JIS K7361-1: 1997 of the writing member is 87.0% or more.

When the total light transmittance is 87.0% or more, reduction in the luminance of display devices can be prevented.

The total light transmittance is more preferably 88.0% or more, even more preferably 89.0% or more.

Applying the method for selecting a touch panel pen writing member of the embodiment C, any touch panel suitable for any arbitrary writing member can be selected.

[Touch Panel Pen Writing Member]

The touch panel pen writing member of the embodiment C has a surface satisfying the following requirement C1-1.

<Requirement C1-1>

$M_{100\text{-}200}$ is more than 0.030 [(gf)$^2$] and 0.400 [(gf)$^2$] or less, wherein a touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force f [gf] in the movement direction given to the touch panel pen is measured at intervals of 1 msec, the interval of 1,001 msec to 2,000 msec after the start of the movement of the touch panel pen writing member is divided into 8 sections every 125 msec, the kinetic friction force is subjected to discrete Fourier transform with the window function as a Hanning window every section to calculate a power spectrum density [(gf)$^2$/Hz] at each frequency, an integrated value of the power spectrum density at more than 100 Hz and 200 Hz or less in each section is calculated, and the average value of the integrated values in 8 sections is calculated and designated as $M_{100\text{-}200}$.

Preferably, the writing member of the embodiment C satisfies the requirement C1-1 to the requirement C1-4 even when a tough panel pen is secured in a state of being in contact with the writing surface C at any other angle than 60 degrees (for example, at any angle within a range of 30 to 75 degrees). In addition, it is also preferable that the requirement C1-1 to the requirement C1-4 each fall within the above-mentioned range even when the moving speed is any other speed than 14 mm/second (for example, at a speed falling within a range of 0.1 to 100 mm/second).

Preferably, the writing member of the embodiment C satisfies the following requirement C1-2.
<Requirement C1-2>

$M_{8-100}$ is 0.100 $[(gf)^2]$ or more and 0.230 $[(gf)^2]$ or less, wherein, using the power spectrum density every frequency, as calculated in the requirement C1-1, an integrated value of the power spectrum density at more than 8 Hz and 100 Hz or less in each section is calculated, and an average value of the integrated values in 8 sections is calculated and designated as $M_{8-100}$.

Preferably, the writing member of the embodiment C further satisfies the following requirement C1-3.
<Requirement C1-3>

An average of kinetic friction forces obtained every 1 msec is 15.0 gf or more and 45.0 gf or less.

Preferably, the writing member of the embodiment C further satisfies the following requirement C1-4.
<Requirement C1-4>

An average of residual friction force obtained below is 10.0 gf or more and 45.0 gf or less, wherein in the requirement C1-1, after the movement for a length of 40 mm in one direction of the touch panel pen writing member has finished, the vertical load of 100 gf given to the touch panel pen is kept as such and the touch panel pen is kept in contact with the surface of the touch panel pen writing member at an angle of 60 degrees, in this condition, the residual friction force in the movement direction given to the touch panel pen is measured at intervals of 0.001 seconds, and an average of the residual friction forces obtained every 0.001 second is calculated and designated as an average of residual friction force.

Preferred ranges of the requirements C1-1 to C1-4 for the writing member of the embodiment C are the same as the preferred ranges of the requirements C1-1 to C1-4 described hereinabove for the method for selecting a touch panel pen writing member.

Also preferably, the writing member of the embodiment C is used as a writing member for a touch panel pen whose nib diameter falls within the above-mentioned range.

Preferably, the writing member of the embodiment C satisfies the following requirement C2-1.
<Requirement C2-1>

The haze according to JIS K7136:2000 of the writing member is 20.0% or more.

Preferably, the writing member of the embodiment C satisfies the following requirement C2-2.
<Requirement C2-2>

The total light transmittance according to JIS K7361-1: 1997 is 87.0% or more.

Preferred ranges of the requirement C2-1 and the requirement C2-2 for the writing member of the embodiment C are the same as the preferred ranges of the requirement C2-1 and the requirement C2-2 for the method for selecting a touch panel pen writing member described hereinabove.
<Overall Configuration of Writing Member>

The touch panel pen writing member of the embodiment C is not specifically limited in point of the configuration thereof so far as at least one surface of the member satisfies the requirement C1-1.

Examples of the configuration of the touch panel pen writing member 10 of the embodiment C include those having a resin layer 2 on a substrate 1 and one surface of the resin layer 2 satisfies the requirement C1-1, as in FIG. 1 and FIG. 2. The resin layer 2 may have a multilayer structure of a first resin layer 2a and a second resin layer 2b, as in FIG. 2.

Though not shown, the configuration of the touch panel pen writing member 10 of the embodiment C may be a single-layered resin layer not having a substrate, or may have any other layer than the substrate and the resin layer, in which the surface of the other layer may satisfy the requirement C1-1. The other layer includes an antistatic layer, and an antifouling layer.

The writing surface C can be formed by "physical or chemical treatment such as embossing, sandblasting, or etching", "molding using a mold", "coating", etc. Among these methods, "molding using a mold" is suitable from the viewpoint of reproducibility of surface shapes, and "coating" is suitable from the viewpoint of productivity and response to multi-itemed production.

In order that the writing member satisfies the requirement C1-1 to the requirement C1-4, preferably, the writing surface C of the writing member satisfies the following physical properties (a) to (d).

Cutoff value for calculating Rt, θa and Ra to be mentioned later is 0.8 mm. Considering that the diameter of the expected nib is preferably 0.3 to 2.5 mm, more preferably 0.5 to 2.0 mm, further preferably 0.7 to 1.7 mm, the cutoff value is selected as cutoff value which is within the expected range of the diameter, from among cutoff values defined by JIS.

The maximum profile height Rt means, on a roughness curve calculated based on JISB0601:1994 with a cutoff value of 0.8 mm, a sum of a maximum value of the mountain height in an evaluation length (a height from an average line to a mountain peak (a highest spot elevation of a mountain of the roughness curve)) and a maximum value of the valley depth (a depth from an average line to a valley bottom (a lowest spot elevation of a valley of the roughness curve)).

(a) Maximum profile height Rt of the writing surface C is 0.7 μm or more and 7.0 μm or less.

(b) Average tilt angle θa of the writing surface C is 1.0 degree or more and 10.0 degrees or less.

(c) Ratio of the average tilt angle θa to the arithmetic average roughness Ra [average tilt angle θa (degree)/ arithmetic average roughness Ra (μm)] is 8.0 or more and 20.0 or less.

(d) Arithmetic average roughness Ra is 0.10 μm or more and 1.00 μm or less.

In this description, the above (a) to (d) each are an average value of the measured values of 15 samples of each writing member.

The satisfied physical properties (a) to (d) mean that: the asperities of the writing surface C include asperities having a moderate size without having a large number of exceedingly high peaks and exceedingly low valleys; and the convex parts of the writing surface C are moderately densely packed. Satisfying the physical properties (a) to (d), the writing surface C can more readily satisfy the requirement C1-1 and the requirement C1-2. In particular, it is considered that satisfaction of the physical property (c) is an important factor for satisfying the requirement C1-1 and the requirement C1-2. By the writing surface C satisfying the physical properties (b) and (d), the kinetic friction force and the residual friction force can be well balanced to readily satisfy the requirement C1-3 and the requirement C1-4.

The satisfied physical properties (a) to (d) (that the asperities of the writing surface C include asperities having a moderate size without having a large number of exceedingly high peaks and exceedingly low valleys, and the convex parts of the writing surface C are moderately densely packed) are preferred as leading to prevention of sparkle.

Also preferably, Rt of (a) is 7.0 μm or less, θa of (b) is 10.0 degrees or less, and Ra of (d) is 1.00 μm or less, as leading to prevention of wear of nibs of touch panel pens.

Rt of the above (a) is more preferably 1.0 μm or more and 6.0 μm or less, further preferably 1.2 μm or more and 5.0 μm or less.

θa of the above (b) is more preferably 1.2 degrees or more and 8.0 degrees or less, further more preferably 1.5 degrees or more and 6.0 degrees or less.

[θa (degree)/Ra (μm)] of the above (c) is more preferably 9.0 or more and 17.0 or less, even more preferably 10.0 or more and 15.0 or less.

Ra of the above (d) is more preferably 0.12 μm or more and 0.80 μm or less, even more preferably 0.13 μm or more and 0.60 μm or less.

In the writing member of the embodiment C, the pencil hardness of the writing surface C defined in JIS K5600-5-4: 1999 is preferably 2H or more and 9H or less, more preferably 3H or more and 7H or less, further preferably 5H or more and 6H or less, from the viewpoint of suppressing the wear of a touch panel pen while improving the scratch resistance of the writing surface C.

The formation of the resin layer by the coating can be performed by applying a resin layer-forming coating liquid containing a resin component, particles and a solvent onto a substrate by an application method known in the art such as gravure coating or bar coating, followed by drying and curing. For easily satisfying the requirement C1-1 to the requirement C1-4 by the resin layer formed by the coating, it is preferred to set the average particle size of the particles, the content of the particles, and the thickness of the resin layer, etc. to ranges mentioned later.

When the resin layer is constituted by two or more layers as shown in FIG. 2, at least any of the resin layers may contain the particles. It is preferred that an uppermost-surface resin layer should contain the particles, from the viewpoint of easily satisfying the requirement C1-1 to the requirement C1-4. Alternatively, the uppermost-surface resin layer may contain the particles while lower resin layer(s) may contain no particles. This configuration can easily improve the pencil hardness of the writing surface C.

Any of organic particles and inorganic particles can be used as the particles of the resin layer. Examples of the organic particles include particles consisting of polymethyl methacrylate, polyacryl-styrene copolymers, melamine resin, polycarbonate, polystyrene, polyvinyl chloride, benzoguanamine-melamine-formaldehyde condensates, silicone, fluorine resin and polyester resin. Examples of the inorganic particles include particles consisting of silica, alumina, antimony, zirconia and titania. Among these particles, organic particles are suitable from the viewpoint of easily suppressing the aggregation of the particles and easily satisfying the requirement C1-1 to the requirement C1-4.

The particles are preferably spherical particles from the viewpoint of suppression of nib wear of a touch panel pen.

The average particle size of the particles in the resin layer differs depending on the thickness of the resin layer and therefore, cannot be generalized. The average particle size of the particles is preferably 1.0 to 10.0 μm, more preferably 2.0 to 8.0 μm, further preferably 3.0 to 6.0 μm, from the viewpoint of easily satisfying the requirement C1-1 to the requirement C1-4. For aggregated particles, it is preferred that the average particle size of the aggregated particles should satisfy the range described above.

The average particle size of the particles in the embodiment C can be calculated according to the same method as in the embodiment A.

The particles may have a wide particle size distribution (a wide particle size distribution of single particles or a wide particle size distribution of mixed particles from two or more types of particles differing in particle size distribution). A narrower particle size distribution is more preferred from the viewpoint of preventing sparkle. Specifically, the coefficient of variation of the particle size distribution of the particles is preferably 25% or less, more preferably 20% or less, further preferably 15% or less.

The content of the particles in the resin layer is preferably 10 to 30 parts by mass, more preferably 12 to 25 parts by mass, further preferably 15 to 20 parts by mass, with respect to 100 parts by mass of the resin component from the viewpoint of easily satisfying the requirement C1-1 to the requirement C1-4.

The suitable range of the film thickness of the resin layer differs slightly depending on an embodiment of the resin layer. For example, the thickness of the resin layer containing the particles is preferably 2.0 to 12.0 μm, more preferably 3.0 to 10.0 μm, further preferably 4.0 to 9.0 μm, from the viewpoint of easily satisfying the requirement C1-1 to the requirement C1-4, from the viewpoint of improving the pencil hardness of the writing surface C, and from the viewpoint of suppressing curl.

The ratio of [the average particle size of the particles]/[the film thickness of the resin layer containing the particles] is preferably 0.3 to 1.3, more preferably 0.4 to 1.2, further preferably 0.5 to 1.0, from the viewpoint of easily satisfying the requirement C1-1 to the requirement C1-4.

It is preferred that a resin layer containing no particles should be positioned nearer the substrate than the resin layer containing the particles. Its thickness is preferably 3.0 to 15.0 μm, more preferably 6.0 to 10.0 μm, from the viewpoint of improving the pencil hardness of the writing surface C and from the viewpoint of suppressing curl.

The resin component of the resin layer preferably contains a cured product of a thermosetting resin composition or an ionizing radiation-curable resin composition and more preferably contains a cured product of an ionizing radiation-curable resin composition, further preferably a cured product of an ultraviolet-curable resin composition, from the viewpoint of improving the pencil hardness of the writing surface C.

Examples of the thermosetting resin composition and the ionizing radiation-curable resin composition in the embodiment C are the same as those exemplified hereinabove for the thermosetting resin composition and the ionizing radiation-curable resin composition in the embodiment A.

In the resin layer-forming coating liquid, a solvent is usually used for adjusting a viscosity or for allowing each component to be dissolved or dispersed. The surface state of the resin layer after application and drying differs depending on the type of the solvent. Therefore, it is preferred to select the solvent in consideration of the saturated vapor pressure of the solvent, the permeability of the solvent into a transparent substrate, etc. Examples of the solvent in the embodiment C are the same as those exemplified hereinabove for the solvent in the embodiment A.

When the drying of the solvent is too slow, it is difficult to form a surface shape that easily satisfies the requirement C1-1 to the requirement C1-4 due to excessive leveling properties of the resin layer. Thus, for the solvent, it is preferred that a solvent having an evaporation rate (relative evaporation rate to the evaporation rate of n-butyl acetate defined as 100) of 180 or more should be contained at 60% by mass or more, more preferably 70% by mass or more, in all solvents. From the viewpoint of appropriately leveling the resin layer, the proportion of the solvent having an evaporation rate of 180 or more is preferably 90% by mass or less in all solvents, more preferably 85% by mass or less. Examples of the solvent having a relative evaporation rate of 180 or more include toluene. The relative evaporation rate of toluene is 195. On the other hand, examples of the solvent having a relative evaporation rate of less than 180 include methyl isobutyl ketone (MIBK), propylene glycol monomethyl ether acetate (PMA), and isopropyl alcohol (IPA).

It is preferred that the resin layer-forming coating liquid should contain a leveling agent, from the viewpoint of rendering the surface shape moderately smooth and easily adjusting the surface shape of the writing member to the range mentioned above. Examples of the leveling agent include fluorine leveling agents, silicone leveling agents, and fluorine-silicone copolymer leveling agents. The amount of the leveling agent added is preferably 0.01 to 0.50% by weight, more preferably 0.05 to 0.40% by weight, further preferably 0.07 to 0.30% by mass, with respect to the total solid content of the resin layer-forming coating liquid.

A transparent substrate is preferred, including a plastic film and glass. A plastic film is preferred as the substrate.

The plastic film can be formed from a resin such as polyester, triacetyl cellulose (TAC), cellulose diacetate, cellulose acetate butyrate, polyamide, polyimide, polyether sulfone, polysulfone, polypropylene, polymethylpentene, polyvinyl chloride, polyvinyl acetal, polyether ketone, polymethyl methacrylate, polycarbonate, polyurethane and cyclo-olefin-polymer (COP).

Among these plastic films, a polyester film processed by orienting, particularly, biaxial orienting, is preferred from the viewpoint of mechanical strength and dimensional stability and from the viewpoint of easily satisfying the physical property (f). The polyester film is preferably polyethylene terephthalate or polyethylene naphthalate.

The thickness of the substrate is preferably 5 to 200 µm, more preferably 10 to 150 µm.

[Touch Panel]

The touch panel of the embodiment C is a touch panel including a writing member on a surface, wherein a touch panel pen writing member according to the embodiment C is placed as the writing member such that the side that satisfies the requirement C1-1 provides the surface of the touch panel.

Examples of the touch panel include resistive touch panels, capacitive touch panels, in-cell touch panels, optical touch panels, ultrasonic touch panels and electromagnetic touch panels.

A resistive touch panel 100, as shown in FIG. 6, is prepared by connecting a circuit (not shown) to a basic configuration in which a pair of transparent substrates 20 (upper and lower transparent substrates) having conductive films 30 are placed via a spacer 40 such that the conductive films 30 face each other.

Examples of the resistive touch panel include the writing member 10 of the embodiment C used as the upper transparent substrate 20 in such a manner that the side that satisfies the requirement C1-1 in the writing member 10 faces the surface of the touch panel 100. Although not shown, the resistive touch panel may have a configuration in which the writing member of the embodiment C is laminated on the upper transparent substrate such that the side that satisfies the requirement C1-1 faces the surface, or a configuration in which the writing member of the embodiment C is placed on the upper transparent substrate such that the side that satisfies the requirement C1-1 faces the surface, and the writing member is fixed using a frame or the like.

Examples of the capacitive touch panel include surface capacitive touch panels and projected capacitive touch panels. Projected capacitive touch panels are often used. The projected capacitive touch panel is prepared by connecting a circuit to a basic configuration in which an X-axis electrode and a Y-axis electrode that intersects the X-axis electrode are placed via an insulator. More specifically, examples of the basic configuration include a form in which the X-axis electrode and the Y-axis electrode are formed on separate sides of one transparent substrate, a form in which the X-axis electrode, the insulator layer, and the Y-axis electrode are formed in this order on one transparent substrate, and a form as shown in FIG. 7 in which: an X-axis electrode 50 is formed on a transparent substrate 20; an Y-axis electrode 60 is formed on another transparent substrate 20; and these are laminated via an insulator layer 70 such as an adhesive layer. Another example thereof includes a form in which an additional transparent substrate is further laminated on any of these basic forms.

Examples of the configuration of the capacitive touch panel include a configuration in which the writing member of the embodiment C is used as the transparent substrate 20 on the surface side such that the side that satisfies the requirement C1-1 in the writing member 10 faces the surface of the touch panel 100. Although not shown, the capacitive touch panel may have a configuration in which the writing member of the embodiment C is laminated on the transparent substrate on the surface side such that the side that satisfies the requirement C1-1 faces the surface, or a configuration in which the writing member of the embodiment C is placed on the transparent substrate on the surface side such that the side that satisfies the requirement C1-1 faces the surface, and the writing member is fixed using a frame or the like.

The electromagnetic touch panel is a touch panel that employs a dedicated pen generating a magnetic field. The electromagnetic touch panel has at least a sensor unit which detects electromagnetic energy generated from the pen and further has a transparent substrate on the sensor unit. The transparent substrate may have a multilayer structure.

Examples of the configuration of the electromagnetic touch panel include a configuration in which the writing member of the embodiment C is used as an uppermost-surface transparent substrate among the transparent substrates positioned on the sensor unit such that the side that satisfies the requirement C1-1 in the writing member faces the surface of the touch panel. Alternatively, the electromagnetic touch panel may have a configuration in which the writing member of the embodiment C is laminated on the uppermost-surface transparent substrate among the transparent substrates positioned on the sensor unit such that the side that satisfies the requirement C1-1 faces the surface, or a configuration in which the writing member of the embodiment C is placed on the uppermost-surface transparent substrate such that the side that satisfies the requirement C1-1 faces the surface, and the writing member is fixed using a frame or the like.

The in-cell touch panel has, for example, resistive, capacitive, or optical touch panel functions incorporated inside a liquid-crystal component prepared by sandwiching liquid crystals between two glass substrates.

The in-cell touch panel includes the writing member of the embodiment C placed on the glass substrate on the surface side such that the side that satisfies the requirement C1-1 faces the surface of the touch panel. The in-cell touch panel may have an additional layer such as a polarizer between the glass substrate on the surface side and the writing member of the embodiment C.

[Touch Panel System]

The touch panel system of the embodiment C is a touch panel system including a touch panel having a touch panel pen writing member on the surface thereof, and a touch panel pen, which satisfies the following requirement C1-1.

<Requirement C1-1>

A touch panel pen is secured in a state of being in contact with the surface of the touch panel pen writing member at an angle of 60 degrees, then while a vertical load of 100 gf is kept applied to the touch panel pen and while the touch panel pen writing member is moved 40 mm in one direction at a speed of 14 mm/second, the kinetic friction force f [gf] in the movement direction given to the touch panel pen is measured at intervals of 1 msec.

After the start of the movement of the touch panel pen writing member, the interval of 1,001 msec to 2,000 msec is divided into 8 sections every 125 msec. The kinetic friction force is subjected to discrete Fourier transform in each section with the window function as a Hanning window to calculate the power spectrum density [(gf)$^2$/Hz] at each frequency.

When an integrated value of the power spectrum density more than 100 Hz and 200 Hz or less in each section is calculated, and when the average value $M_{100-200}$ of the integrated values in 8 sections is calculated, $M_{100-200}$ is more than 0.030 [(gf)$^2$] and 0.400 [(gf)$^2$] or less.

Preferably, the touch panel system of the embodiment C further satisfies the above-mentioned requirements C1-2 to C1-4.

In the touch panel system of the embodiment C, examples of the embodiments of the touch panel, the touch panel pen writing member, and the touch panel pen include the same as the embodiments shown in the aforementioned method for selecting a touch panel pen writing member, the touch panel pen writing member and the touch panel of the embodiment C.

The touch panel system of the embodiment C hardly causes hand fatigue even in long-term operation thereof.

[Display Device with Touch Panel]

A display device having a touch panel of the embodiment C is a display device having a touch panel on a display component, wherein the touch panel is the touch panel of the embodiment C.

Examples of the display component include liquid-crystal display components, EL display components, plasma display components, and electronic paper components. When the display component is a liquid-crystal display component, an EL display component, a plasma display component, or an electronic paper component, the touch panel of the embodiment C is placed on this display component.

The display device with a touch panel of the embodiment C hardly causes hand fatigue even in long-term operation thereof.

The method for selecting a touch panel pen writing member of the embodiment C can select a writing member that hardly causes hand fatigue even in long-term operation thereof, and can enhance the efficiency for product design and quality management of writing members. In addition, the touch panel system, the touch panel pen writing member, the touch panel and the display device of the embodiment C hardly cause hand fatigue even in long-term operation thereof.

EXAMPLES

Next, the present invention will be described in more detail with reference to Examples. However, the present invention is not limited by these Examples by any means. "Part" is by mass.

Examples of Embodiment A

A1. Measurement and Evaluation

Touch panel pen writing members prepared or provided in Experimental Examples were measured and evaluated as described below.

A1-1. Friction Force

HEIDON-14DR, a trade name by Shinto Scientific Co., Ltd., was used as a measurement apparatus. As shown in FIG. 3, a touch panel pen A1 or A2 mentioned below was kept in contact with the surface on a resin layer side of a touch panel pen writing member, at an angle of 60 degrees, and secured with a holder. A 100-g weight was put on a stand above the holder so as to impart a vertical load of 100 gf to the touch panel pen. While the load was kept applied, the movable bed to which a writing member was secured was moved toward the acute-angle direction of the angle formed by the movable bed and the touch panel pen (in the right-hand direction of FIG. 3) at a speed of 14 mm/sec. The friction force in the movement direction (in the acute-angle direction of the pen) given to the pen in moving it in one direction of a length of 40 mm was measured. Further, after the movement of the movable bed and while the touch panel pen was kept in contact with the surface of the writing member at an angle of 60 degrees, the vertical load given to the touch panel pen was removed, and in this state, the residual friction force $F_{re}$ given to the touch panel pen in the movement direction thereof (in the acute-angle direction of the pen) was measured.

The sampling time (measurement interval) was 0.001 seconds, and the atmosphere during the measurement was at a temperature of 23° C.±5° C. and a humidity of 40 to 65%. Before the start of the measurement, each sample was left in an atmosphere at 23° C.±5° C. and a humidity of 40 to 65% for 10 minutes or more. The other analysis conditions are shown below.

Based on the measured results, an average of residual friction force ($F_{re}$), an average of kinetic friction force ($F_k$) and a standard deviation of kinetic friction force ($\sigma F_k$) were calculated according to the process of (A) to (E) mentioned above. Further, from the resultant $F_{re}$ and $F_k$, "$F_{re}/F_k$" in the requirement A1-1 was calculated.

$F_{re}$ and $F_k$ in Experimental Examples each were an average value of the measured data of 15 samples each measured once. $\sigma F_k$ in Experimental Examples was a standard deviation in measurement of 60 samples each measured once. For $F_{re}/F_k$ in each Experimental Example, 15 samples were measured each once to calculate $F_{re}/F_k$ of each sample, and an average of the resultant data of 15 samples was referred to as $F_{re}/F_k$. The results are shown in Table 1.

<Other Analysis Conditions>

Software for measurement: TriboSoft 35 (version: TriboSoft 3.59)

Mode: measurement under constant load

Load transducer capacity: 2,000 gf

DAS ample range: 50%

Vertical load: 100 g

Sampling capacity: 5,500 samples

Unit system: CGS

One way measurement mode

FEED SCALE 40 mm
POLARITY: OFF
FILTER: PASS
RANGE: 50% FS
Load cell calibration (zero and span value inputting): analogue dial set
<Touch Panel Pen A1>
Touch panel pen attached to "Dynabook Tab S68", a trade name by Toshiba Corporation
Configuration of nib region: composite of aggregates of polyester fibers (hardness-imparting region (ii)) mixed with air pores (deformation-promoting region (i))
Young's modulus of region (ii): 3.0 GPa
Ratio by volume of region (i) to region (ii), about 95/5
Nib diameter: 1.5 mm
<Touch Panel Pen A2>
BB-2 pen attached to "Boogie Board", a trade name by King Jim Co., Ltd.
Configuration of nib region: polyester acetate resin bulk
Nib diameter: 1.6 mm A1-2. Writing Feel A surface opposite to the resin layer side of the touch panel pen writing member was laminated onto a glass plate via an optical transparent pressure-sensitive adhesive sheet (thickness: 100 μm) manufactured by Toray Industries, Inc., and evaluated for a writing feel using touch panel pens A1 and A2 described above. The movement in evaluating the writing feel includes many movements of converting the writing direction after stopping writing for a moment. 20 persons graded samples such that: a sample that offered a favorable writing feel as a whole was given 2; a sample that offered a normal writing feel as a whole was given 1; and a sample that offered an unfavorable writing feel as a whole was given 0. A sample with an average score of 1.8 or higher from the 20 persons was given AA; a sample with an average score of 1.6 or higher and lower than 1.8 was given A; a sample with an average score of 1.2 or higher and lower than 1.6 was given B; a sample with an average score of 1.0 or more and lower than 1.2 was given C; and a sample with an average score of lower than 1.0 was given D.

The atmosphere for the evaluation involved a temperature of 23° C.±5° C. and a humidity of 40 to 65%. Before the start of the evaluation, each sample was left in an atmosphere involving 23° C.±5° C. and a humidity of 40 to 65% for 10 minutes or longer.

A1-3. Nib Wear

HEIDON-14DR, a trade name by Shinto Scientific Co., Ltd., was used as a measurement apparatus. As shown in FIG. 3, a touch panel pen A1 or A2 mentioned below was kept in contact with the surface on a resin layer side of a touch panel pen writing member, at an angle of 60 degrees, and secured with a holder. A 200-g weight was put on a stand above the holder so as to impart a vertical load of 200 gf to the touch panel pen. While the load was kept applied, the movable bed to which a writing member was secured was reciprocated 200 times each for a one-direction length of 40 mm at a speed of 14 mm/sec. Regarding the evaluation atmosphere, the temperature was 23±5° C. and the relative humidity was 40 to 65%.

The evaluation standards are such that: (i) the kinetic friction force change during the measurement relative to the initial kinetic friction force is 40% or less, (ii) the nib wear of the touch panel pen is not visually confirmed with ease, and a sample satisfying both (i) and (ii) was given "A", a sample not satisfying any of (i) and (ii) was given "B", and a sample not satisfying both (i) and (ii) was given "C". The results are shown in Table 1.

A1-4. Evaluation of Surface Profile

The touch panel writing members in Experimental Examples were cut into 10-cm square pieces. The cutting locations were selected from random sites after visual confirmation that abnormalities such as waste or flaws were absent. The cut writing member was laminated onto a black plate (manufactured by Kuraray Co., Ltd., trade name: COMOGLAS, model number: DFA502K, thickness: 2.0 mm) having a size of 10 cm in length×10 cm in width via an optical transparent pressure-sensitive adhesive sheet (refractive index: 1.47, thickness: 100 μm) manufactured by Toray Industries, Inc. 15 such samples were provided.

Using a surface roughness tester (model number: SE-3400; manufactured by Kosaka Laboratory Ltd.), each sample was set so as to be secured and tightly adhered to the measurement stage, and then tested for the measurement items mentioned below under the measurement conditions also mentioned below to determine the surface profile on the resin layer side of the touch panel pen writing member of each sample. Average values from the 15 samples were used as Rt, θa and λa of each Experimental Example. Regarding the evaluation atmosphere, the temperature was 23±5° C. and the humidity was 40 to 65%. Before the start of measurement, each sample was left in an atmosphere at 23±5° C. and a humidity of 40 to 65% for 10 minutes or more. The results are shown in Table 2.

<Measurement Conditions>
[Probe of Surface Roughness Detection Unit]
SE2555N (trade name) manufactured by Kosaka Laboratory Ltd. (radius of curvature of the tip: 2 μm, apex angle: 90 degrees, material: diamond)
[Measurement Conditions of Surface Roughness Tester]
Evaluation length: 5 times of cutoff value λc
Preliminary length: 0.5 times of cutoff value λc
Probe speed: 0.5 mm/s
Longitudinal magnification: ×2,000
Skid: not used (no contact with measuring surface)
Cutoff filter type: Gaussian
Leveling: all data
Sampling mode: c=1,500
Dead band level: 10%
tp/PC curve: normal
<Measurement Items>
Maximum profile height Rt on a roughness curve of JIS B0601:2001 with a cutoff value of 0.8 mm
Average tilt angle θa with a cutoff value of 0.8 mm
Average wavelength λa with a cutoff value of 0.8 mm A1-5. Area Ratio of Particles and Density of Particles The touch panel writing members of Experimental Examples were cut into 5-cm square pieces, and 15 such pieces were prepared. 15 sites were selected from random sites after visual confirmation that abnormalities such as waste or flaws were absent. The area ratio of particles and the density of particles were calculated according to the following process of (1) and (2), and an average value of the measured data of these 15 samples was calculated for the area ratio of particles and the density of particles in each Experimental Example. The results are shown in Table 2.

(1) SEM Planar Photographing

A SEM planar photograph of the writing member surface was taken under a digital scanning electron microscope (model number: S-4800) manufactured by Hitachi Kyowa Engineering Co., Ltd. at a magnification of ×50,000 (accelerating voltage: 30.0 kV, emission current: 10 μA).

(2) Calculation of Area Ratio and Particle Density

The image was binarized from the digital data of the SEM photograph using image analysis software (trade name:

WinRoof, manufactured by Mitani Corp.), and particle parts were selected to calculate the area ratio (%) and particle density (number of particles/100 μm square) of the particles.

A1-6. Haze, Total Light Transmittance

The haze (JIS K-7136: 2000) and the total light transmittance (JIS K7361-1: 1997) of each sample produced in the above "1-5" were measured using a haze meter (HM-150, manufactured by Murakami Color Research Laboratory Co., Ltd.). Average values from 15 samples were used as the haze and the total light transmittance in each Experimental Example. Regarding the evaluation atmosphere, the temperature was 23±5° C. and the humidity was 40 to 65%. Before the start of measurement, each sample was left in an atmosphere at 23±5° C. and a humidity was 40 to 65% for 10 minutes or more. The surface of light incidence was set to the substrate side. The results are shown in Table 2.

A1-7. Sparkle

Each touch panel pen writing member of Experimental Examples A1 to A4 was placed on a commercially available ultra-high-resolution liquid-crystal display device (smartphone manufactured by Sharp Corporation, trade name: SH-03G, pixel density: 480 ppi), and the sparkling state was visually checked. Twenty persons graded the samples such that: a sample for which sparkle was of a level that could not be recognized by visual observation was given 2; a sample for which sparkle was slightly observed but was of a level that could be ignored was given 1; and a sample for which sparkle was observed to a severe degree was given 0. A sample with an average score of 1.8 or higher from the 20 persons was given A; a sample with an average score of 1.6 or higher and lower than 1.8 was given B; a sample with an average score of 1.0 or higher and lower than 1.6 was given C; and a sample with an average score of less than 1.0 was given D. The results are shown in Table 2.

A2. Preparation of Touch Panel Pen Writing Member

Experimental Example A1

The substrate used was a polyethylene terephthalate film (thickness: 100 μm, manufactured by Toyobo Co., Ltd., trade name: A4300). A first resin layer coating liquid A1 having the formulation described below was applied onto the substrate such that the thickness after drying was 8 μm. A resin layer was formed by drying and ultraviolet irradiation to be a first resin layer, and then a second resin layer coating liquid A2 having the formulation described below was applied onto the first resin layer such that the thickness after drying was 3 μm, then dried and UV-irradiated to form a second resin layer, thereby preparing a touch panel pen writing member.

<First Resin Layer Coating Liquid A1>

| | |
|---|---|
| Pentaerythritol triacrylate | 60 parts |
| Dipentaerythritol hexaacrylate | 40 parts |
| Photopolymerization initiator (manufactured by BASF SE, trade name: Irgacure 184) | 4 parts |
| Solvent 1 (methyl isobutyl ketone) | 90 parts |
| Solvent 2 (methyl ethyl ketone) | 10 parts |

<Second Resin Layer Coating Liquid A2>

| | |
|---|---|
| Acrylic monomer | 100 parts |
| Organic particles (spherical polystyrene particles, average particle size: 3.0 μm) | 20 parts |
| Photopolymerization initiator (manufactured by BASF SE, trade name: Irgacure 184) | 5 parts |
| Silicone leveling agent (manufactured by Momentive Performance Materials Inc., trade name: TSF4460) | 0.3 parts |
| Solvent 1 (toluene) | 90 parts |
| Solvent 2 (MIBK) | 10 parts |

Experimental Example A2

The substrate used was a triacetyl cellulose resin film (thickness: 80 μm, manufactured by Fujifilm Corporation, TD80UL). A resin layer coating liquid A3 having the formulation described below was applied onto the substrate such that the thickness after drying was 2.5 μm. A resin layer was formed by drying and ultraviolet irradiation thereby preparing a touch panel pen writing member.

<Resin Layer Coating Liquid A3>

| | |
|---|---|
| Pentaerythritol triacrylate (manufactured by Nippon Kayaku Co., Ltd.; KAYARAD-PET-30) | 100 parts |
| Inorganic particles (manufactured by Fuji Silysia Chemical Ltd., indefinite shape silica) (hydrophobized, silane coupling agent, average aggregated particle size: 2 μm) | 15 parts |
| Photopolymerization initiator (manufactured by BASF SE, Irgacure 184) | 5 parts |
| Silicone leveling agent (manufactured by Momentive Performance Materials Inc., TSF4460) | 0.2 parts |
| Mold release agent (manufactured by Daikin Industries, Ltd., trade name: OPTOOL DAC) | 2 parts |
| Solvent 1 (toluene) | 90 parts |
| Solvent 2 (MIBK) | 10 parts |

Experimental Example A3

The substrate used was a triacetyl cellulose resin film having a thickness of 40 μm. A resin layer coating liquid A4 having the formulation described below was applied onto the substrate such that the thickness after drying was 7 μm. A resin layer was formed by drying and ultraviolet irradiation thereby preparing a touch panel pen writing member.

<Resin Layer Coating Liquid A4>

| | |
|---|---|
| Pentaerythritol triacrylate (manufactured by Nippon Kayaku Co., Ltd.; KAYARAD-PET-30) | 100 parts |
| Organic particles (spherical polyethylene, average particle size 3.5 μm) | 11 parts |
| Fumed silica (average primary particle size 10 nm) | 7 parts |
| Photopolymerization initiator (manufactured by BASF SE, Irgacure 184) | 3 parts |
| Silicone leveling agent (manufactured by Momentive Performance Materials Inc., TSF4460) | 0.125 parts |
| Solvent 1 (toluene) | 65 parts |
| Solvent 2 (PMA) | 10 parts |
| Solvent 3 (isopropyl alcohol) | 25 parts |

Experimental Example A4

Commercially available touch panel surface films (manufactured by Sony Corp., trade name: Friction Sheet DPTA-OSF1) having a resin layer containing particles (particle size: approximately 7 to 13 μm) on a polyethylene terephthalate film were provided as touch panel pen writing members of Experimental Example A4.

TABLE 1

|  |  |  | Experimental Example A1 | Experimental Example A2 | Experimental Example A3 | Experimental Example A4 |
|---|---|---|---|---|---|---|
| Pen A1 | Requirement A1-1 | $F_{re}/F_k$ | 0.97 | 1.33 | 0.33 | 0.38 |
|  | Requirement A1-2 | $F_{re}$ (gf) | 2.6 | 19.5 | 1.4 | 2.3 |
|  | Requirement A1-3 | $F_k$ (gf) | 2.7 | 14.7 | 4.2 | 6.1 |
|  | Requirement A1-4 | $\sigma F_k$ (gf) | 1.1 | 3.7 | 3.2 | 4.3 |
|  | Writing Feel |  | AA | AA | C | C |
|  | Nib Wear |  | A | B | A | C |
| Pen A2 | Requirement A1-1 | $F_{re}/F_k$ | 0.85 | 0.48 | 0.39 | 0.32 |
|  | Requirement A1-2 | $F_{re}$ (gf) | 1.2 | 5.5 | 1.1 | 2.4 |
|  | Requirement A1-3 | $F_k$ (gf) | 2.0 | 11.5 | 2.9 | 7.4 |
|  | Requirement A1-4 | $\sigma F_k$ (gf) | 0.6 | 3.2 | 2.7 | 4.7 |
|  | Writing Feel |  | A | A | D | C |
|  | Nib Wear |  | A | B | A | C |

TABLE 2

|  | Experimental Example A1 | Experimental Example A2 | Experimental Example A3 | Experimental Example A4 |
|---|---|---|---|---|
| Ra (μm) | 0.4 | 0.7 | 0.1 | 1.2 |
| Rt (μm) | 3.9 | 6.3 | 1.3 | 11.2 |
| θa (degree) | 6.1 | 9.5 | 2.2 | 4.2 |
| λa (μm) | 24 | 26 | 16 | 103 |
| Area Ratio of Particles (%) | 24.7 | 28.7 | 3.3 | 12.6 |
| 100 μm Square Particle Density (number of particles/100 μm square) | 0.94 | 1.34 | 1.81 | 0.06 |
| λa/Particle Density | 26 | 19 | 9 | 1717 |
| Haze (%) | 59.3 | 57.8 | 40.7 | 22.1 |
| Total Light Transmission (%) | 89.5 | 90.0 | 91.1 | 89.4 |
| Sparkle | A | A | A | D |

As shown in Table 1, the writing members satisfying the requirement A1-1 are given a writing feel evaluation of A or more. This indicates that selecting writing members satisfying the requirement A1-1 leads to selecting writing members having a good writing feel. The pen A1 has voids but the pen 2 is bulky not having voids, that is, the type of the pen A1 quite differs from the type of the pen A2. Consequently, the results in Table 1 indicate that, for all different types of touch panel pens, selecting a writing member satisfying the requirement A1-1 leads to selecting a writing member having a good writing feel.

Further, from the results in Table 1, it is confirmed that a combination of a touch panel pen (pen Al) whose nib region has a deformation-promoting region (i) and a hardness-imparting region (ii), and a writing member whose physical properties such as λa fall within the preferred ranges shown in the description is a combination effective for bettering a writing feel with them.

In addition, from the results in Table 1, it is confirmed that the case where the requirement A1-4 is satisfied and where the physical properties (λa and others) of the writing member fall within the preferred ranges shown in the description is extremely excellent in prevention of nib wear while bettering a writing feel.

Also from the results in Table 1 and Table 2, it is confirmed that the writing members such that λa, the area ratio of particles, λa/particle density, and the haze fall within the preferred ranges in the description (writing members of Experimental Examples A1 and A2) can readily better a writing feel and are extremely excellent in prevention of sparkle.

A3. Preparation of Touch Panel

A conductive film of ITO having a thickness of 20 nm was formed by the sputtering method on the substrate side of the touch panel pen writing member of Experimental Examples A1 to A4 to prepare an upper electrode plate. Subsequently, a conductive film of ITO having a thickness of approximately 20 nm was formed by the sputtering method on one side of a reinforced glass plate having a thickness of 1 mm to prepare a lower electrode plate. Subsequently, a coating liquid for spacers containing an ionizing radiation-curable resin (Dot Cure TR5903; Taiyo Ink Mfg. Co., Ltd.) was printed in a dot pattern by the screen printing method on the surface having the conductive film in the lower electrode plate, and then irradiated with ultraviolet ray using a high-pressure mercury lamp to arrange spacers having a diameter of 50 μm and a height of 8 μm at 1-mm intervals.

Subsequently, the upper electrode plate and the lower electrode plate were placed such that their conductive films faced each other. The margins were bonded with a double-sided adhesive tape having a thickness of 30 μm and a width of 3 mm to prepare resistive touch panels of Experimental Examples A1 to A4.

As a result of writing with the touch panel pens A1 to A2 on the resistive touch panels of Experimental Examples A1 to A4, each touch panel pen produced evaluation results about a writing feel at restarting similar to those shown in Table 1. This result indicates that a touch panel system including a touch panel and a touch panel pen in combination can provide a good writing feel at restarting so far as the touch panel system satisfies the requirement A1-1.

A. Preparation of Display Device

The touch panel pen writing member of each of Experimental Examples A1 to A4 was laminated with a commercially available ultra-high-resolution liquid-crystal display device (smartphone manufactured by Sharp Corporation, trade name: SH-03G, pixel density: 480 ppi) via a transparent pressure-sensitive adhesive to prepare display devices of Experimental Examples A1 to A4. For the lamination, the substrate side of the touch panel pen writing member faced the display component side.

As a result of writing with the touch panel pens A1 to A2 on the display devices of Experimental Examples A1 to A4, each touch panel pen produced evaluation results about writing feel similar to those shown in Table 1.

Examples of Embodiment B

B1. Measurement and Evaluation

Touch panel pen writing members prepared or provided in Experimental Examples were measured and evaluated as described below.

B1-1. Friction Force

HEIDON-14DR, a trade name by Shinto Scientific Co., Ltd., was used as a measurement apparatus. As shown in FIG. 3, a touch panel pen B1 to B4 mentioned below was kept in contact with the surface on a resin layer side of a touch panel pen writing member, at an angle of 60 degrees, and secured with a holder. A 100-g weight was put on a stand above the holder so as to impart a vertical load of 100 gf to the touch panel pen. While the load was kept applied, the movable bed to which a writing member was secured was moved toward the acute-angle direction of the angle formed by the movable bed and the touch panel pen (in the right-hand direction of FIG. 3) at a speed of 14 mm/sec. The friction force in the movement direction (in the acute-angle direction of the pen) given to the pen in moving it in one direction of a length of 40 mm was measured. The sampling time (measurement interval) was 0.001 seconds, and the atmosphere during the measurement was at a temperature of 23° C.±5° C. and a humidity of 40 to 65%. Other analysis conditions are shown below. Based on the measured results, a standard deviation of kinetic friction force ($\sigma F_k$), an average of kinetic friction force ($F_k$), a maximum value of kinetic friction force ($F_{kmax}$) and a time rate (T) at which the kinetic friction force is 3.0 gf or less were calculated according to the process of (A) to (D) mentioned above. The results are shown in Table 3.

<Other Analysis Conditions>
Software for measurement: TriboSoft 35 (version: TriboSoft 3.59)
Mode: measurement under constant load
Load transducer capacity: 2,000 gf
DAS ample range: 50%
Vertical load: 100 g
Sampling capacity: 5,500 samples
Unit system: CGS
One way measurement mode
FEED SCALE 40 mm
POLARITY: OFF
FILTER: PASS
RANGE: 50% FS
Load cell calibration (zero and span value inputting): analogue dial set <Touch Panel Pen B1>
Pen using a replacement felt tip (DPTA-PTF1) for a stylus pen for digital paper (trade name: DPT-S1) manufactured by Sony Corp.
Configuration of nib region: composite of aggregates of polyester fibers (hardness-imparting region (i)) mixed with air pores (deformation-promoting region (ii))
Young's modulus of region (i): 2 GPa
Nib diameter: 1.3 mm
Degree of nib roughness: $\sigma\Delta h_n$=0.014 μm <Touch Panel Pen B2>
Touch panel pen attached to "Surface Pro 3", trade name by Microsoft Corp.
Constitution of nib region: bulk of polyacetal resin (POM)
Young's modulus of Nib component (POM): more than 1 GPa
Nib diameter: 2.0 mm
Degree of nib roughness: $\sigma\Delta h_n$=0.006 μm <Touch Panel Pen B3>
Touch panel pen attached to "Apple Pencil", trade name by Apple Inc.
Constitution of nib region: bulk of nylon resin
Young's modulus of Nib component (nylon resin): 2 GPa
Nib diameter: 1.9 mm
Degree of nib roughness: $\sigma\Delta h_n$=0.006 μm B1-2. Writing Feel A surface opposite to the resin layer side of the touch panel pen writing member was laminated onto a glass plate via an optical transparent pressure-sensitive adhesive sheet (thickness: 100 μm) manufactured by Toray Industries, Inc., and evaluated for a writing feel using the touch panel pens B1 to B3 described above. The writing feeling was evaluated as to the two items mentioned below. The results are shown in Table 3.

The atmosphere for the evaluation involved a temperature of 23° C.±5° C. and a humidity of 40 to 65%. Before the start of the evaluation, each sample was left in an atmosphere involving 23° C.±5° C. and a humidity of 40 to 65% for 10 minutes or longer.

<Feel in Writing>
20 persons graded samples such that: a sample that offered a favorable writing feel was given 2; a sample that offered a normal writing feel was given 1; and a sample that offered an unfavorable writing feel was given 0. A sample with an average score of 1.8 or higher from the 20 persons was given AA; a sample with an average score of 1.6 or higher and lower than 1.8 was given A; a sample with an average score of 1.0 or higher and lower than 1.6 was given B; and a sample with an average score of lower than 1.0 was given C.

<Hand Fatigue>
After continuous writing for 3 minutes (writing with no instantaneous stopping), hand fatigue was checked. 20 persons graded samples such that: a sample that did not offer any hand fatigue was given 2; a sample on an average level was given 1; and a sample that offered hand fatigue was given 0. A sample with an average score of 1.8 or higher from the 20 persons was given AA; a sample with an average score of 1.6 or higher and lower than 1.8 was given A; a sample with an average score of 1.0 or higher and lower than 1.6 was given B; and a sample with an average score of lower than 1.0 was given C.

B1-3. Evaluation of Surface Profile

The touch panel writing members in Experimental Examples were cut into 10-cm square pieces. The cutting locations were selected from random sites after visual confirmation that abnormalities such as waste or flaws were absent. The cut writing member was laminated onto a black plate (manufactured by Kuraray Co., Ltd., trade name: COMOGLAS, model number: DFA502K, thickness: 2.0 mm) having a size of 10 cm in length×10 cm in width via an optical transparent pressure-sensitive adhesive sheet (refractive index: 1.47, thickness: 100 μm) manufactured by Toray Industries, Inc. 15 such samples were provided.

Using a surface roughness tester (model number: SE-3400; manufactured by Kosaka Laboratory Ltd.), each sample was set so as to be secured and tightly adhered to the measurement stage, and then tested for the measurement items mentioned below under the same measurement conditions as those for evaluation of surface profile in Examples of the embodiment A mentioned hereinabove, to thereby determine the surface profile on the resin layer side of the touch panel pen writing member of each sample. Average values from the 15 samples were used as Rt, θa and λa of each Experimental Example. Regarding the evaluation atmosphere, the temperature was 23±5° C. and the humidity was 40 to 65%. Before the start of measurement, each sample was left in an atmosphere at 23±5° C. and a humidity of 40 to 65% for 10 minutes or more. The results are shown in Table 4.

<Measurement Items>
Maximum profile height Rt on a roughness curve of JIS B0601:2001 with a cutoff value of 0.8 mm
Average tilt angle θa with a cutoff value of 0.8 mm
Average wavelength λa with a cutoff value of 0.8 mm B1-4. Area Ratio of Particles and Density of Particles The touch panel writing members of Experimental Examples were cut into 5-cm square pieces, and 15 such pieces were prepared. 15 sites were selected from random sites after visual confirmation that abnormalities such as waste or flaws were absent. The area ratio of particles and the density of particles were calculated according to the following process of (1) and (2), and an average value of the measured data of these 15 samples was calculated for the area ratio of particles and the density of particles in each Experimental Example. The results are shown in Table 4.

(1) SEM Planar Photographing

A SEM planar photograph of the writing member surface was taken under a digital scanning electron microscope (model number: S-4800) manufactured by Hitachi Kyowa Engineering Co., Ltd. at a magnification of ×50,000 (accelerating voltage: 30.0 kV, emission current: 10 μA).

(2) Calculation of Area Ratio and Particle Density

The image was binarized from the digital data of the SEM photograph using image analysis software (trade name: WinRoof, manufactured by Mitani Corp.), and particle parts were selected to calculate the area ratio (%) and particle density (number of particles/100 μm square) of the particles. The results are shown in Table 4.

B1-5. Haze, Total Light Transmittance

The haze (JIS K-7136: 2000) and the total light transmittance (JIS K7361-1: 1997) of each sample produced in the above "1-4" were measured using a haze meter (HM-150, manufactured by Murakami Color Research Laboratory Co., Ltd.). Average values from 15 samples were used as the haze and the total light transmittance in each Experimental Example. Regarding the evaluation atmosphere, the temperature was 23±5° C. and the humidity was 40 to 65%. Before the start of measurement, each sample was left in an atmosphere at 23±5° C. and a humidity was 40 to 65% for 10 minutes or more. The surface of light incidence was set to the substrate side. The results are shown in Table 4.

B1-6. Nib Wear

HEIDON-14DR, a trade name by Shinto Scientific Co., Ltd., was used as a measurement apparatus. As shown in FIG. 3, a touch panel pen B1 to B3 mentioned below was kept in contact with the surface on a resin layer side of a touch panel pen writing member, at an angle of 60 degrees, and secured with a holder. A 200-g weight was put on a stand above the holder so as to impart a vertical load of 200 gf to the touch panel pen. While the load was kept applied, the movable bed to which a writing member was secured was reciprocated 200 times each for a one-direction length of 40 mm at a speed of 14 mm/sec. Regarding the evaluation atmosphere, the temperature was 23±5° C. and the relative humidity was 40 to 65%.

The evaluation standards are such that: (i) the kinetic friction force change during the measurement relative to the initial kinetic friction force is 40% or less, (ii) the nib wear of the touch panel pen is not visually confirmed with ease, and a sample satisfying both (i) and (ii) was given "A", a sample not satisfying any of (i) and (ii) was given "B", and a sample not satisfying both (i) and (ii) was given "C".

The results are shown in Table 3.

B1-7. Sparkle

Each touch panel pen writing member of Experimental Examples B1 to B4 was placed on a commercially available ultra-high-resolution liquid-crystal display device (smartphone manufactured by Sharp Corporation, trade name: SH-03G, pixel density: 480 ppi), and the sparkling state was visually checked. Twenty persons graded the samples such that: a sample for which sparkle was of a level that could not be recognized by visual observation was given 2; a sample for which sparkle was slightly observed but was of a level that could be ignored was given 1; and a sample for which sparkle was observed to a severe degree was given 0. A sample with an average score of 1.8 or higher from the 20 persons was given A; a sample with an average score of 1.6 or higher and lower than 1.8 was given B; a sample with an average score of 1.0 or higher and lower than 1.6 was given C; and a sample with an average score of less than 1.0 was given D. The results are shown in Table 4.

2. Production and Preparation of Touch Panel Pen Writing Member

[Experimental Example B1]

The substrate used was a polyethylene terephthalate film (thickness: 100 μm, manufactured by Toyobo Co., Ltd., trade name: A4300). A first resin layer coating liquid B1 having the formulation described below was applied onto the substrate such that the thickness after drying was 8 μm. A resin layer was formed by drying and ultraviolet irradiation to be a first resin layer, and then a second resin layer coating liquid B2 having the formulation described below was applied onto the first resin layer such that the thickness after drying was 3 μm, then dried and UV-irradiated to form a second resin layer, thereby preparing a touch panel pen writing member.

<First Resin Layer Coating Liquid B 1>

| | |
|---|---|
| Pentaerythritol triacrylate | 60 parts |
| Dipentaerythritol hexaacrylate | 40 parts |
| Photopolymerization initiator (manufactured by BASF SE, trade name: Irgacure 184) | 4 parts |
| Solvent 1 (methyl isobutyl ketone) | 90 parts |
| Solvent 2 (methyl ethyl ketone) | 10 parts |

<Second Resin Layer Coating Liquid B2>

| | |
|---|---|
| Acrylic monomer | 100 parts |
| Organic particles (spherical polystyrene particles, average particle size: 3.0 μm) | 20 parts |
| Photopolymerization initiator (manufactured by BASF SE, trade name: Irgacure 184) | 5 parts |
| Fluorine-containing leveling agent (manufactured by DIC Corporation, Megafac RS-75) | 0.3 parts |
| Solvent 1 (toluene) | 90 parts |
| Solvent 2 (methyl isobutyl ketone) | 10 parts |

Experimental Example B2

The substrate used was a PET film having a thickness of 100 μm. A first resin layer coating liquid B3 having the formulation described below was applied onto the substrate such that the thickness after drying was 4 μm. A resin layer was formed by drying and ultraviolet irradiation to be a first resin layer, and then a second resin layer coating liquid B4 having the formulation described below was applied onto the first resin layer such that the thickness after drying was 200 nm, then dried and UV-irradiated to form a second resin layer, thereby preparing a touch panel pen writing member. In the step of forming the first resin layer, the ionizing radiation-curable resin composition was kept semi-cured, and thereafter in the step of forming the second resin layer, the ionizing radiation-curable resin compositions of the first resin layer and the second resin layer were completely cured.

<First Resin Layer Coating Liquid B3>

| | |
|---|---|
| Pentaerythritol triacrylate | 60 parts |
| Dipentaerythritol hexaacrylate | 40 parts |
| Organic particles (spherical polystyrene particles, average particle diameter 5.0 μm) | 2 parts |
| Inorganic particles (hydrophobized indefinite shape silica, average particle diameter 4.0 μm) | 15 parts |
| Photopolymerization initiator (manufactured by BASF SE, trade name: Irgacure 184) | 3.5 parts |
| Fluorine-containing leveling agent (manufactured by DIC Corporation, Megafac RS-75) | 0.1 parts |
| Solvent 1 (toluene) | 120 parts |
| Solvent 2 (cyclohexanone) | 50 parts |

<Second Resin Layer Coating Liquid B4>

| | |
|---|---|
| Polyfunctional acrylate (manufactured by Nippon Kayaku Co., Ltd., KAYARAD PET-30) | 100 parts |
| Hollow silica particles (average primary particle diameter 60 nm) | 90 parts |
| Antifouling agent A show below | 5 parts |
| Photopolymerization initiator (manufactured by BASF SE, trade name: Irgacure 127) | 7 parts |
| Solvent 1 (methyl isobutyl ketone) | 7500 parts |
| Solvent 2 (propylene glycol monomethyl ether acetate) | 830 parts |

Experimental Example B31

The substrate used was a triacetyl cellulose resin film having a thickness of 40 μm. A resin layer coating liquid B5 having the formulation described below was applied onto the substrate such that the thickness after drying was 7 μm. A resin layer was formed by drying and ultraviolet irradiation thereby preparing a touch panel pen writing member.

<Resin Layer Coating Liquid B5>

| | |
|---|---|
| Pentaerythritol triacrylate (manufactured by Nippon Kayaku Co., Ltd., KAYARAD-PET-30) | 100 parts |
| Organic particles (spherical polystyrene, average particle diameter 3.5 μm) | 11 parts |
| Fumed silica (average primary particle diameter 10 nm) | 7 parts |
| Photopolymerization initiator (manufactured by BASF SE, Irgacure 184) | 3 parts |
| Silicone leveling agent (manufactured by Momentive Performance Materials Inc., TSF4460) | 0.125 parts |
| Solvent 1 (toluene) | 65 parts |
| Solvent 2 (anone) | 10 parts |
| Solvent 3 (isopropyl alcohol) | 25 parts |

Experimental Example B4

Commercially available touch panel surface films (manufactured by Sony Corp., trade name: Friction Sheet DPTA-OSF1) having a resin layer containing particles (particle size: approximately 7 to 13 μm) on a polyethylene terephthalate film were provided as touch panel pen writing members of Experimental Example B4.

TABLE 3

| | | Requirement B1-1 σFk (gf) | Requirement B1-2 T (%) | $F_k$ (gf) | $F_{kmax}$ (gf) | Writing Feel (feel in writing) | Writing Feel (hand fatigue) | Nib Wear |
|---|---|---|---|---|---|---|---|---|
| Pen B1 | Experimental Example B1 | 2.2 | 73% | 2.6 | 16 | AA | A | A |
| | Experimental Example B2 | 2.5 | 53% | 3.8 | 13 | AA | A | B |
| | Experimental Example B3 | 1.1 | 100% | 1.2 | 5 | C | AA | A |
| | Experimental Example B4 | 4.0 | 38% | 5.6 | 18 | A | B | C |
| Pen B2 | Experimental Example B1 | 1.1 | 90% | 2.5 | 6 | C | A | A |
| | Experimental Example B2 | 4.6 | 27% | 7.3 | 21 | A | B | B |
| | Experimental Example B3 | 4.5 | 93% | 3.8 | 30 | C | AA | A |
| | Experimental Example B4 | 9.4 | 6% | 21.6 | 21 | A | C | C |
| Pen B3 | Experimental Example B1 | 2.2 | 73% | 2.6 | 16 | AA | A | A |
| | Experimental Example B2 | 4.2 | 10% | 8.5 | 20 | A | C | B |
| | Experimental Example B3 | 2.6 | 100% | 1.8 | 5 | C | AA | A |
| | Experimental Example B4 | 7.5 | 8% | 11.6 | 41 | A | C | C |

TABLE 4

|  | Experimental Example B1 | Experimental Example B2 | Experimental Example B3 | Experimental Example B4 |
|---|---|---|---|---|
| Rt (μm) | 3.8 | 4.9 | 1.3 | 11.2 |
| θa (degree) | 6.1 | 7.3 | 2.2 | 4.2 |
| λa (μm) | 25 | 30 | 23 | 102 |
| Area Ratio of Particles (%) | 29.5 | 16.9 | 3.3 | 12.6 |
| 100 μm Square Particle Density (number of particles/ 100 μm square) | 0.61 | 0.09 | 1.81 | 0.06 |
| λa/Particle Density | 41 | 333 | 13 | 1700 |
| Haze (%) | 59 | 54.6 | 41 | 22.1 |
| Total Light Transmission (%) | 89.5 | 91.6 | 91.1 | 89.4 |
| Sparkle | B | B | A | D |

The results in Table 3 confirm that the writing members satisfying the requirement B1-1 and the requirement B1-2 can better a writing feel. This indicates that selecting writing members satisfying the requirement B1-1 and the requirement B1-2 leads to selecting writing members having a high-level writing feel. The pens B1 to B3 all differ in type, and therefore the results in Table 3 show that, for all different types of touch panel pens, selecting a writing member satisfying the requirement B1-1 and the requirement B1-2 leads to selecting a writing member having a high-level writing feel.

The results in Table 3 also confirm that selecting a writing member that satisfies the requirement B1-1 tends to prevent nib wear. Further, the results in Table 3 and Table 4 confirm that the case where the requirement B1-1 is satisfied and where the physical properties (λa and others) of the writing member fall within the preferred ranges shown in the description is extremely excellent in prevention of nib wear.

Also from the results in Table 4, it is confirmed that the writing members such that λa, the area ratio of particles, λa/particle density, and the haze fall within the preferred ranges in the description (writing members of Experimental Examples B1 and B2) are extremely excellent in prevention of sparkle.

B3. Preparation of Touch Panel

A conductive film of ITO having a thickness of 20 nm was formed by the sputtering method on the substrate side of the touch panel pen writing member of Experimental Examples B1 to B4 to prepare an upper electrode plate. Subsequently, a conductive film of ITO having a thickness of approximately 20 nm was formed by the sputtering method on one side of a reinforced glass plate having a thickness of 1 mm to prepare a lower electrode plate. Subsequently, a coating liquid for spacers containing an ionizing radiation-curable resin (Dot Cure TR5903; Taiyo Ink Mfg. Co., Ltd.) was printed in a dot pattern by the screen printing method on the surface having the conductive film in the lower electrode plate, and then irradiated with ultraviolet ray using a high-pressure mercury lamp to arrange spacers having a diameter of 50 μm and a height of 8 μm at 1-mm intervals.

Subsequently, the upper electrode plate and the lower electrode plate were placed such that their conductive films faced each other. The margins were bonded with a double-sided adhesive tape having a thickness of 30 μm and a width of 3 mm to prepare resistive touch panels of Experimental Examples B1 to B4.

As a result of writing with the touch panel pens B1 to B3 on the resistive touch panels of Experimental Examples B1 to B4, each touch panel pen produced evaluation results about a writing feel at restarting similar to those shown in Table 3. This result indicates that a touch panel system including a touch panel and a touch panel pen in combination can provide a high-level writing feel so far as the touch panel system satisfies the requirement B1-1 and the requirement B1-2.

B4. Preparation of Display Device

The touch panel pen writing member of each of Experimental Examples B1 to B4 was laminated with a commercially available ultra-high-resolution liquid-crystal display device (smartphone manufactured by Sharp Corporation, trade name: SH-03G, pixel density: 480 ppi) via a transparent pressure-sensitive adhesive to prepare display devices of Experimental Examples B1 to B4. For the lamination, the substrate side of the touch panel pen writing member faced the display component side.

As a result of writing with the touch panel pens B1 to B3 on the display devices of Experimental Examples B1 to B4, each touch panel pen produced evaluation results about writing feel similar to those shown in Table 3.

B5. Combination of Other Touch Panel Pen and Other Writing Member

Using a touch panel pen B4 mentioned below and a writing member of the following Experimental Example B5, friction force was measured and writing feel was evaluated. The results are shown in Table 5.

<Touch Panel Pen B4>

Touch panel pen attached to "Dynabook Tab S68", a trade name by Toshiba Corporation
Configuration of nib region: composite of aggregates of polyester fibers (hardness-imparting region (i)) mixed with air pores (deformation-promoting region (ii))
Young's modulus of region (i): 3.0 GPa
Ratio by volume of region (i) to region (ii), about 95/5
Nib diameter: 1.4 mm
Degree of nib roughness: $\sigma\Delta h_n$=0.009 μm Experimental Example B51

The substrate used was a triacetyl cellulose resin film having a thickness of 40 μm. A resin layer coating liquid B6 having the formulation described below was applied onto the substrate such that the thickness after drying was 3 μm. A resin layer was formed by drying and ultraviolet irradiation thereby preparing a touch panel pen writing sheet.

<Resin Layer Coating Liquid B6>

| | |
|---|---|
| Pentaerythritol triacrylate (manufactured by Nippon Kayaku Co., Ltd.; KAYARAD-PET-30) | 93 parts |
| Inorganic particles (gel-process indefinite shape silica, manufactured by Fuji Silysia Chemical Ltd.) (hydrophobized, average particle size (laser diffraction scattering method) 4.1 μm) | 5 parts |
| Photopolymerization initiator (manufactured by BASF SE, Irgacure 184) | 5 parts |
| Silicone leveling agent (manufactured by Momentive Performance Materials Inc., TSF4460) | 0.001 parts |
| Solvent 1 (methyl isobutyl ketone) | 30 parts |
| Solvent 2 (methyl ethyl ketone) | 30 parts |
| Solvent 3 (isopropyl alcohol) | 30 parts |
| Solvent 4 (N-butanol) | 30 parts |

TABLE 5

| | Requirement B1-1 σFk (gf) | Requirement B1-2 T (%) | $F_k$ (gf) | $F_{kmax}$ (gf) | Writing Feel (feel in writing) | Writing Feel (hand fatigue) | Nib Wear |
|---|---|---|---|---|---|---|---|
| Pen B4 Experimental Example B5 | 16.0 | 28% | 18.3 | 76 | B | C | B |

The results in Table 5 confirm that the writing member not satisfying the requirement B1-1 as overstepping the uppermost limit of the requirement cannot better a writing feel. In Table 5, the writing member satisfies the requirement B1-2 but is not good in point of "writing feel (hand fatigue)". This is considered to be because, in the case of Table 5, the friction force may be low for a moment in some time, but standard writing feel is heavy.

The surface profile of the writing member of Experimental Example B5 was such that: Rt was 5.8 μm, θa was 3.8 degrees, λa was 36 μm, the area ratio of particles was 11.2%, the particle density was 0.46 (number of particles /100 μm square), λa/particle density was 78 particles/100 μm square, the haze was 23%, the total light transmittance was 90.5%, and the sparkle grade was C.

Examples of Embodiment C

C1. Measurement and Evaluation

Touch panel pen writing members in Examples and Comparative Examples were measured and evaluated as described below.

C1-1. Friction Force

HEIDON-18L, a trade name by Shinto Scientific Co., Ltd., was used as a measurement apparatus. As shown in FIG. 3, a touch panel pen C1 mentioned below was kept in contact with the surface on a resin layer side of the touch panel pen writing member of Examples and Comparative Examples, at an angle of 60 degrees, and secured with a holder. A 100-g weight was put on a stand above the holder so as to impart a vertical load of 100 gf to the touch panel pen. While the load was kept applied, the movable bed to which a writing member was secured was moved toward the acute-angle direction of the angle formed by the movable bed and the touch panel pen (in the right-hand direction of FIG. 3) at a speed of 14 mm/sec. The friction force in the movement direction (in the acute-angle direction of the pen) given to the pen in moving it in one direction of a length of 40 mm was measured. Further, after the movement of the movable bed and while the touch panel pen was kept in contact with the surface of the writing member at an angle of 60 degrees, the vertical load given to the touch panel pen was removed, and in this state, the residual friction force $F_{re}$ given to the touch panel pen in the movement direction thereof (in the acute-angle direction of the pen) was measured.

The sampling time (measurement interval) was 0.001 seconds, and the atmosphere during the measurement was at a temperature of 23° C.±5° C. and a humidity of 40 to 65%. Before the start of the measurement, each sample was left in an atmosphere at 23° C.±5° C. and a humidity of 40 to 65% for 10 minutes or more. The other analysis conditions are shown below.

Based on the measured results, $M_{100-200}$ in the requirement C1-1, $M_{8-100}$ in the requirement C1-2, an average of kinetic friction force in the requirement C1-3 ($F_k$), and an average of residual friction force in the requirement C1-4 ($F_{re}$) were calculated according to the above-described procedures (A) to (E). For calculating the integrated value of the power spectrum density (especially for calculating the discrete Fourier transform), free software "R" (version 3.3.3) was used. For $M_{100-200}$, $M_{8-100}$, $F_k$, and $F_{re}$ in each Example and Comparative Example, 15 samples were measured each once, and the resultant data of 15 samples were averaged. The results are shown in Table 6.

<Monitor Configuration>
RANGE: 100% FS
FILTER: PASS
POLARITY: OFF
Load cell calibration (zero and span value inputting): analogue dial set
<Analysis Conditions>
Software for measurement: Surface Track Version 3.00 D
Load: 100 gf
Scale: 100%
Sample rate: 1 msec
Samples: 4,000
Max Inst Load: 1,000 gf
<Touch Panel Pen C1>
Touch panel pen (nib: HB) attached to "Surface Pro 4", trade name by Microsoft Corp.
Constitution of nib: Composite of a mixture of an urethane resin binder and polyester fibers, mixed with air pores.
Nib diameter: 1.2 mm
C1-2. Writing Test
<(1) Hand Fatigue in Long-Term Writing>

The touch panel pen writing member of Examples and Comparative Examples was stuck to a glass plate via an optically-transparent pressure-sensitive adhesive sheet (thickness 100 μm) in such a manner that the surface of the member on the side opposite to the resin layer side thereof faced the glass plate to prepare a sample A. Using the touch panel pen C1, continuous writing was made on the surface of the writing member of the sample A with no interval for 10 minutes. The writing operation was to copy a commercially available novel written in Japanese.

20 persons (five 20s persons, five 30s persons, five 40s persons, and five 50s persons) carried out the writing test, and after the end of writing for 10 minutes, a sample not causing hand fatigue was given 2, a sample on an average level was given 1, and a sample causing some hand fatigue was given 0. A sample given an average score of 1.6 or more from 20 persons was given A, a sample given an average score of 1.2 or more and less than 1.6 was given B, a sample given an average score of 1.0 or more and less than 1.2 was given C, and a sample given an average score of less than 1.0 was given D.

Regarding the atmosphere in evaluation of hand fatigue and writing feel to be mentioned below, the temperature was 23° C.±5° C. and the relative humidity was 40 to 65%. Before the start of evaluation, each sample was left at 23° C.±5° C. and a relative humidity was 40 to 65% for 10 minutes or more.

<(2) Writing Feel>

Using the touch panel pen C1, test-writing was made on the surface of the writing member side of the sample A for 20 seconds.

A sample giving a good feel in writing is 20 persons (five 20s persons, five 30s persons, five 40s persons, and five 50s persons) carried out the test-writing, in which a sample giving a good feel in writing was given 2, a sample on an average level was given 1, and a sample giving an unfavorable feel in writing was given 0. A sample given an average score of 1.6 or more from 20 persons was given A, a sample given an average score of 1.2 or more and less than 1.6 was given B, a sample given an average score of 1.0 or more and less than 1.2 was given C, and a sample given an average score of less than 1.0 was given D.

C1-3. Nib Wear

HEIDON-14DR, a trade name by Shinto Scientific Co., Ltd., was used as a measurement apparatus. As shown in FIG. 3, the touch panel pen C1 was kept in contact with the surface on a resin layer side of a touch panel pen writing member, at an angle of 60 degrees, and secured with a holder. A 200-g weight was put on a stand above the holder so as to impart a vertical load of 200 gf to the touch panel pen. While the load was kept applied, the movable bed to which a writing member was secured was reciprocated 200 times each for a one-direction length of 40 mm at a speed of 14 mm/sec. Regarding the evaluation atmosphere, the temperature was 23±5° C. and the relative humidity was 40 to 65%.

The evaluation standards are such that: (i) the kinetic friction force change during the measurement relative to the initial kinetic friction force is 40% or less, (ii) the nib wear of the touch panel pen is not visually confirmed with ease, and a sample satisfying both (i) and (ii) was given "A", a sample not satisfying any of (i) and (ii) was given "B", and a sample not satisfying both (i) and (ii) was given "C". The results are shown in Table 6.

C1-4. Evaluation of Surface Profile

The touch panel writing members in Examples and Comparative Examples were cut into 10-cm square pieces. The cutting locations were selected from random sites after visual confirmation that abnormalities such as waste or flaws were absent. The cut writing member was laminated onto a black plate (manufactured by Kuraray Co., Ltd., trade name: COMOGLAS, model number: DFA502K, thickness: 2.0 mm) having a size of 10 cm in length×10 cm in width via an optical transparent pressure-sensitive adhesive sheet (refractive index: 1.47, thickness: 100 µm) manufactured by Toray Industries, Inc. 15 such samples B were provided.

Using a surface roughness tester (model number: SE-3400; manufactured by Kosaka Laboratory Ltd.), each sample B was set so as to be secured and tightly adhered to the measurement stage, and then tested for the measurement items mentioned below under the same measurement conditions as those for evaluation of surface profile in Examples of the embodiment A mentioned hereinabove, to thereby determine the surface profile on the resin layer side of the touch panel pen writing member of each sample B. Average values from the 15 samples B were used as Ra, Rt and θa of each Example and each Comparative Example. Regarding the evaluation atmosphere, the temperature was 23±5° C. and the humidity was 40 to 65%. Before the start of measurement, each sample was left in an atmosphere at 23±5° C. and a humidity of 40 to 65% for 10 minutes or more. The results are shown in Table 6.

<Measurement Items>

Arithmetic average roughness Ra according to JIS B0601: 1994 with a cutoff value of 0.8 mm On a roughness curve calculated based on JISB0601:1994 with a cutoff value of 0.8 mm, a sum of a maximum value of the mountain height in an evaluation length (a height from an average line to a mountain peak (a highest spot elevation of a mountain of the roughness curve)) and a maximum value of the valley depth (a depth from an average line to a valley bottom (a lowest spot elevation of a valley of the roughness curve)) (maximum profile height Rt)

Average tilt angle θa with a cutoff value of 0.8 mm

C1-5. Haze, Total Light Transmittance

Each touch panel writing member of Examples and Comparative Examples was cut into 15 pieces of 10 cm square. 15 such samples were provided. The haze (JIS K-7136: 2000) and the total light transmittance (JIS K7361-1: 1997) of each sample were measured using a haze meter (HM-150, manufactured by Murakami Color Research Laboratory Co., Ltd.). Average values from 15 samples were used as the haze and the total light transmittance in each Example and each Comparative Example. Regarding the evaluation atmosphere, the temperature was 23±5° C. and the humidity was 40 to 65%. Before the start of measurement, each sample was left in an atmosphere at 23±5° C. and a humidity was 40 to 65% for 10 minutes or more. The surface of light incidence was set to the substrate side. The results are shown in Table 6.

C1-6. Sparkle

Each touch panel pen writing member of Examples and Comparative Examples was placed on a commercially available ultra-high-resolution liquid-crystal display device (smartphone manufactured by Sharp Corporation, trade name: SH-03G, pixel density: 480 ppi), and the sparkling state was visually checked. Twenty persons graded the samples such that: a sample for which sparkle was of a level that could not be recognized by visual observation was given 2; a sample for which sparkle was slightly observed but was of a level that could be ignored was given 1; and a sample for which sparkle was observed to a severe degree was given 0. A sample with an average score of 1.8 or higher from the 20 persons was given A; a sample with an average score of 1.6 or higher and lower than 1.8 was given B; a sample with an average score of 1.0 or higher and lower than 1.6 was given C; and a sample with an average score of less than 1.0 was given D. The results are shown in Table 6.

C2. Preparation of Touch Panel Pen Writing Member

Experimental Example C1

The substrate used was a polyethylene terephthalate film (thickness: 100 µm, manufactured by Toyobo Co., Ltd., trade name: A4300). A resin layer coating liquid C1 having the formulation described below was applied onto the substrate such that the thickness after drying was 8 µm. A resin layer was formed by drying and ultraviolet irradiation, thereby preparing a touch panel pen writing member of Example C1.

<Resin Layer Coating Liquid C1

| | |
|---|---|
| Pentaerythritol triacrylate | 60 parts |
| Dipentaerythritol hexaacrylate | 40 parts |
| Organic particles (spherical polystyrene particles, average particle size: 5.0 µm) | 2 parts |

| Inorganic particles (gel-process indefinite shape silica, hydrophobized, average particle size: 4.0 μm) | 15 parts |
|---|---|
| Photopolymerization initiator (manufactured by BASF SE, Irgacure 184) | 3.5 parts |
| Silicone leveling agent (manufactured by Momentive Performance Materials Inc., TSF4460) | 0.1 parts |
| Solvent 1 (toluene) | 120 parts |
| Solvent 2 (cyclohexanone) | 50 parts |

Example C2

The substrate used was a polyethylene terephthalate film (thickness: 100 μm, manufactured by Toyobo Co., Ltd., trade name: A4300). A resin layer coating liquid C2 having the formulation described below was applied onto the substrate such that the thickness after drying was 5 μm. A resin layer was formed by drying and ultraviolet irradiation, thereby preparing a touch panel pen writing member of Example C2.

<Resin Layer Coating Liquid C2>

| Pentaerythritol triacrylate | 38 parts |
|---|---|
| Isocyanuric acid EO-modified triacrylate | 22 parts |
| Photopolymerization initiator (manufactured by BASF SE, Irgacure 184) | 4 parts |
| Silicone leveling agent (manufactured by Momentive Performance Materials Inc., TSF4460) | 0.1 parts |
| Translucent particles (spherical polyacrylic-styrene copolymer (average particle size 5 μm, refractive index 1.525) | 10 parts |
| Fumed silica (average primary particle diameter 12 nm) | 5 parts |
| Solvent 1 (toluene) | 80 parts |
| Solvent 2 (cyclohexanone) | 20 parts |

Comparative Example C1

The substrate used was a polyethylene terephthalate film (thickness: 100 μm, manufactured by Toyobo Co., Ltd., trade name: A4300). A resin layer coating liquid C3 having the formulation described below was applied onto the substrate such that the thickness after drying was 10 μm. A resin layer was formed by drying and ultraviolet irradiation, thereby preparing a touch panel pen writing member of Comparative Example C1.

<Resin Layer Coating Liquid C3>

| Pentaerythritol triacrylate | 100 parts |
|---|---|
| Cellulose derivative (cellulose acetate propionate) | 1 part |
| Organic particles (spherical acrylic particles, average particle diameter 25 μm) | 3 parts |
| Inorganic particles (gel-process indefinite shape silica, hydrophobized, average particle size: 4.0 μm) | 14 parts |
| Photopolymerization initiator (manufactured by BASF SE, Irgacure 184) | 5 parts |
| Silicone leveling agent (manufactured by Momentive Performance Materials Inc., TSF4460) | 0.1 parts |
| Solvent 1 (toluene) | 170 parts |
| Solvent 2 (methyl isobutyl ketone) | 45 parts |

Comparative Example C2

The substrate used was a polyethylene terephthalate film (thickness: 100 μm, manufactured by Toyobo Co., Ltd., trade name: A4300). A resin layer coating liquid C4 having the formulation described below was applied onto the substrate such that the thickness after drying was 5 μm. A resin layer was formed by drying and ultraviolet irradiation, thereby preparing a touch panel pen writing member of Comparative Example C2.

<Resin Layer Coating Liquid C4>

| Pentaerythritol triacrylate | 90 parts |
|---|---|
| Acrylic resin (PMMA; average molecular weight 75,000) | 10 parts |
| Organic particles (spherical acrylic particles, average particle diameter 14.0 μm) | 30 parts |
| Photopolymerization initiator (manufactured by BASF SE, Irgacure 184) | 3 parts |
| Silicone leveling agent (manufactured by Momentive Performance Materials Inc., TSF4460) | 0.2 parts |
| Solvent 1 (toluene) | 173 parts |
| Solvent 2 (methyl isobutyl ketone) | 24 parts |

Comparative Example C3

The substrate used was a polyethylene terephthalate film (thickness: 100 μm, manufactured by Toyobo Co., Ltd., trade name: A4300). A resin layer coating liquid C5 having the formulation described below was applied onto the substrate such that the thickness after drying was 20 μm. A resin layer was formed by drying and ultraviolet irradiation, thereby preparing a touch panel pen writing member of Comparative Example C3.

<Resin Layer Coating Liquid C5>

| Polyester acrylate | 50 parts |
|---|---|
| Urethane acrylate | 110 parts |
| Photopolymerization initiator (manufactured by BASF SE, Irgacure 184) | 5 parts |
| Fluorosilicone copolymer leveling agent (manufactured by Shin-Etsu Chemical Co., Ltd., χ-71-1203M) | 0.2 parts |
| Solvent 1 (methyl ethyl ketone) | 50 parts |
| Solvent 2 (methyl isobutyl ketone) | 150 parts |

TABLE 6

| | | Example C1 | Example C2 | Comparative Example C1 | Comparative Example C2 | Comparative Example C3 |
|---|---|---|---|---|---|---|
| Requirement C1-1 | $M_{100-200}$ [(gf)$_2$] | 0.172 | 0.284 | 0.510 | 11.473 | 0.023 |
| Requirement C1-2 | $M_{8-100}$ [(gf)$_2$] | 0.217 | 0.219 | 0.236 | 1.331 | 0.083 |
| Requirement C1-3 | $F_k$ [(gf)] | 30.2 | 40.4 | 31.5 | 44.3 | 13.7 |

TABLE 6-continued

|  |  | Example C1 | Example C2 | Comparative Example C1 | Comparative Example C2 | Comparative Example C3 |
|---|---|---|---|---|---|---|
| Requirement C1-4 | $F_{re}$ [(gf)] | 25.2 | 27.6 | 27.8 | 40.1 | 1.2 |
| Surface Profile | Ra [μm] | 0.499 | 0.155 | 0.252 | 1.129 | 0.021 |
|  | Rt [μm] | 4.6 | 1.4 | 6.5 | 9.1 | 0.2 |
|  | θa [degree] | 5.24 | 1.73 | 1.97 | 3.51 | 0.04 |
|  | [θa(degree)/Ra(μm)] | 10.5 | 11.2 | 7.8 | 3.1 | 1.9 |
| Optical Properties | haze [%] | 41.3 | 24.6 | 13.0 | 22.1 | 0.2 |
|  | total light transmittance [%] | 90.4 | 90.9 | 90.5 | 89.4 | 92.1 |
| Writing Test | hand fatigue | A | A | C | D | A |
|  | writing feel | A | A | B | C | C |
| Nib Wear |  | A | A | B | C | A |
| Sparkle |  | B | B | C | D | A |

As shown in Table 6, the writing members of Examples satisfying the requirement C1-1 were given A as fatigue evaluation. This indicates that selecting writing members satisfying the requirement C1-1 leads to selecting writing members that may cause hand fatigue even in long-term writing.

Also from the results in Table 6, it is confirmed that the writing members whose physical properties (θa/Ra, etc.) fall within the preferred ranges in the description are extremely excellent in prevention of nib wear. Further, from the results in Table 6, it is confirmed that the writing members such that θa/Ra and the haze fall within the preferred ranges in the description are excellent in prevention of sparkle.

C3. Preparation of Touch Panel

A conductive film of ITO having a thickness of 20 nm was formed by the sputtering method on the substrate side of the touch panel pen writing member of Examples and Comparative Examples to prepare an upper electrode plate. Subsequently, a conductive film of ITO having a thickness of approximately 20 nm was formed by the sputtering method on one side of a reinforced glass plate having a thickness of 1 mm to prepare a lower electrode plate. Subsequently, a coating liquid for spacers containing an ionizing radiation-curable resin (Dot Cure TR5903; Taiyo Ink Mfg. Co., Ltd.) was printed in a dot pattern by the screen printing method on the surface having the conductive film in the lower electrode plate, and then irradiated with ultraviolet ray using a high-pressure mercury lamp to arrange spacers having a diameter of 50 μm and a height of 8μm at 1-mm intervals.

Subsequently, the upper electrode plate and the lower electrode plate were placed such that their conductive films faced each other. The margins were bonded with a double-sided adhesive tape having a thickness of 30 μm and a width of 3 mm to prepare resistive touch panels of Examples C1 to C2 and Comparative Examples C1 to C3.

As a result of writing with the touch panel pen C1 on the resistive touch panels of Examples C1 to C2 and Comparative Examples C1 to C3, each touch panel pen produced evaluation results about writing performance (hand fatigue, writing feel) similar to those shown in Table 6. This result indicates that a touch panel system including a touch panel and a touch panel pen in combination hardly causes hand fatigue in long-term writing so far as the touch panel system satisfies the requirement C1-1.

C4. Preparation of Display Device

The touch panel pen writing member of each of Examples C1 to C2 and Comparative Examples C1 to C3 was laminated with a commercially available ultra-high-resolution liquid-crystal display device (smartphone manufactured by Sharp Corporation, trade name: SH-03G, pixel density: 480 ppi) via a transparent pressure-sensitive adhesive to prepare display devices of Examples C1 to C2 and Comparative Examples C1 to C3. For the lamination, the substrate side of the touch panel pen writing member faced the display component side.

As a result of writing with the touch panel pen C1 on the display devices of Examples C1 to C2 and Comparative Examples C1 to C3, each touch panel pen produced evaluation results about writing performance (hand fatigue, writing feel) similar to those shown in Table 6.

REFERENCE SIGNS LIST

1: Substrate
2: Resin layer
10: Touch panel pen writing member
20: Transparent substrate
30: Conductive film
40: Spacer
50: X-axis electrode
60: Y-axis electrode
70: Insulator layer
82: Movable bed
83: Weight
84: Holder
85: Stand
100: Touch panel
200: Touch panel pen

The invention claimed is:

1. A method for selecting a touch panel pen writing member, comprising selecting a writing member satisfying the following requirement A1-1 as a touch panel pen writing member:

Requirement A1-1 an average of kinetic friction force and an average of residual friction force obtained below satisfy a relationship: 0.45<average of residual friction force/average of kinetic friction force;

wherein a touch panel pen is secured in a state of being in contact with the surface of the touch panel pen writing member at an angle of 60 degrees, then while a vertical load of 100 grams-force (gf) is kept applied to the touch panel pen and while the touch panel pen writing member is moved 40 millimeters (mm) in one direction at a speed of 14 mm/second, the kinetic friction force in the movement direction given to the touch panel pen is measured at intervals of 0.001 seconds, and an average of the kinetic friction forces obtained every 0.001 second is calculated and designated as an average of kinetic friction force; and after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees, in this state, the residual friction force in the movement direction given to the touch panel pen is measured at intervals of 0.001 seconds, and an average of the residual friction forces obtained every 0.001 second is calculated and designated as an average of residual friction force.

2. The method for selecting a touch panel pen writing member according to claim 1, wherein the writing member further satisfies the following requirement A1-2:

Requirement A1-2 the average of residual friction force is 1.0 gf or more and 25.0 gf or less.

3. The method for selecting a touch panel pen writing member according to claim 1, wherein the writing member further satisfies the following requirement A1-3:

Requirement A1-3 the average of kinetic friction force is 1.0 gf or more and 32.0 gf or less.

4. A touch panel system comprising a touch panel having a touch panel pen writing member on the surface thereof, and a touch panel pen, which satisfies the following requirement A1-1:

Requirement A1-1 an average of kinetic friction force and an average of residual friction force obtained below satisfy a relationship: 0.45<average of residual friction force/average of kinetic friction force;

wherein a touch panel pen is secured in a state of being in contact with the surface of the touch panel pen writing member at an angle of 60 degrees, then while a vertical load of 100 grams-force (gf) is kept applied to the touch panel pen and while the touch panel pen writing member is moved 40 millimeters (mm) in one direction at a speed of 14 mm/second, the kinetic friction force in the movement direction given to the touch panel pen is measured at intervals of 0.001 seconds, and an average of the kinetic friction forces obtained every 0.001 second is calculated and designated as an average of kinetic friction force; and after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees, in this state, the residual friction force in the movement direction given to the touch panel pen is measured at intervals of 0.001 seconds, and an average of the residual friction forces obtained every 0.001 second is calculated and designated as an average of residual friction force.

5. A touch panel pen writing member having a surface that satisfies the following requirement A1-1:

Requirement A1-1 an average of kinetic friction force and an average of residual friction force obtained below satisfy a relationship: 0.45<average of residual friction force/average of kinetic friction force;

wherein a touch panel pen is secured in a state of being in contact with the surface of the touch panel pen writing member at an angle of 60 degrees, then while a vertical load of 100 grams-force (gf) is kept applied to the touch panel pen and while the touch panel pen writing member is moved 40 millimeters (mm) in one direction at a speed of 14 mm/second, the kinetic friction force in the movement direction given to the touch panel pen is measured at intervals of 0.001 seconds, and an average of the kinetic friction forces obtained every 0.001 second is calculated and designated as an average of kinetic friction force; and after the movement of 40 mm in one direction of the touch panel pen writing member is completed, the vertical load of 100 gf applied to the touch panel pen is maintained, the touch panel pen is kept in the state of being in contact with the surface of the touch panel pen writing member at an angle of 60 degrees, in this state, the residual friction force in the movement direction given to the touch panel pen is measured at intervals of 0.001 seconds, and an average of the residual friction forces obtained every 0.001 second is calculated and designated as an average of residual friction force.

6. A touch panel comprising a writing member on a surface, wherein a touch panel pen writing member according to claim 5 is placed as the writing member such that the side that satisfies the requirement A1-1 provides the surface of the touch panel.

7. A display device having a touch panel on a display component, wherein the touch panel is a touch panel according to claim 6.

8. A method for selecting a touch panel pen writing member, comprising selecting a writing member satisfying the following requirement B1-1 and requirement B1-2 as the touch panel pen writing member:

Requirement B1-1 when the touch panel pen is secured in a state of being in contact with the surface of the touch panel pen writing member at an angle of 60 degrees, then while a vertical load of 100 grams-force (gf) is kept applied to the touch panel pen and while the touch panel pen writing member is moved 40 millimeters (mm) in one direction at a speed of 14 mm/second, the friction force in the movement direction given to the touch panel pen is measured at intervals of 0.001 seconds, an average of the kinetic friction forces obtained every 0.001 second is calculated, and a standard deviation of the kinetic friction force is calculated, the standard deviation is 2.0 gf or more and 15.0 gf or less;

Requirement B1-2 a fraction of the time at which the kinetic friction force is 3.0 gf or less is 15% or more and 90% or less of a total measurement time for the kinetic friction force.

9. A touch panel system comprising a touch panel having a touch panel pen writing member on the surface thereof, and a touch panel pen, which satisfies the following requirement B1-1 and requirement B1-2:

Requirement B1-1 when a touch panel pen is secured in a state of being in contact with the surface of the touch panel pen writing member at an angle of 60 degrees, then while a vertical load of 100 grams-force (gf) is kept applied to the touch panel pen and while the touch panel pen writing member is moved 40 millimeters (mm) in one direction at a speed of 14 mm/second, the friction force in the movement direction given to the touch panel pen is measured at intervals of 0.001 seconds, an average of the kinetic friction forces obtained every 0.001 second is calculated, and a standard deviation of the kinetic friction force is calculated, the standard deviation is 2.0 gf or more and 15.0 gf or less;

Requirement B1-2
  a fraction of the time at which the kinetic friction force is 3.0 gf or less is 15% or more and 90% or less of a total measurement time for the kinetic friction force.

10. A touch panel pen writing member having a surface that satisfies the following requirement B1-1 and requirement B1-2:

Requirement B1-1
  when a touch panel pen is secured in a state of being in contact with the surface of the touch panel pen writing member at an angle of 60 degrees, then while a vertical load of 100 grams-force (gf) is kept applied to the touch panel pen and while the touch panel pen writing member is moved 40 millimeters (mm) in one direction at a speed of 14 mm/second, the friction force in the movement direction given to the touch panel pen is measured at intervals of 0.001 seconds, an average of the kinetic friction forces obtained every 0.001 second is calculated, and a standard deviation of the kinetic friction force is calculated, the standard deviation is 2.0 gf or more and 15.0 gf or less;

Requirement B1-2
  a fraction of the time at which the kinetic friction force is 3.0 gf or less is 15% or more and 90% or less of a total measurement time for the kinetic friction force.

11. A touch panel comprising a writing member on a surface, wherein a touch panel pen writing member according to claim 10 is placed as the writing member such that the side that satisfies the requirement B1-1 and the requirement B1-2 provides the surface of the touch panel.

12. A display device having a touch panel on a display component, wherein the touch panel is a touch panel according to claim 11.

13. A method for selecting a touch panel pen writing member, comprising selecting a writing member satisfying the following requirement C1-1 as a touch panel pen writing member:

Requirement C1-1
  wherein when a touch panel pen is secured in a state of being in contact with the surface of the touch panel pen writing member at an angle of 60 degrees, and while a vertical load of 100 grams-force (gf) is kept applied to the touch panel pen and while the touch panel pen writing member is moved 40 mm in one direction at a speed of 14 millimeters (mm)/second, a kinetic friction force in the movement direction given to the touch panel pen is measured at intervals of 1 millisecond (msec),
  the interval of 1,001 msec to 2,000 msec after the start of the movement of the touch panel pen writing member is divided into eight sections wherein each section is 125 msec, the kinetic friction force is subjected to discrete Fourier transform with the window function as a Hanning window every section to calculate a power spectrum density in $(gf)^2/Hz$ at each frequency,
  an integrated value of the power spectrum density from 100 Hz to 200 Hz in each section is calculated, and the average value of the integrated values in said eight sections is calculated and designated as $M_{100\text{-}200}$, wherein Requirement C1-1 is satisfied when $M_{100\text{-}200}$ is more than 0.030 $(gf)^2/Hz$ and 0.400 $(gf)^2/Hz$ or less.

14. The method for selecting a touch panel pen writing member according to claim 13, wherein the writing member further satisfies the following requirement C1-2:

Requirement C1-2
  wherein, using the power spectrum density, as calculated in the requirement C1-1, an integrated value of the power spectrum density a from 8 Hz to 100 Hz in each section is calculated, and an average value of the integrated values in said eight sections is calculated and designated as $M_{8\text{-}100}$, wherein requirement C1-2 is satisfied when $M_{8\text{-}100}$ is 0.100 $(gf)^2$ or more and 0.230 $(gf)^2$ or less.

15. The method for selecting a touch panel pen writing member according to claim 13, wherein the writing member further satisfies the following requirement C1-3:

Requirement C1-3
  an average of kinetic friction forces obtained every 1 msec is 15.0 gf or more and 45.0 gf or less.

16. The method for selecting a touch panel pen writing member according to claim 13, wherein the writing member further satisfies the following requirement C1-4:

Requirement C1-4
  wherein in the requirement C1-1, after the movement for a length of 40 mm in one direction of the touch panel pen writing member has finished, the vertical load of 100 gf given to the touch panel pen is maintained, the touch panel pen is kept in contact with the surface of the touch panel pen writing member at an angle of 60 degrees, and the residual friction force in the movement direction given to the touch panel pen is measured at intervals of 0.001 seconds, and an average of the residual friction forces obtained at said 0.001 second intervals is calculated and designated as an average of residual friction force, wherein Requirement C1-4 is satisfied when the average of residual friction force obtained is 10.0 gf or more and 45.0 gf or less.

17. A touch panel system comprising a touch panel having a touch panel pen writing member on the surface thereof, and a touch panel pen, which satisfies the following requirement C1-1:

Requirement C1-1
  wherein when a touch panel pen is secured in a state of being in contact with the surface of the touch panel pen writing member at an angle of 60 degrees, and while a vertical load of 100 grams-force (gf) is kept applied to the touch panel pen and while the touch panel pen writing member is moved 40 mm in one direction at a speed of 14 millimeters (mm)/second, a kinetic friction force in the movement direction given to the touch panel pen is measured at intervals of 1 millisecond (msec),
  the interval of 1,001 msec to 2,000 msec after the start of the movement of the touch panel pen writing member is divided into eight sections wherein each section is 125 msec, the kinetic friction force is subjected to discrete Fourier transform with the window function as a Hanning window every section to calculate a power spectrum density in $(gf)^2/Hz$ at each frequency,
  an integrated value of the power spectrum density from 100 Hz to 200 Hz in each section is calculated, and the average value of the integrated values in said eight sections is calculated and designated as $M_{100\text{-}200}$, wherein Requirement C1-1 is satisfied when $M_{100\text{-}200}$ is more than 0.030 $(gf)^2/Hz$ and 0.400 $(gf)^2/Hz$ or less.

18. A touch panel pen writing member having a surface that satisfies the following requirement C1-1:

Requirement C1-1
wherein when a touch panel pen is secured in a state of being in contact with the surface of the touch panel pen writing member at an angle of 60 degrees, and while a vertical load of 100 grams-force (gf) is kept applied to the touch panel pen and while the touch panel pen writing member is moved 40 mm in one direction at a speed of 14 millimeters (mm)/second, a kinetic friction force in the movement direction given to the touch panel pen is measured at intervals of 1 millisecond (msec), the interval of 1,001 msec to 2,000 msec after the start of the movement of the touch panel pen writing member is divided into eight sections wherein each section is 125 msec, the kinetic friction force is subjected to discrete Fourier transform with the window function as a Hanning window every section to calculate a power spectrum density in $(gf)^2/Hz$ at each frequency, an integrated value of the power spectrum density from 100 Hz to 200 Hz in each section is calculated, and the average value of the integrated values in said eight sections is calculated and designated as $M_{100\text{-}200}$, wherein Requirement C1-1 is satisfied when $M_{100\text{-}200}$ is more than 0.030 $(gf)^2/Hz$ and 0.400 $(gf)^2/Hz$ or less.

19. A touch panel comprising a writing member on a surface, wherein a touch panel pen writing member according to claim 18 is placed as the writing member such that the side that satisfies the requirement C1-1 provides the surface of the touch panel.

20. A display device having a touch panel on a display component, wherein the touch panel is a touch panel according to claim 19.

\* \* \* \* \*